(12) United States Patent
Lautzenhiser

(10) Patent No.: US 9,342,144 B1
(45) Date of Patent: May 17, 2016

(54) RATE-OF-CHANGE CONTROL OF COMPUTER OR APPARATUS

(75) Inventor: John Lyle Lautzenhiser, Hamilton, IN (US)

(73) Assignee: Intellipro LLC, Belgrade, MT (US)

(*) Notice: Subject to any disclaimer, the term of this patent is extended or adjusted under 35 U.S.C. 154(b) by 2896 days.

(21) Appl. No.: 11/581,603

(22) Filed: Oct. 16, 2006

Related U.S. Application Data

(63) Continuation-in-part of application No. 10/696,429, filed on Oct. 29, 2003, now abandoned, which is a continuation-in-part of application No. 09/801,201, filed on Mar. 7, 2001, said application No. 10/696,429 is a continuation-in-part of application No. 10/352,346, filed on Jan. 27, 2003, now abandoned, which is a continuation of application No. 10/331,575, filed on Dec. 30, 2002, now abandoned, which is a continuation of application No. 09/652,395, filed on Aug. 31, 2000, now abandoned.

(60) Provisional application No. 60/187,953, filed on Mar. 9, 2000, provisional application No. 60/166,240, filed on Nov. 18, 1999, provisional application No. 60/152,826, filed on Sep. 7, 1999.

(51) Int. Cl.
*G06F 3/033* (2013.01)
*G06F 3/01* (2006.01)

(52) U.S. Cl.
CPC ............... *G06F 3/012* (2013.01); *G06F 3/011* (2013.01)

(58) Field of Classification Search
USPC ........................................................ 345/156
See application file for complete search history.

(56) References Cited

U.S. PATENT DOCUMENTS

| | | | | |
|---|---|---|---|---|
| 5,012,165 A * | 4/1991 | Lautzenhiser et al. | .......... | 318/53 |
| 5,581,484 A * | 12/1996 | Prince | ........... | 702/150 |
| 5,635,807 A * | 6/1997 | Lautzenhiser | ............... | 318/625 |
| 5,638,092 A * | 6/1997 | Eng et al. | ...................... | 345/158 |
| 5,745,055 A * | 4/1998 | Redlich | ............... | G06F 3/03548 341/20 |
| 5,835,077 A * | 11/1998 | Dao et al. | ...................... | 345/157 |
| 5,874,941 A * | 2/1999 | Yamada | ...................... | 345/157 |
| 6,091,378 A * | 7/2000 | Richardson et al. | ............. | 345/7 |
| 6,314,426 B1 * | 11/2001 | Martin et al. | | |
| 7,030,868 B2 * | 4/2006 | Clapper | ........................ | 345/204 |
| 7,233,316 B2 * | 6/2007 | Smith et al. | .................. | 345/157 |
| 2001/0048291 A1 * | 12/2001 | Lautzenhiser et al. | ........ | 323/234 |

OTHER PUBLICATIONS

U.S. Appl. No. 60/166,240, filed Nov. 18, 1999, John Lyle Lautzenhiser.

* cited by examiner

*Primary Examiner* — Seokyun Moon
(74) *Attorney, Agent, or Firm* — Duncan Galloway Egan Greenwald, PLLC; Kevin T. Duncan

(57) ABSTRACT

A rate-of-change mouse (420, 720) positions a cursor (388, 724) of a display device or monitor (390, 726) in response to a user actuating transducers (16, 17, 422A, 422B, 722A, 722), and performs switching functions, such as left click, right click, or click and drag mouse-switching functions, when a rate-of-change of an electrical signal of one of the transducers (16, 17, 422A, 422B, 722A, or 722B) exceeds a predetermined limit. In addition, macro select, "hot key" actuation, and any other selected switching functions are actuated by moving a body member such as a head (18), hand (64), or finger (67) more rapidly. Optionally, more rapidly actuating one or both of the transducers (16, 17, 422A, 422B, 722A, 722B), in selected directions and/or in selected sequences, accesses and controls augmentative and alternative communication devices (AAC) devices, environmental control units (ECUs) (14), and/or accesses and controls power wheelchairs (12), and/or accesses and controls other apparatus (26).

81 Claims, 26 Drawing Sheets

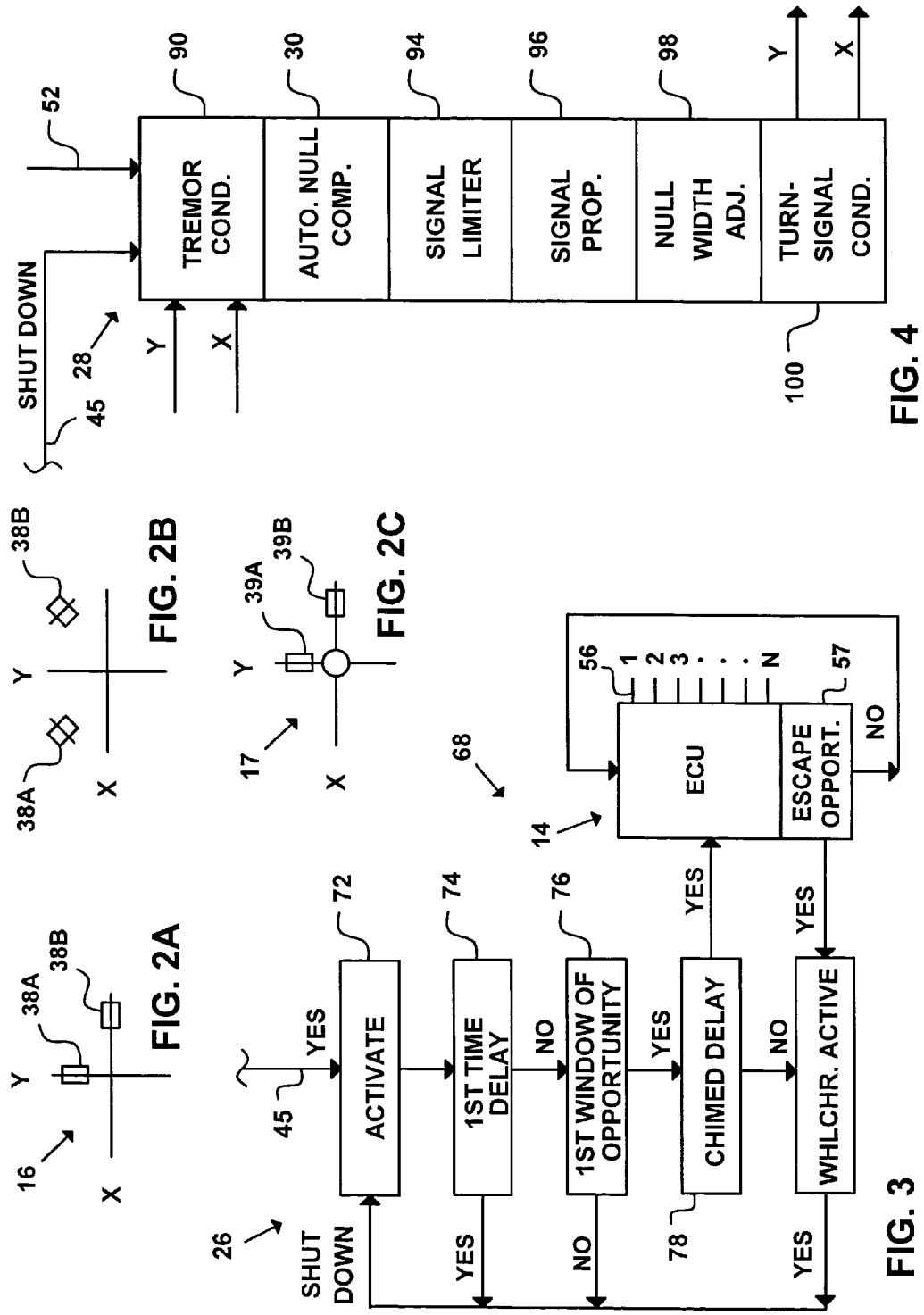

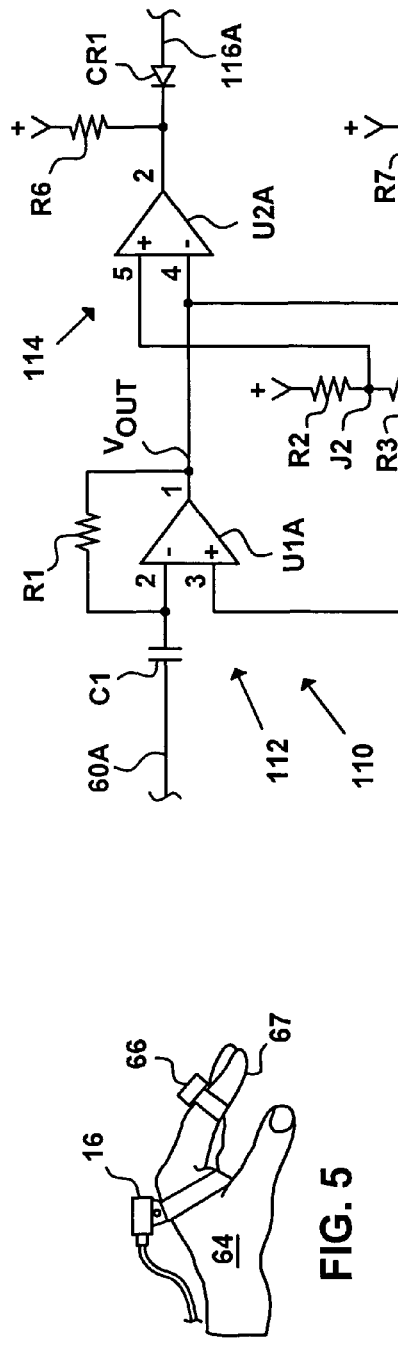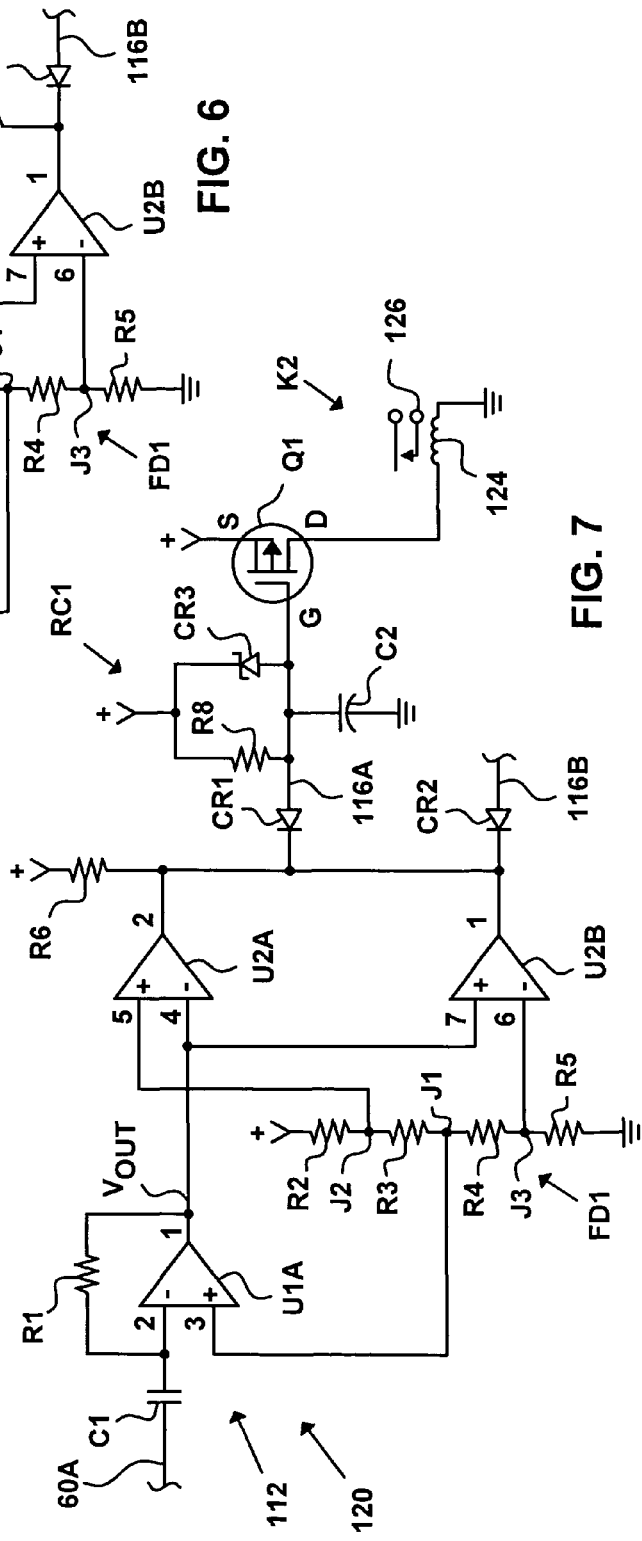
FIG. 5
FIG. 6
FIG. 7

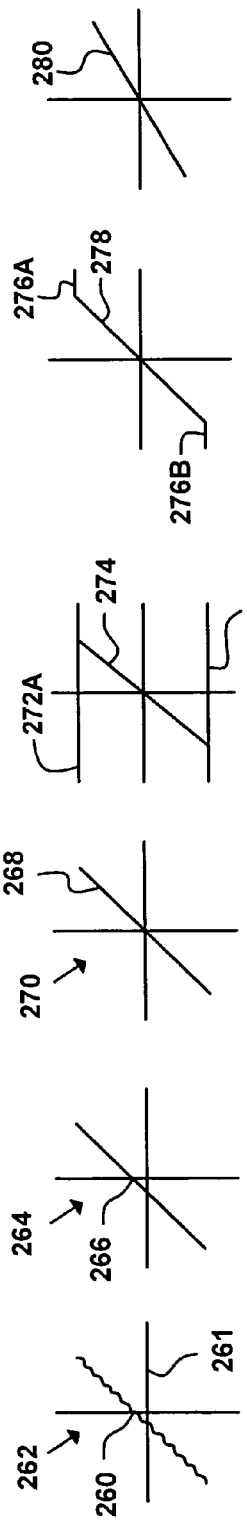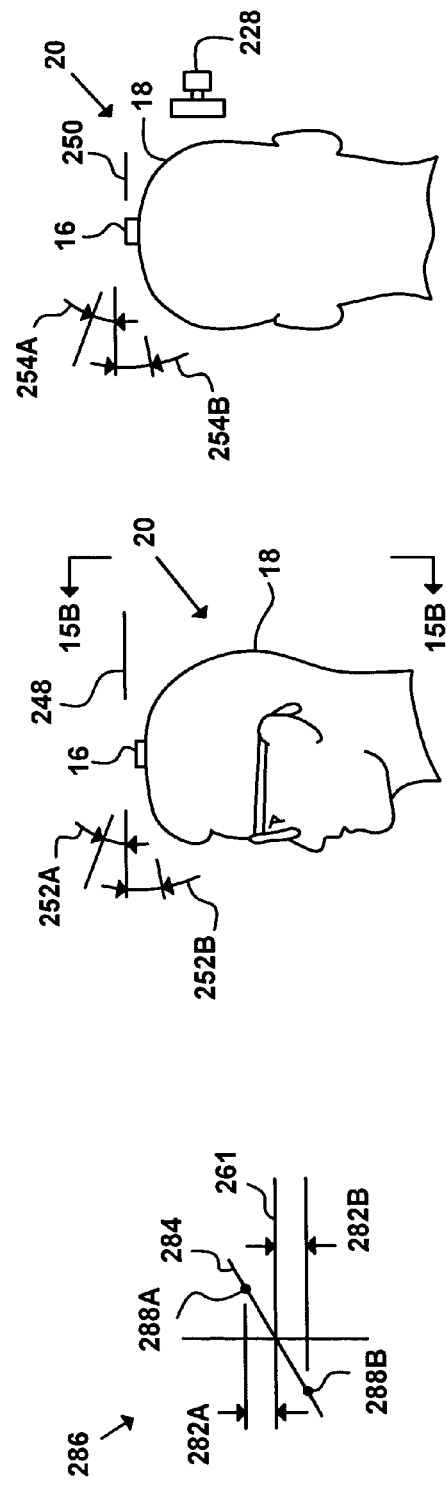

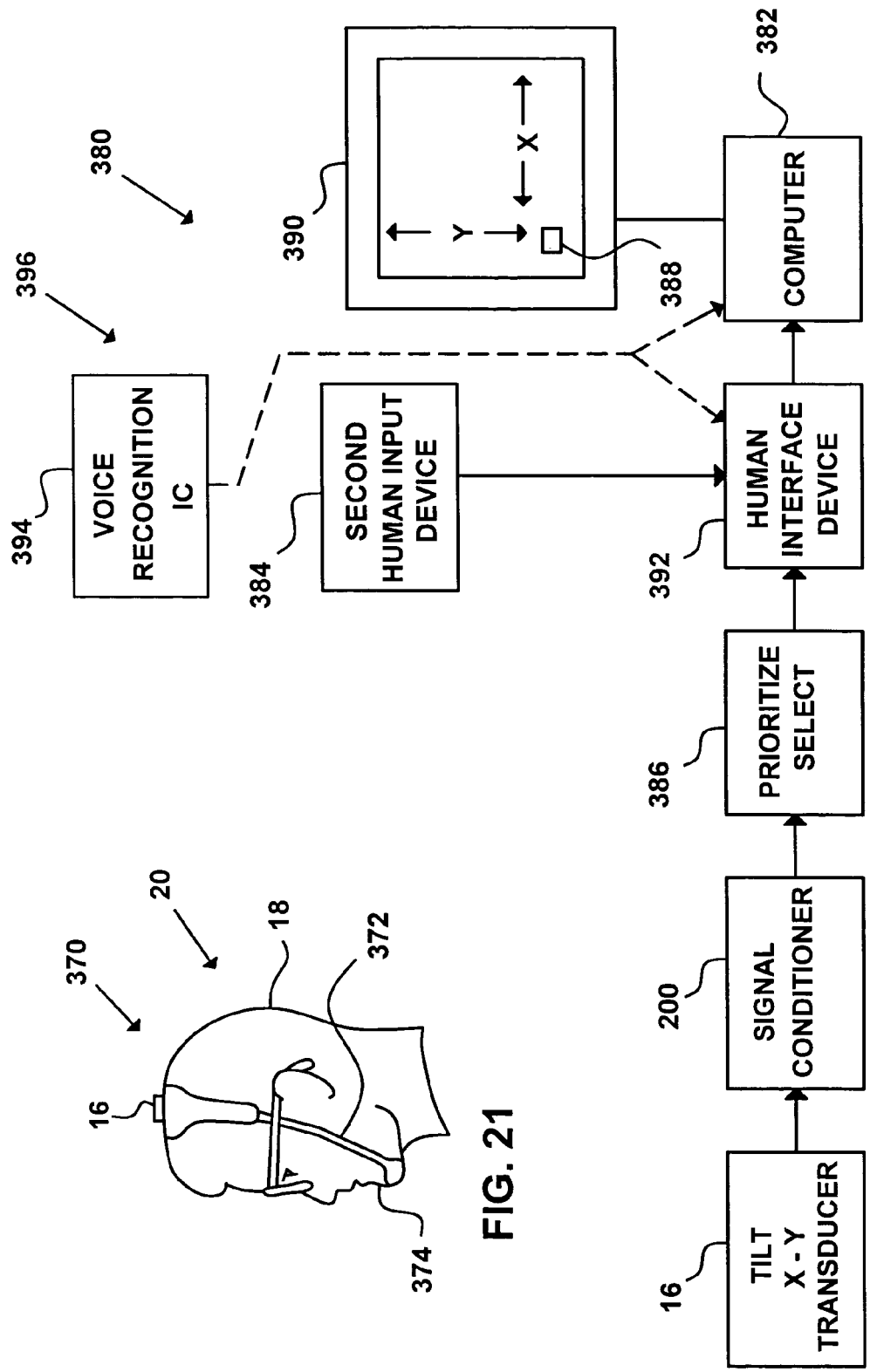

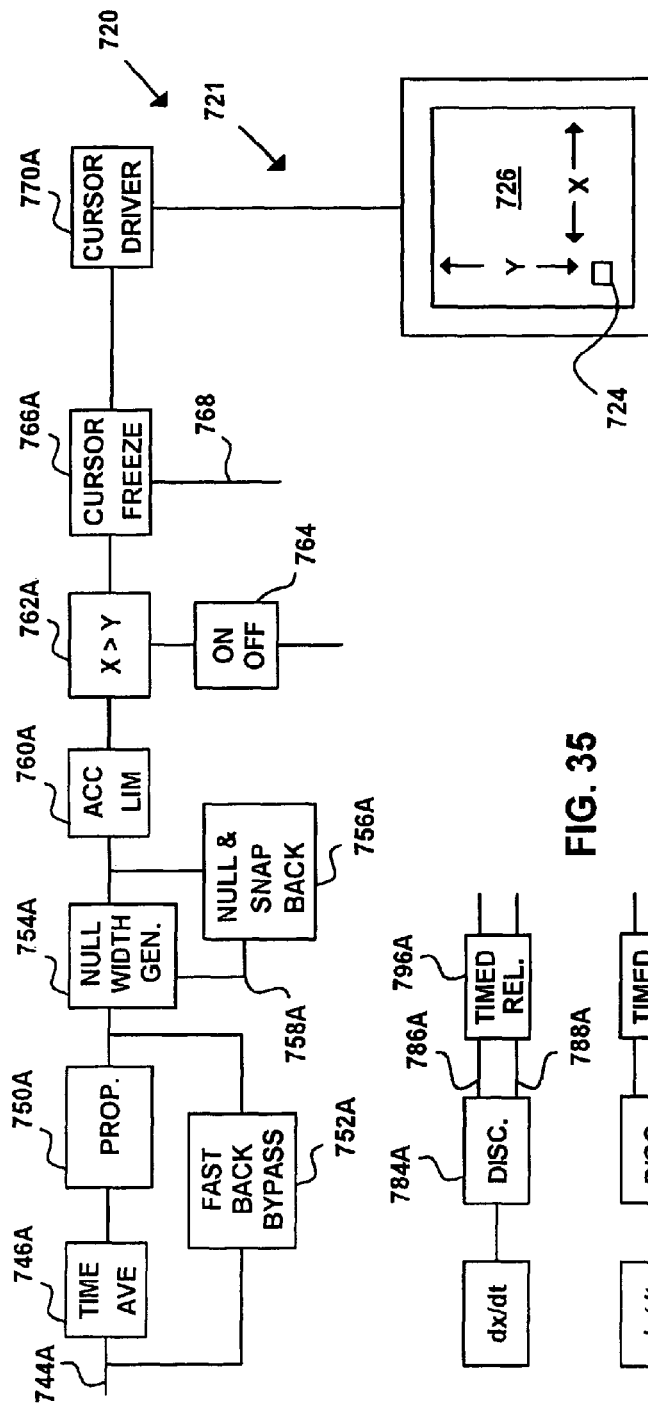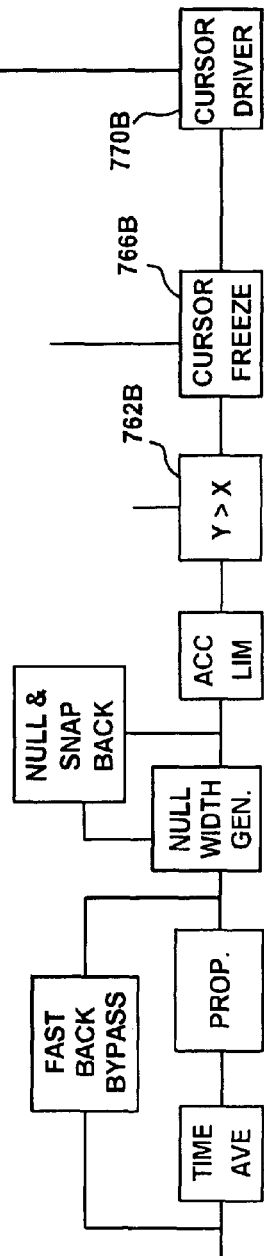

RATE-OF-CHANGE CONTROL OF COMPUTER OR APPARATUS

CROSS-REFERENCES TO RELATED APPLICATIONS

This application is a Continuation-in-part of U.S. patent application Ser. No. 10/696,429, filed Oct. 29, 2003, which is a Continuation-in-part of U.S. patent application Ser. No. 09/801,201, filed Mar. 7, 2001, which claims the benefit of U.S. Provisional Patent Application No. 60/187,953, filed Mar. 9, 2000; and U.S. patent application Ser. No. 10/696,429 is also a Continuation-in-part of application Ser. No. 10/352,346, filed Jan. 27, 2003, which is a Continuation of U.S. patent application Ser. No. 10/331,575, filed Dec. 30, 2002, which is a Continuation of U.S. patent application Ser. No. 09/652,395, filed Aug. 31, 2000, which claims priority to U.S. Provisional Patent Application No. 60/166,240, filed Nov. 18, 1999, and to U.S. Provisional Patent Application No. 60/152,826, filed Sep. 7, 1999, all of which are included in Applicant's claim of priority, and all of which are incorporated herein by reference thereto.

STATEMENT RE FEDERALLY SPONSORED RESEARCH OR DEVELOPMENT

Not Applicable

REFERENCE TO SEQUENCE LISTING

Not Applicable

BACKGROUND OF THE INVENTION

1. Field of the Invention

The present invention relates generally to controlling computers, augmentative and alternative communication devices (AAC devices), environmental control units (ECUs), power wheelchairs, multiplexers, or other apparatus in response to outputs from transducers that are actuated by human effort. More particularly, the present invention relates to controlling computers, AAC devices, and/or other apparatus by any type of user-actuated transducers, such as joystick X-Y controllers, or body-member-attached transducers, such as tilt transducers, or proximity transducers, such as ultrasonic transducers. The electrical signals are differentiated, and mouse-switching functions, such as click or click and drag, other computer switching and/or selecting function such as macro selecting and "hot key" selecting, are accessed and controlled in response to the differentiated electrical signals. In addition, the differentiated signals may be used to switch user-actuated control of the transducers from a computer, to a power wheelchair, to a multiplexer, or any other suitable apparatus, and back to the computer.

2. Description of the Related Art

In recent years there has been an increasing awareness of the importance, not only providing for the needs of handicapped persons, but also of utilizing them as productive members of society, rather than allowing them partially or wholly dependent upon others.

Fortunately, this enlightened view has coincided with giant strides in technology, particularly electronics and computed-based technology, and this increase in technology has been reflected by giant strides in electrically propelled wheelchairs.

The prior art includes electrically propelled wheelchairs in which control of start, stop, and steering has been achieved by manually actuated X-Y transducers, commonly called "joysticks."

Lautzenhiser et al., in U.S. Pat. No. 4,906,906, which issued on Mar. 6, 1990, in U.S. Pat. No. 4,978,899, which issued on Dec. 18, 1990, and in U.S. Pat. No. 5,012,165, which issued on Apr. 30, 1991, teach power wheelchairs that are propelled by pulse-width-modulated voltages, that are dynamically braked by shorting the motors between pulses, that are made freewheeling without the expense and complexity of a clutch, and in which tremor control is provided, so that those who have hand tremors can easily and accurately control power wheelchairs.

In U.S. Pat. No. 5,270,624, which issued on Dec. 14, 1993, Lautzenhiser teaches apparatus and method for adjustably minimizing variations of speed of a power wheelchair that ordinarily result from changes in motor torque caused by variations in grade, resilience of floor material, and/or roughness of terrain.

In U.S. Pat. No. 5,635,807, which issued on Jun. 3, 1997, Lautzenhiser provides: signal limiting so that maximum speeds can be selectively adjusted; adjustable transducer sensitivity; adjustable steering sensitivity control; and overrange shutdown.

The above-recited improvements have so greatly enhanced ease of controllability that many handicapped persons, who were previously unable to control a wheelchair by a joystick, can now do so with ease. Perhaps even more significantly, in U.S. Pat. No. 5,635,807, Lautzenhiser has taken the art a giant step forward by replacing the joystick with two tiny transducers that are mounted to a person's head, spaced behind a person's head, or mounted to an other body member.

In U.S. patent application Ser. No. 10/352,346, filed Jan. 27, 2003, now abandoned, but incorporated into the present patent application, Lautzenhiser teaches a tilt X-Y transducer that may be mounted to a body component, such as the head or a hand of a user; an automatic nulling device; an adjustable null width that does not attenuate an electrical signal; a turn-signal conditioner that provides easier control of turns and elimination of "fishtailing;" adjustable tilt-axis sensitivity to selectively match the motor skills of the user; control of a second device, such as a computer or an environmental control unit (ECU); and use of voice-recognition technology to provide various switching operations.

Finally, in U.S. patent application Ser. No. 09/801,201, which was filed on Mar. 7, 2001, not abandoned, and also incorporated into the present patent application, Lautzenhiser et al. teach head, or body-member, control of apparatus in which electrical signals from mechanical-to-electrical transducers provide proportional control, and rate-of-change electrical signals of the same transducers control switching operations of such devices as computers or ECU's.

In the present invention, rate-of-change switches function in conjunction with electrical signals produced by user-actuated transducers of any type: to control movement of display cursors, to control click and click and drag functions of display cursors, to control AAC devices and or ECUs, to control comfort needs such as adjusting leg supports, head supports, and backrests of beds or wheelchairs, to control personal comfort needs such as heating, cooling, and lighting, and to control entertainment devices, such as radios or television sets. Alternately, the present invention may be used to control speeds and turns of power wheelchairs and/or to select and control any of a plurality of functions via a multiplexer.

Considering now those who have good motor skills, touch typing depends upon having one's hands located in standard positions on a keyboard so that any key may be struck without the necessity of looking at the keyboard.

Typically, when using modern computer programs, a computer mouse is moved over a desk surface, and a cursor moves on a monitor or display device proportional to movement of the mouse. Using the mouse, the cursor is moved to "point" to an icon or words on the display device representing a desired computer program or to a computer function. Then the user "clicks" on the program or function by pressing a button on the mouse, thereby activating the selected program or function. The user may press the same or an other button on the mouse to "drag" computer information, such as a file or an icon, from one location to an other.

The invention and popular use of "point, click, and drag" programs have been both a help and a nuisance to computer users. "Point, click, and drag" programs have relieved computer users of the necessity of remembering and using complex commands to actuate programs and program operating procedures. But, they have degraded the typing skill of good typists because of the need to move a hand from the keyboard to a mouse.

Thus, the mouse of the present invention, that can be worn on the human head, much as a telephone headset is worn, or as an integral part of a telephone headset, allows a touch typist to keep both hands on standard positions on the keyboard while pointing, clicking, and dragging with the head-attached mouse.

Whether it be a commercial user who takes orders on the telephone, an industrial user who does computer-assisted drawing, or a home owner, the head-attached mouse of the present invention provides increased productivity.

With regard to the physically handicapped, use of the head-attached mouse of the present invention, together with an additional human interface provided by the present invention, allows use of complex computer programs, such as computer-assisted drawing programs, even by those who are paralyzed from the neck down. Further, the present invention enables persons with severely limited motor skills to operate a computer, including performing point, click, and drag operations, by use of any suitable type of user-actuated transducer, such as a joystick X-Y controller.

BRIEF SUMMARY OF THE INVENTION

The present invention provides apparatus and method for controlling computer functions such as click, click and drag, macro selection, and "hot key" selection and actuation, and for using augmentative and alternative communication devices (AAC devices), environmental control units (ECUs), or other apparatus, such as power wheelchairs. Both proportional control and switching operations are achieved in response to x and y electrical signals, or x and y electrical outputs, or x and y signal voltages produced by user-actuated transducers such joystick X-Y controllers, body-attached transducers such as tilt transducers, mouse or mouse emulators such as trackballs or touch pads, proximity transducers, or any suitable transducers.

In a preferred embodiment, a tilt X-Y transducer is attached to the head, or other body member, of a user, and both x and y electrical signals are proportional to X and Y tilt angles of the user's head or other body member, so that proportional control of an apparatus can be achieved by movements of the user's head or other body member. A differentiator changes the x and/or y electrical signals to rate-of-change signals ($dx/dt$ or $dy/dt$), and a discriminator senses the rate-of-change signals, so that a switching signal is produced whenever a rate-of-change signal of an x or y electrical signal exceeds a predetermined threshold.

By using both proportional electrical signals and rate-of-change signals from two transducers, a mouse can be constructed that does not require good manual dexterity. In a preferred embodiment, X and Y tilt transducers are attached to a single body member, or to separate body members. Alternately, any type of user-actuated transducer, such as a joystick X-Y controller, or a proximity transducer may be used. Movement of the cursor in X and Y directions is achieved by body-component actuation of the tilt transducers and/or proximity transducers.

Both click and drag functions are achieved by the user body-actuating one or more of the transducers more rapidly. When a more rapidly changing electrical signal is differentiated with respect to time, and a rate-of-change in the electrical signal is produced that exceeds a predetermined threshold, and switching operations, such as a left click, right click and/or click and drag switching functions are performed.

The present patent application also teaches using rate-of-change switching operations for environmental control units (ECU's). That is, electrical signals of the same X and Y transducers that are used to control speed and steering of a power wheelchair, whether head-mounted, mounted to an other body member, proximity actuated, or actuated by a joystick, can be used, when differentiated, to power up the wheelchair, shut it down, or selectively control a multitude of other functions through an ECU.

More particularly, a handicapped person, whether in a wheelchair or a hospital bed, can control his sitting/lying position, temperature, lighting, entertainment devices, communication devices, and/or a computer or other productivity device by electrical signals produced by any suitable mechanical-to-electrical transducer, subsequent to differentiation of the electrical signals as taught herein.

In the rate-of-change switches, x and/or y electrical signals, from transducers such as joystick X-Y controllers, tilt X-Y transducers, or proximity transducers, are differentiated with respect to time ($dx/dt$ or $dy/dt$), and then the differentiated electrical signals are discriminated to provide rate-of-change switching operations.

If an input position of a mechanical-to-electrical transducer is "Y," then the electrical signal is equal to f(Y), which is designated herein by a lower case "y." Thus, it is equally accurate to speak of differentiating the mechanical input or the electrical signal, although it is the electrical signal that is differentiated.

While highly successful results have been achieved by differentiating the electrical signals only once ($dx/dt$ or $dy/dt$), thereby producing values that are a function of the velocity of the input "x" or "y," alternately, the electrical signals are differentiated twice ($d^2x/dt^2$ or $d^{23}y/dt^2$), thereby providing switching signals that are a function of the acceleration of the input "x" or "y."

By differentiating electrical signals generated by a two-axis transducer, such as a joystick or a tilt X-Y transducer, four rate-of-change signals are produced. Two rate-of-change signals are produced for each axis, one rate-of-change signal for an increase in a rate-of-change signal, and one rate-of-change signal for a decrease in a rate-of-change signal. These four rate-of-change signals may be used selectively to perform left click, right click, click and latch, and at least one other selectable function.

In a preferred embodiment, a mouse includes a tilt X-Y transducer that is mounted onto the head of a user. X and Y movements of the user's head control X and Y movements of a cursor, and an electrical signal from one of the transducers, X or Y, is differentiated. The differentiated electrical signal is effective to control left "clicking" when the differentiated electrical signal is equal or greater than a predetermined magnitude. That is, a differentiated electrical signal is discriminated to provide a rate-of-change switching signal when a differentiated electrical signal equals or exceeds a predetermined magnitude. In the same manner, a second one of the four electrical signals is differentiated and the rate-of-change switching signal is used to control "drag" functions. Since the rate-of-change switching signals are momentary, the drag function is toggled ON and OFF.

In an other embodiment, electrical signals from X and Y transducers, whether head attached or joystick actuated, are used to control a power wheelchair, and rate-of-change switching signals are used to control other apparatus, such as an ECU or an AAC device.

Whenever one rate-of-change signal exceeds a predetermined magnitude, and provides a rate-of-change switching signal, it may be used to initiate a timed-opportunity switch. If a rate-of-change switching signal is delivered to the timed-opportunity switch within a first window-of-opportunity, power is supplied to a first apparatus, such as an electrically propelled wheelchair. Or, if a rate-of-change switching signal is delivered to the timed-opportunity switch within a second window-of-opportunity, the ECU becomes controllable by rate-of-change switching signals.

As defined herein, a rate-of-change control device includes a differentiator and whatever additional components, such as a discriminator, may be required to perform the desired switching operations in response to rate-of-change signals. When a transducer is included with the rate-of-change control device, the combination becomes a rate-of-change switch. Although analog differentiation and discrimination has been shown and described, differentiation and/or discrimination may be done digitally and or by any combination of analog and digital technology.

Rate-of-change switches function by differentiating an electrical signal, and the derivative of a constant is zero. Therefore, when an input to a transducer is constant, the electrical signal is a constant, and the differentiator produces a zero output. This means that transducers for rate-of-change switches do not need neutral positions, because their electrical signals are self centering. In addition, a transducer for use in a rate-of-change switch does not need to have an output that is linear, relatively repeatable, relatively drift free, or relatively free from hysteresis.

In a first aspect of the present invention, a method comprises: selectively actuating a transducer; producing selectively variable electrical signals in response to the selectively actuating step; moving a cursor in plus and minus directions in response to the electrical signals; more rapidly actuating the transducer; performing a switching step in response to the more rapidly actuating step; and preventing the more rapidly actuating step from moving the cursor.

In a second aspect of the present invention, a method comprises: producing selectively variable electrical signals; moving a cursor in response to the electrical signals; changing a magnitude of the electrical signals; and performing a switching step in response to the changing step.

In a third aspect of the present invention, a method comprises: selectively actuating first and second transducers; moving a cursor in horizontal and vertical directions in response to the selectively actuating step; more rapidly actuating one of the transducers; and performing a switching step in response to the more rapidly actuating step.

In a fourth aspect of the present invention, a method comprises: producing plus x, minus x, plus y, and minus y signals; moving a cursor in plus X, minus X, plus Y, and minus Y directions in response to the producing step; selectively increasing one of said signals; and performing a switching step in response to the selectively increasing step.

In a fifth aspect of the present invention, apparatus comprises: means, comprising first and second transducers that are connected to a cursor, for moving the cursor in X and Y directions in response to body-member actuating the transducers; and means, being connected to one of the transducers, for performing a switching function in response to more rapidly actuating the one transducer.

BRIEF DESCRIPTION OF THE SEVERAL VIEWS OF THE DRAWINGS

FIG. 2A is an illustration showing tilt transducers aligned with X and Y axes wherein tilt actuation around the X-axis produces y electrical signals, or y outputs, and tilt actuation around the Y-axis produces x electrical signals, or x outputs, so that, when used with a computer, one tilt transducer controls horizontal cursor movement, and the other tilt transducer controls vertical cursor movement, or, in a power wheelchair, one tilt transducer controls forward and reverse speeds, and the other tilt transducer controls turns;

FIG. 2B is an illustration showing tilt transducers oriented at forty-five degrees with respect to X and Y axes, wherein actuation around either axis, X or Y, produces electrical signals from both tilt transducers, so that, when used with a power wheelchair, both tilt transducers control speeds and turns;

FIG. 2C is an illustration of a joystick X-Y controller, wherein actuation around an X-axis produces y electrical signals, or y outputs, and actuation around a Y-axis produces x electrical signals, or x outputs, so that, when used with a computer, one transducer controls horizontal computer-cursor movement, and the other transducer controls vertical cursor movement, or, in a power wheelchair, one transducer controls forward and reverse speeds, and the other transducer controls turns;

FIG. 3 is a block diagram of the timed-opportunity switch and the ECU of FIG. 1;

FIG. 4 is a block diagram of the signal conditioner of FIG. 1 that includes an automatic null compensator;

FIG. 5 is a partial view of a human hand, showing a tilt X-Y transducer attached to the hand, and a tilt X-Y transducer for a single axis that is attached to a finger;

FIG. 6 is a schematic drawing of a rate-of-change control device in which two rate-of-change switching signals are produced from a single transducer;

FIG. 7 is a schematic diagram of a rate-of-change control device for use with a single transducer, showing circuitry for actuating a relay when either of two rate-of-change signals exceed a predetermined magnitude;

FIG. 15A is a side elevation of a head of a person wearing a tilt X-Y transducer that may be used in combination with the power interface of the present invention;

FIG. 15B is a rear elevation of the head of the person of FIG. 15A, taken substantially as shown by view line 15B-15B of FIG. 15A;

FIG. 16A is a graph of an electrical signal, in the form of a signal voltage, as produced by a mechanical-to-electrical transducer, in which the resultant null voltage is offset to an approximate null by approximate positioning of the user's head, and the signal voltage includes fluctuations caused by body tremors of the user;

FIG. 16B is a graph of the signal voltage of FIG. 16A, but with voltage fluctuations removed by the tremor conditioner;

FIG. 16C is a graph of the signal voltage of FIG. 16B, but with the approximate null corrected to a precise null;

FIG. 16D is a graph of the signal voltage of FIG. 16B, showing shutdown limits, both plus and minus;

FIG. 16E is a graph of the signal voltage of FIG. 16C, but with signal limiting;

FIG. 16F is a graph of the signal voltage of FIG. 16E, but with signal proportioning;

FIG. 16G is a graph of the signal voltage of FIG. 16F, but with adjustable null width;

FIG. 21 is a side elevation, taken substantially the same as FIG. 15A, showing a tilt X-Y transducer mounted onto a user's head, and showing a chin-actuated switch that enables hand-free "clicking" of mouse functions;

FIG. 22 is a block diagram of an embodiment of the present invention in which apparatus for control of a controllable device, such as a computer, includes a first human input device which preferably is a tilt X-Y transducer or a joystick X-Y controller, a second human input device which preferably is either a sound-pressure switch or a voice-recognition chip, and a human interface device, which preferably is a microprocessor;

FIG. 34B is the remaining portion of the block diagram of FIG. 34B, showing flow of the real-time and delayed-time electrical signals that control movement of the cursor; and FIG. 35 is a block diagram repeating a portion of the block diagram of FIG. 34A, and showing a timed block/release that replaced an over-center block/release of FIG. 34A.

DETAILED DESCRIPTION OF THE INVENTION

FIGS. 1 to 33 provide a detailed description of the present invention in embodiments constructed with analog components. Then, in FIGS. 34A and 34B, the present invention is illustrated by a single block diagram that generally capsulizes the previously discussed functions and intercomponent relationships of a preferred embodiment of the present invention, illustrating by functional blocks, how the present invention can be practiced using analog components, digital components, or a combination of analog and digital components.

Figure 1:
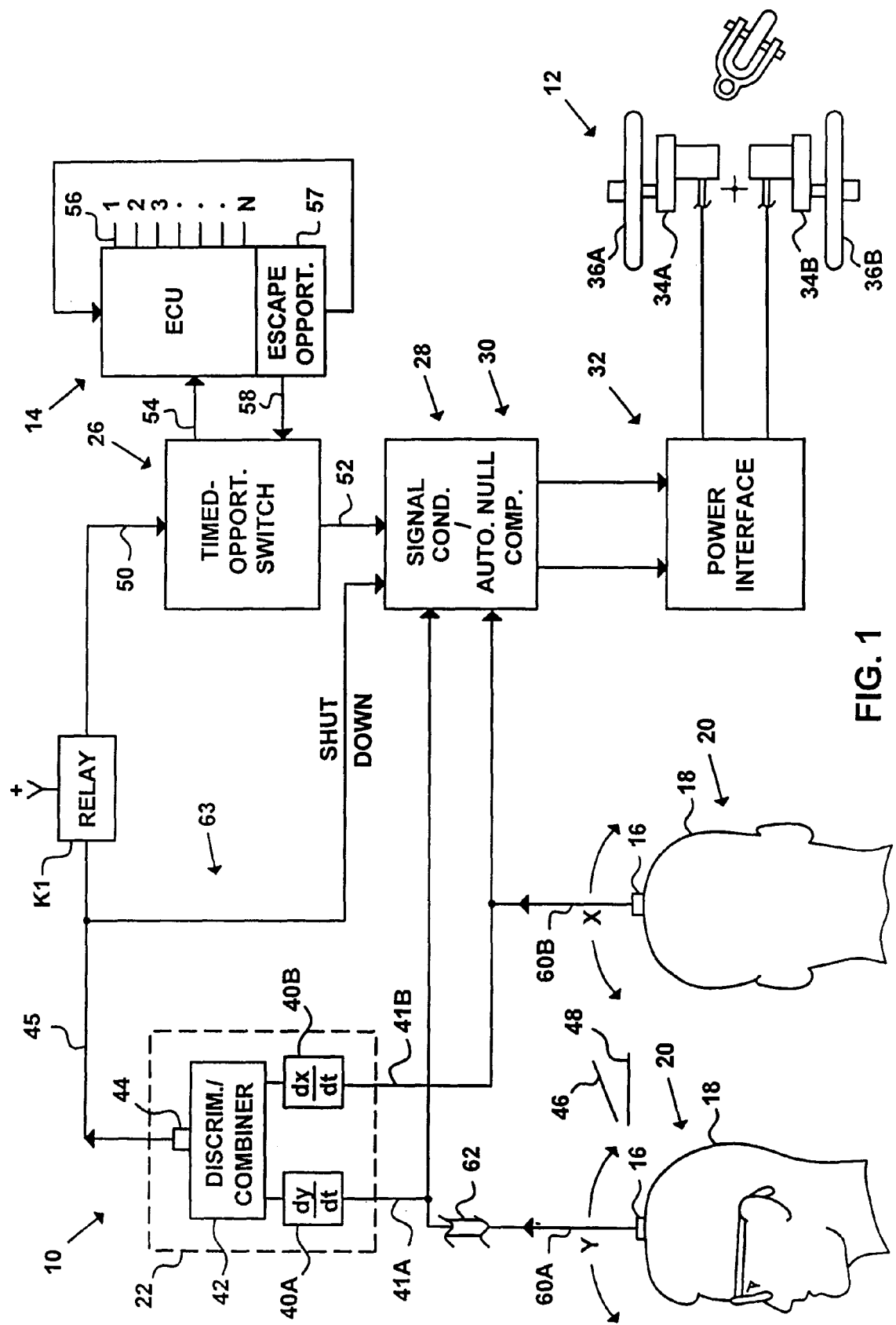
FIG. 1 is a block diagram of an environmental control unit (ECU) and an electrically powered conveyance that are selectively controlled by head-attached tilt X-Y transducers, a rate-of-change control device that includes both differentiators and discriminators, and a timed-opportunity switch.

Referring now to FIG. 1, a control system 10 provides proportional control of an apparatus, such as an electrically powered conveyance, or power wheelchair 12, by x and y electrical signals, or x and y electrical outputs, or x and y signal voltages produced by a tilt X-Y transducer or mechanical-to-electrical X-Y transducer 16 of FIGS. 1 and 2A that may be mounted to a user's head 18, and provides a switching function for an apparatus, such as an environmental control unit (ECU) 14, by a differentiated signal of the X-Y transducer 16. Optionally, any type of user-actuated X-Y transducer may be used, such as a joystick X-Y controller 17 of FIG. 2C.

As will be shown subsequently, a preferred use for the present invention is control of X and Y movements of a cursor by x and y electrical signals produced by any type of X-Y transducers, such as the tilt X-Y transducer 16 of FIG. 2A, the joystick X-Y controller 17 of FIG. 2C, or any other type of user-actuated transducer. Click and drag switching control of computer programs are achieved by differentiating x and y electrical signals of the transducers 16 or 17.

Referring again to FIG. 1, the head 18 of a person 20 is shown in both side and back views to illustrate movement of the head 18 with respect to X and Y axes. Thus, numbers for the tilt X-Y transducer 16 and the person 20 are placed on both views of the head 18.

The control system 10 includes a rate-of-change control device 22, a relay K1, a timed-opportunity switch 26, a signal conditioner 28 that includes an automatic null compensator 30, and a power interface 32.

The power interface 32 is connected to electric motors 34A and 34B of the power wheelchair 12, and the electric motors 34A and 34B are drivingly connected to wheels 36A and 36B, respectively, of the power wheelchair 12.

Referring now to FIGS. 1 and 2A, the tilt X-Y transducer or mechanical-to-electrical X-Y transducer 16 of FIGS. 1 and 2A, preferably includes a tilt transducer, or mechanical-to-electrical transducer, 38A that is oriented to be sensitive, exclusively, to tilting around the X-axis, and a tilt transducer, or mechanical-to-electrical transducer, 38B that is oriented to be sensitive, exclusively, to tilting around the Y-axis, as shown in FIG. 2A.

However, the joystick X-Y controller 17, or any other kind of user-actuated transducer may be used in the control system 10. As shown in FIG. 2C, X and Y transducers, or potentiometers, 39A and 39B of the joystick X-Y controller 17 are oriented on X and Y axes as are the tilt transducers 38A and 38B of the tilt transducer 16. Alternately, the systems taught herein are adaptable for use with tilt transducers, or mechanical-to-electrical transducers 38A and 38B that are oriented between the X-axis and the Y-axis, as shown in FIG. 2B.

Referring again to FIG. 1, when activated by the timed-opportunity switch 26, the person 20 can control direction of propulsion, speeds of propulsion, and steering of the power wheelchair 12 by moving the head 18 in X and Y directions, as marked. Movements of the head 18 in Y directions control forward and reverse speeds, and movements of the head 18 in X directions control turns.

Electrical signals from the X-Y transducer 16 are connected to the signal conditioner 28 that includes the automatic null compensator 30. Signal conditioning may include tremor control, maximum speed limiting, soft starts, soft stops, signal proportioning, turn-signal conditioning, and/or null width adjustment which are taught herein, by Lautzenhiser in U.S. Pat. No. 5,635,807 and/or by Lautzenhiser et al. in U.S. patent application Ser. No. 10/352,346.

The power interface 32 uses the conditioned signals of the signal conditioner 28 to individually control both speed and direction of rotation of the electric motors 34A and 34B.

Continuing to refer to FIG. 1, in addition to being delivered to the signal conditioner 28, the x and y electrical signals are delivered to separate ones of differentiators 40A and 40B in the rate-of-change control device 22, one for each electrical signal, x and y, by input terminals 41A and 41B.

The differentiators 40A and 40B produce four rate-of-change signals, one rate-of-change signal each when a differentiated electrical signal of either of the two tilt transducers 38A or 38B of FIG. 2A is in a plus direction, and one rate-of-change signal each when a differentiated electrical signal of either of the two tilt transducers 38A and 38B of FIG. 2A is in a minus direction.

Whether mechanical inputs to an X-Y transducer are in linear or rotary measurements, the electrical signals of the X-Y transducer are x and y, the differentiated electrical signal of one differentiator 40A is dy/dt and the differentiated electrical signal of the other differentiator 40B is dx/dt.

A discriminator/combiner 42 translates increasing and decreasing rate-of-change signals from the two differentiators, 40A and 40B into four rate-of-change switching signals. A switching operation is performed when any of the four rate-of-change switching signals exceeds a predetermined allowable magnitude.

When the person 20 moves the head 18 in a forward Y direction, in a rearward Y direction, in a leftward X direction, or in a rightward X direction, one of the differentiators 40A or 40B, produces a rate-of-change signal (dy/dt or dx/dt). If one of the differentiated electrical signals is sufficiently large, the discriminator 42 produces a low at an output terminal 44 and in a conductor 45.

Continuing to refer to FIG. 1, assume that the head 18 is lowered to an inclination angle 46 from a normal head position 48 with a velocity that produces a predetermined dy/dt. As a result, a first low is produced at the terminal 44 of the rate-of-change control device 22, and in the conductor 45.

If the head 18 is lowered and raised at appropriate times, with sufficient velocity, the rate-of-change control device 22 will initiate the timed-opportunity switch 26. Or, alternately, if the head 18 is moved in any selected combinations of directions, X and/or Y, at appropriate times, and with sufficient velocity, the timed-opportunity switch 26 will be initiated.

Once the timed-opportunity switch 26 has been actuated by movement of the head 18, or by any other type of switch, by a switching action delivered to an input conductor 50 of the timed-opportunity switch 26, additional movements of the head 18 can be used to initiate power to the wheelchair 12 or to initiate operation of the ECU 14.

A timely movement of the head 18 will initiate control of the wheelchair 12 by movement of the head 18 in X and Y directions, as indicated by an arrow 52. However, movement of the head 18 at a different time will initiate control of the ECU 14, as indicated by an arrow 54.

With control of the ECU 14 initiated by an appropriately timed movement of the head 18, as indicated by the arrow 54, tasks 56 can be controlled by appropriately timed movements of the head 18 as the ECU 14 sequentially cycles through opportunities to control the tasks 56.

Continuing to refer to FIG. 1, after completing control of selected ones of the tasks 56 of the ECU 14, movement of the head 18 at an escape opportunity 57 returns control, to the timed-opportunity switch 26, as indicated by an arrow 58.

A Y-axis electrical signal of the X-Y transducer 16 is connected to the rate-of-change control device 22 by a Y-axis conductor, or forward/reverse conductor, 60A, and an X-axis electrical signal of the X-Y transducer 16 is connected to the rate-of-change control device 22 by an X-axis conductor, or turn-signal conductor, 60B. Both conductors, 60A and 60B, are part of a lightweight cable 62, as shown with the conductor 60A.

When the rate-of-change control device 22 is combined with any X and Y transducer, such as the X-Y tilt transducer 16 of FIGS. 1 and 2A, the joystick X-Y controller 17 of FIG. 2C, or any other type of user-actuated X and Y transducers, the combination is a rate-of-change switch 63.

Referring now to FIG. 5, alternately, the X-Y transducer 16 may be attached to a different body member, such as a hand 64, or a transducer 66, producing only a single electrical signal, may be attached to one or more body members, such as a finger 67.

Referring now to FIGS. 1 and 3, the ECU 14 can function as a stand-alone unit that can be operated by anyone who can make momentary switching contacts by any body member, such as the head 18, the hand 64, and/or the finger 67, using any type of switch, if it is suitable to have the ECU 14 operate continuously.

However, in many instances, it may be desirable to provide protection against the ECU 14 being operated by the person 20 who, perhaps because of medication, is not competent to operate the ECU 14 safely or successfully. If so, the ECU 14 can be combined with the timed-opportunity switch 26, to provide a stand-alone ECU 68 of FIG. 3, that can be operated by successive momentary switching by any body member, such as the head 18, the hand 64, and/or the finger 67, using a rate-of-change switch, or any other type of switch.

Referring now to FIG. 3, and the timed-opportunity switch 26, if "yes" refers to a signal produced by the rate-of-change control device 22 of FIG. 1, or produced by any other momentary-contact switch, then a "yes" signal in the conductor 45, of FIGS. 1 and 3, activates the timed-opportunity switch 26, as indicated by a box 72, and starts a first time delay 74.

If a "yes" signal is inadvertently applied to the timed-opportunity switch 26 during the first time delay 74, as indicated by a "yes" arrow, the timed-opportunity switch 26 shuts down. However, if the person 20 refrains from generating a "yes" signal during the first time delay 74, the process proceeds to a second time delay, or a first window-of-opportunity 76.

Continuing to refer to FIG. 3, if the person 20 of FIG. 1 fails to provide a "yes" signal during the first window-of-opportunity 76, as indicated by a "no" arrow, the timed-opportunity switch 26 shuts down. However, if the person 20 provides a "yes" signal during the first window-of-opportunity 76, a third time delay, or second window-of-opportunity, which is also a chimed delay 78, starts.

If the person 20 provides a "yes" signal during the chimed delay 78, as indicated by a "yes" arrow, control of the ECU 14 is given to subsequent "yes" signals. But, if the person 20 refrains from providing a "yes" signal during the chimed delay 78, control of the power wheelchair 12 of FIG. 1 is delivered to the signal conditioner 28 of FIG. 1.

Assuming that the person 20 has provided a "yes" signal during the chimed delay 78, the ECU 14 starts to cascade through timed opportunities for tasks 56. A "yes" signal provided at a timed opportunity for one of the tasks 56 provides opportunity to turn ON, turn OFF, or adjust whatever apparatus is connected to that task 56.

Upon resuming cascading, any other task 56 can be accessed and controlled. Finally, escape from the ECU 14 is achieved by providing a "yes" signal during the escape opportunity 57.

Continuing to refer to FIG. 3, shutdown of the control system 10 of FIG. 1 and the power wheelchair 12 is achieved in either of two ways, one voluntary and the other involuntary. Voluntary shutdown is achieved by producing a "yes" signal at an appropriate time, as indicated by a "yes" signal beside a box marked "wheelchair active" that leads to "shutdown." Involuntary shutdown is a safety feature that occurs any time the wheelchair is active, if the person 20 inadvertently produces a rate-of-change signal that is above an allowable magnitude.

For instance, if the X-Y transducer 16 is knocked off of the head 18 of the person 20, the power wheelchair 12 will shut down. If the person 20 becomes unconscious, and the head 18 drops, the wheelchair 12 will shut down. Even if the lightweight cable 62 of FIG. 1 is jerked, the power wheelchair 12 will shut down.

Referring now to FIG. 4, the various functions that are included in the signal conditioner 28 of FIG. 1 are now shown as separate blocks. A tremor conditioner 90 of the signal conditioner 28 receives x and y electrical signals as indicated, and the tremor conditioner 90 compensates for hand tremors, such as those caused by Parkinson's disease.

The automatic null compensator 30 receives x and y tremor-conditioned signals from the tremor conditioner 90, as indicated by the arrow 52, stores and subtracts a null voltage from the tremor-conditioned signals, so that, whatever the initial position of the head 18 of FIG. 1 may be, both x and y electrical signals are nulled at the end of the chimed delay 78 of the timed-opportunity switch 26 of FIG. 3.

The nulled x and y signals are delivered to a signal limiter 94 wherein the x and y signals are separately and selectably adjusted, so that speeds of propulsion and steering can be selectively limited.

Following the selective limiting of the x and y signals, a signal proportioner 96 separately and selectively proportions the x and y signals, thereby, in essence, providing selective adjustment of the sensitivity of the individual transducers in the X-Y transducer 16 of FIG. 1.

After selective adjustment of transducer sensitivity, the x and y signals are delivered to a null width adjuster 98 wherein an adjustable width null is provided for both x and y signals.

Finally, after providing adjustable null widths, a turn-signal conditioner 100, reduces the y signal as a function of the x signal, thereby reducing propulsion speeds when turns are made, and thereby enhancing stability and control of the wheelchair 12 of FIG. 1.

Referring now to FIG. 6, a rate-of-change control device 110 includes a differentiator 112 and a discriminator 114. The differentiator 112 includes an operational amplifier U1A, a capacitor C1, and a feedback resistor R1, and the discriminator 114 includes comparators U2A and U2B.

The rate-of-change control device 110 also includes a fixed voltage divider FD1 with resistors R2, R3, R4, and R5. Preferably, the resistors R2, R3, R4, and R5 are proportioned to provide 2.5 volts at a junction J1, 3.3 volts at a junction J2, and 1.7 volts at a junction J3 when the voltage divider FD1 is connected to a 5.0 volt source.

Finally, in addition to the comparators U2A and U2B, the discriminator 114 includes pull-up resistors R6 and R7 that are connected to pins 2 and 1 of the comparators U2A and U2B, respectively, and diodes CR1 and CR2 that also are connected to pins 2 and 1 of the comparators U2A and U2B, respectively.

Preferably, the operational amplifier U1A, and also an operational amplifier U1D, that is included in various embodiments taught herein, are part No. LMC 6484IN, manufactured by National Semiconductor of Sunnyvale, Calif. And, preferably the comparators U2A and U2B, and comparators U2C and U2D, which are used in some embodiments, are part No. LM339N, also manufactured by National Semiconductor.

Figure 8:
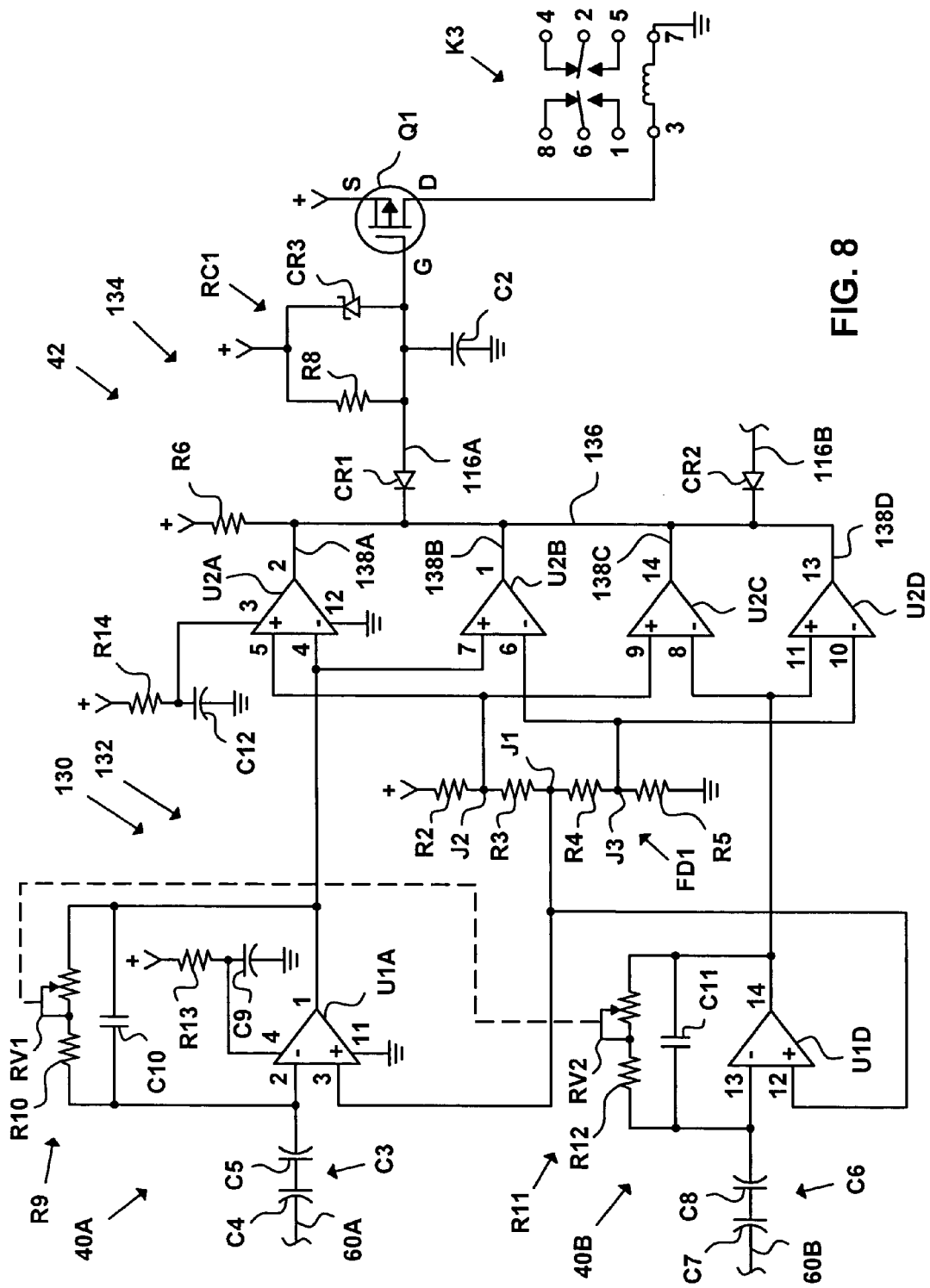
FIG. 8 is a schematic drawing of a rate-of-change control device for use with X-Y transducers, showing circuitry for actuating a switch when any of the four rate-of-change signals exceed a predetermined magnitude.

Referring for a moment to FIG. 8, comparators U2A, U2B, U2C, and U2D are of the open collector type. That is, pins 2, 1, 14, and 13 are open except when the comparators U2A, U2B, U2C, and U2D are conducting. This fact should be kept in mind when studying the various embodiments.

Referring now to FIG. 6, a change in an output voltage $V_{OUT}$ is inverse to the direction of the rate-of-change of the signal voltage received from one of the conductors, 60A or 60B of FIG. 1, or 60A as shown in FIG. 6. That is, a change in the output voltage $V_{OUT}$ is inverse to dy/dt, assuming that an input to a transducer, such as the tilt transducers 38A and 38B of FIG. 2A, produces an electrical signal f(x) that is proportional to a "y" input.

Further, a change in the output voltage $V_{OUT}$ of the differentiator 112 is equal to (/t)×R1×C1. Therefore, a change in the output voltage $V_{OUT}$, for a given (/t), can be selected by adjusting the resistor R1 of FIG. 1. This fact is used to provide adjustable gain in the embodiment of FIG. 8, as will be discussed subsequently.

As shown in FIG. 6, 2.5 volts is supplied to the positive input at pin 3 of the operational amplifier U1A from the junction J1 of the voltage divider FD1. Thus, when dy/dt is equal to zero, the output voltage $V_{OUT}$ at pin 1 of the operational amplifier U1A is 2.5 volts. When dy/dt is positive, the output voltage $V_{OUT}$ drops below 2.5 volts, and when dy/dt is negative, the output voltage $V_{OUT}$ raises above 2.5 volts.

As long as the output voltage $V_{OUT}$ of the operational amplifier U1A, as applied to pin 4 of the comparator U2A, is below the 3.3 volts of pin 5, the output of the comparator U2A will be high, not only because of the pull-up resistor R6 that is connected to a 10.0 volt source, but also because pin 2 is an open collector. However, when the output voltage $V_{OUT}$ of the operational amplifier U1A exceeds 3.3 volts, the comparator U2A pulls pin 2 down to ground.

In like manner, as long as the output voltage $V_{OUT}$ of the operational amplifier U1A, as applied to pin 7 of the comparator U2B, is above the 1.7 volts of pin 6, the output of the comparator U2B will be high, not only because of the pull-up resistor R6 that is connected to a 10.0 volt source, but also because pin 1 is an open collector. However, when the output voltage $V_{OUT}$ drops below 1.7 volts, the comparator U2B sinks pin 1 to ground.

Therefore, the rate-of-change control device 110 provides two separate rate-of-change switching operations. A voltage in a conductor 116A is pulled low through the diode CR1 in response to a rate-of-change (dy/dt) that reflects an electrical output of the Y transducer that is decreasing by a predetermined rate-of-change. And, a voltage in a conductor 116B is pulled low through diode CR2 in response to a rate-of-change (dy/dt) that reflects an electrical output of the Y transducer that is increasing by a predetermined rate-of-change.

Referring now to FIG. 7, a rate-of-change control device 120 includes like-named and like-numbered components as those of FIG. 6, receives the signal voltage in one of the conductors, 60A or 60B, of FIG. 1 or 60A as shown in FIG. 7, and functions generally as described in conjunction with FIG. 6.

More particularly, the rate-of-change control device 120 includes the differentiator 112 with its operational amplifier U1A, the feedback resistor R1, and the capacitor C1, the fixed voltage divider FD1 with its resistors, R2, R3, R4, and R5, the junctions J1, J2, and J3, the pull-up resistor R6, the diodes CR1 and CR2, and the conductors 116A and 116B.

The rate-of-change control device 120 ties pins 2 and 1, of the comparators U2A and U2B together, adds a p-channel field-effect transistor (FET) Q1, a pull-up resistor R8, a capacitor C2, a Zener diode CR3, and a relay K2 with a coil 124 and normally open contacts 126.

Since the FET Q1 is a p-channel FET, a high gate, as provided by the pull-up resistor R8, causes the FET Q1 to function as an open circuit between a source terminal S and a drain terminal D, so that the coil 124 is not energized, normally open contacts 126 remain open, and the capacitor C2 becomes charged.

When either pin 2 of the comparator U2A or pin 1 of the comparator U2B goes to ground, the diode CR1 allows current flow to the grounded pin (2 or 1), thereby discharging the capacitor C2, and pulling down the voltage on a gate terminal G of the FET Q1.

Whereas the rate-of-change signals from the comparators U2A and U2B are of short duration, the pull-up resistor R8 and the capacitor C2 form an RC circuit RC1 that provides a switching operation of a duration of about 300 milliseconds. That is, the RC circuit RC1 of the pull-up resistor R8 and the capacitor C2, lengthens the closure time of the relay K2 to simulate a manually actuated, momentary-contact switch.

The Zener diode CR3 protects the gate G of the FET Q1; and the diode CR2 provides for an additional switching operation that may be accessed by connection to the conductor 116B.

Referring now to FIG. 8, a rate-of-change control device 130 includes like-named and like-numbered components as those of FIGS. 6 and 7, receives the signal voltages from the conductors, 60A and 60B of FIGS. 1 and 8, and functions generally as described in conjunction with FIGS. 6 and 7. More particularly, the rate-of-change control device 130 includes the differentiators 40A and 40B, which are shown in block-diagram form in FIG. 1, and a discriminator 134 that includes the comparators U2A, U2B, U2C, and U2D, the FET Q1, and a reed relay K3.

The differentiator 40A includes the operational amplifier U1A, a feedback resistor R9 that includes a resistor R10 and a potentiometer RV1, and a capacitor C3 that includes capacitors C4 and C5 that are placed back-to-back to make the capacitor C3 nonpolarized.

In like manner, the differentiator 40B includes the operational amplifier U1D, a feedback resistor R11 that includes a resistor R12 and a potentiometer RV2, and a capacitor C6 that includes capacitors C7 and C8 that are placed back-to-back to make the capacitor C6 nonpolarized.

The rate-of-change control device 130 further includes the fixed voltage divider FD1 with the resistors R2, R3, R4, and R5, and the junctions J1, J2, and J3.

The gate terminal G of the FET Q1 is connected to pins 2, 1, 14, and 13 of the comparators U2A, U2B, U2C, and U2D, respectively by the diode CR1. The resistor R8 is a pull-up resistor, and the pull-up resistor R8 and the capacitor C2 cooperate to provide the RC circuit RC1 that provides a predetermined time duration to pull down signals provided by the comparators U2A, U2B, U2C, and U2D. And, the Zener diode CR3 protects the gate G of the FET Q1.

Continuing to refer to FIG. 8, as noted above, the differentiators 40A and 40B each include the potentiometer, RV1 or RV2, that is in series with a respective resistor, R10 or R12. Thus, the potentiometers, RV1 and RV2, which are ganged together, as indicated by a phantom line, can be used to selectively adjust thresholds, dy/dt and dx/dt, that will actuate the rate-of-change control device 130.

Connection of the operational amplifier U1A and the comparator U2A to a voltage source and ground has been shown. More particularly, a resistor R13 has been added to the operational amplifier U1A that also provides power for the operational amplifier U1D, and a capacitor C9 has been included as a decoupling capacitor C9. Finally, capacitors C10 and C11 have been included in the differentiators 40A and 40B to enhance stability of differentiation.

The rate-of-change control device 130 adds the comparators U2C and U2D, to the comparators, U2A and U2B, that are used in the rate-of-change control device 120 of FIG. 7. In addition, connection of the four comparators, U2A, U2B, U2C and U2D to a voltage source by a resistor R14 is shown, together with a capacitor C12 that has been included as a decoupling capacitor. In place of the relay K2 of FIG. 7, the reed relay K3 is actuated by the FET Q1, whenever any of pins 2, 1, 14, or 13 of the comparators U2A, U2B, U2C, or U2D, changes to ground.

Operation of the rate-of-change control device 130 is the same as that described for the rate-of-change control device 120 of FIG. 7, except for adding the other operational amplifier, U1D, adding the comparators U2C and U2D, and substituting the reed relay, K3 for the relay K2 of FIG. 7.

Whereas the discriminator/combiner 42 of FIGS. 1 and 8 includes parts between the pins 1 and 14 of the operational amplifiers U1A and U1D and the conductor 116A, the discriminator 134 does not include a conductor 136 that ties the pins 2, 1, 14, and 13 together, nor the diode CR1.

Thus, a rate-of-change control device 132 provides switching operations in each of four conductors, 138A, 138B, 138C, and 138D, two each for each axis, X or Y. And, as each of the pins 2, 1, 14, and 13 goes to ground, the corresponding conductor 138A, 138B, 138C, or 138D goes low.

Figure 9:
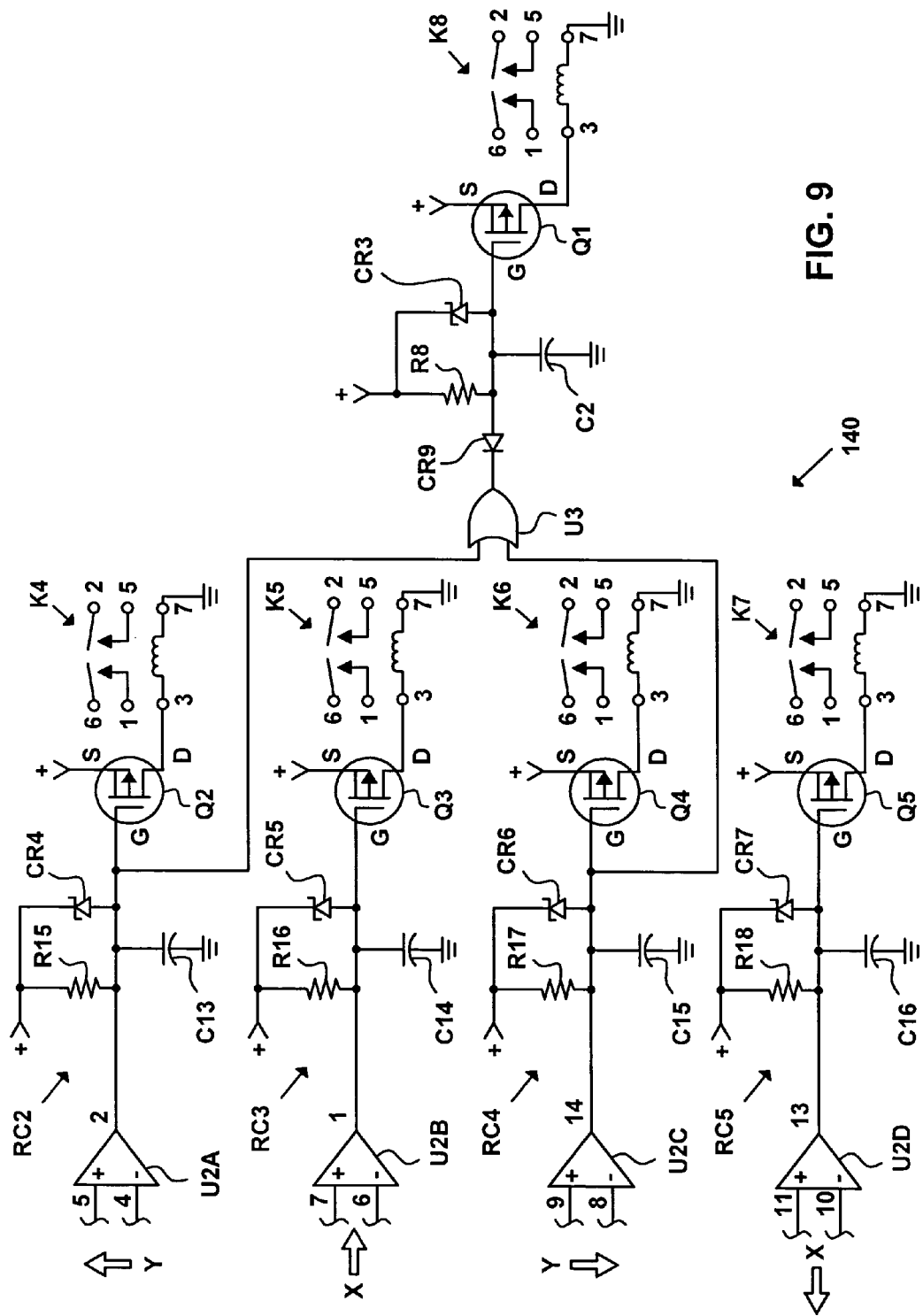
FIG. 9 is a schematic drawing of a rate-of-change control device in which a rate-of-change switching signal is produced in response to sequential inputs, in separate directions, to a single transducer.

Referring now to FIG. 9, a rate-of-change control device 140 includes some like-named and like-numbered parts as those of FIGS. 6, 7, and 8. More particularly, the rate-of-change control device 140 includes the differentiators 40A and 40B, the voltage divider FD1, and the comparators U2A, U2B, U2C, and U2D of FIG. 8. However, the differentiators 40A and 40B and the voltage divider FD1 are not shown in FIG. 9.

The rate-of-change control device 140 of FIG. 9 further includes four p-channel field-effect transistors (FETs) Q2, Q3, Q4, and Q5, whose gate terminals G are connected to respective ones of pins 2, 1, 14, and 13 of the comparators U2A, U2B, U2C, and U2D, and whose drain terminals D are connected to respective ones of four reed relays K4, K5, K6, and K7.

Pull-up resistors R15, R16, R17, and R18, capacitors C13, C14, C15, and C16, and the reed relays K4, K5, K6, and K7 are connected to respective ones of the four FETs Q2, Q3, Q4, and Q5. The pull-up resistors R15, R16, R17, and R18 and the capacitors C13, C14, C15, and C16 provide RC circuits RC2, RC3, RC4, and RC5 that lengthen the duration of a signal provided by one of the comparators, U2A, U2B, U2C, or U2D. Zener diodes CR4, CR5, CR6, and CR7 protect respective ones of the gates of the FETs Q2, Q3, Q4, and Q5.

Thus, four separately switching operations are provided by respective ones of the reed relays K4, K5, K6, and K7, which respond to differentiated electrical signals of the tilt X-Y transducer 16 of FIG. 1 in X and Y directions, as indicated by arrows and in X and Y designations to the left of respective ones of the comparators, U2A, U2B, U2C, and U2D.

In addition, outputs of the comparators U2A and U2C are connected to an OR gate U3 and a diode CR9. Since the output of the OR gate U3 is low only when both inputs are low, the OR gate U3 lowers the gate terminal G of the FET Q1 and actuates a reed relay K8 only when a transducer, such as the tilt transducers 38A and 38B of FIG. 2A, is actuated in one direction, followed closely by actuation in an other direction.

That is, if transducer actuation is in a direction, as indicated by an upward arrow at the left of the comparator U2A, pulling the output at pin 2 low, followed by operation downward, as indicated by a downward arrow to the left of the comparator U2C, pulling the pin 14 low during the time that the RC circuit RC2 is holding pin 2 low, the OR gate U3 will pull the gate of the FET Q1 downward, actuating the reed relay K8.

Figure 10:
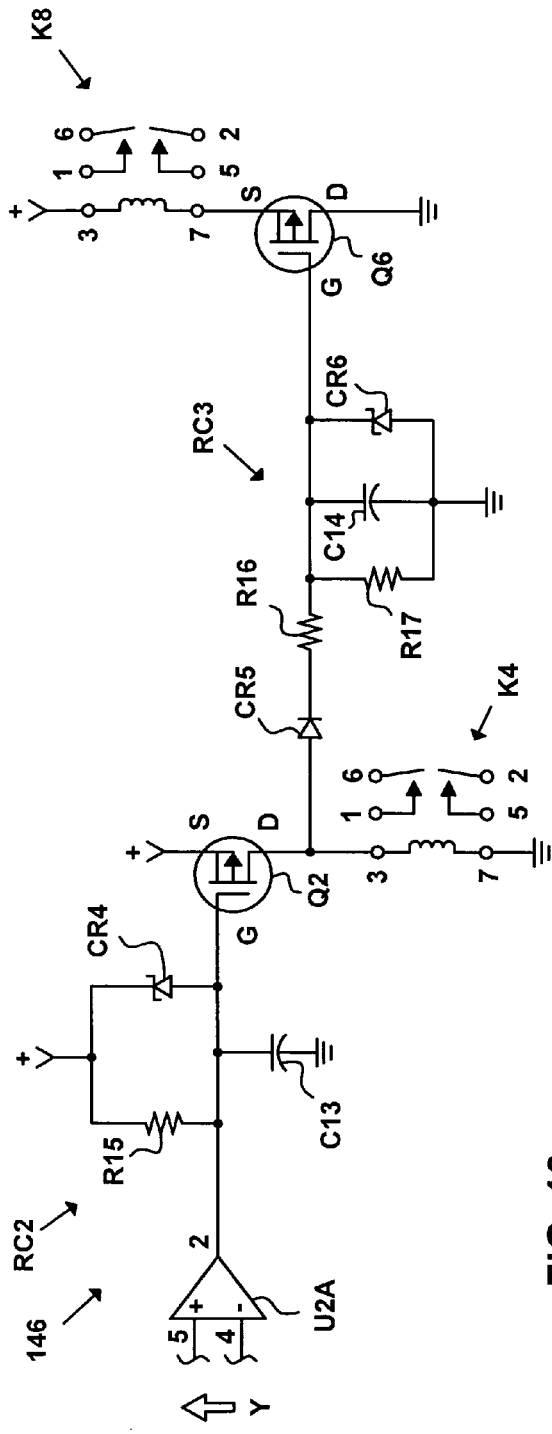
FIG. 10 is a schematic drawing of a rate-of-change control device in which a rate-of-change switching signal is produced in response to two separate and sequential inputs, in the same direction, to a single transducer.

Referring now to FIG. 10, a rate-of-change control device 146 includes some like-named and like-numbered parts as those of FIG. 9 and functions similarly. However, whereas in the rate-of-change control device 140 of FIG. 9, the reed relay K8 is actuated in response to A+B, in a rate-of-change control device 146 of FIG. 10, the reed relay K8 is actuated by two closely spaced lows from the same comparator, U2A.

In operation, when pin 2 of the comparator U2A goes low, the gate G of the p-channel FET Q2 is pulled down, causing the FET Q2 to conduct for a period of time that is determined by the RC circuit RC3.

With the FET Q2 conducting for a limited period of time, the capacitor C14 is partially charged, but not sufficiently to cause an n-channel field-effect transistor (FET) Q6 to conduct. However, if the comparator U2A produces a second low within a time period as determined by the RC circuit RC3, the capacitor C14 becomes sufficiently charged to cause the FET Q6 to conduct, thereby actuating the reed relay K8. The reed relay K4 operates as described in conjunction with FIG. 9.

Figure 11:
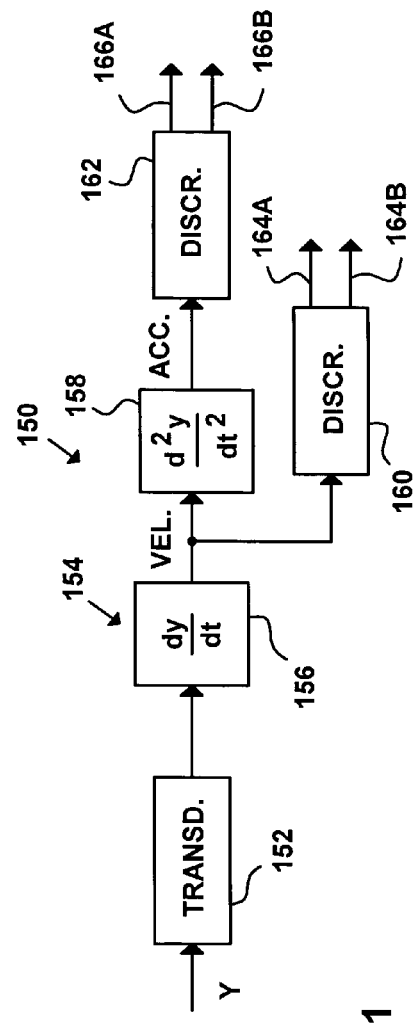
FIG. 11 is a block diagram of a rate-of-change control device in which an electrical signal of a mechanical-to-electrical transducer is differentiated twice, and either or both differentiated electrical signals may be used to control one or more devices.

Referring now to FIG. 11, a rate-of-change control device 150 is connected to a mechanical-to-electrical transducer 152 to provide a rate-of-change switch 154. The rate-of-change control device 150 includes first and second differentiators, 156 and 158, and first and second discriminators, 160 and 162.

Whether an input to the transducer 152 is either a planar or angular motion, the differentiator 156 produces a differentiated electrical signal that is the velocity (dy/dt) of the input of the transducer 152, and the second differentiator 158 produces a differentiated electrical signal that is the acceleration ($d^2y/dt^2$) of the input.

The first discriminator 160 produces two differentiated electrical signals, 164A and 164B, one each for increasing and decreasing velocities (dy/dt) of the Y input of the transducer 152 of FIG. 11, as taught in conjunction with FIG. 1. In like manner, the second discriminator 162 produces two differentiated electrical signals, 166A and 166B, one each for increasing and decreasing accelerations ($d^2y/dt^2$) of the Y input.

Figure 12:
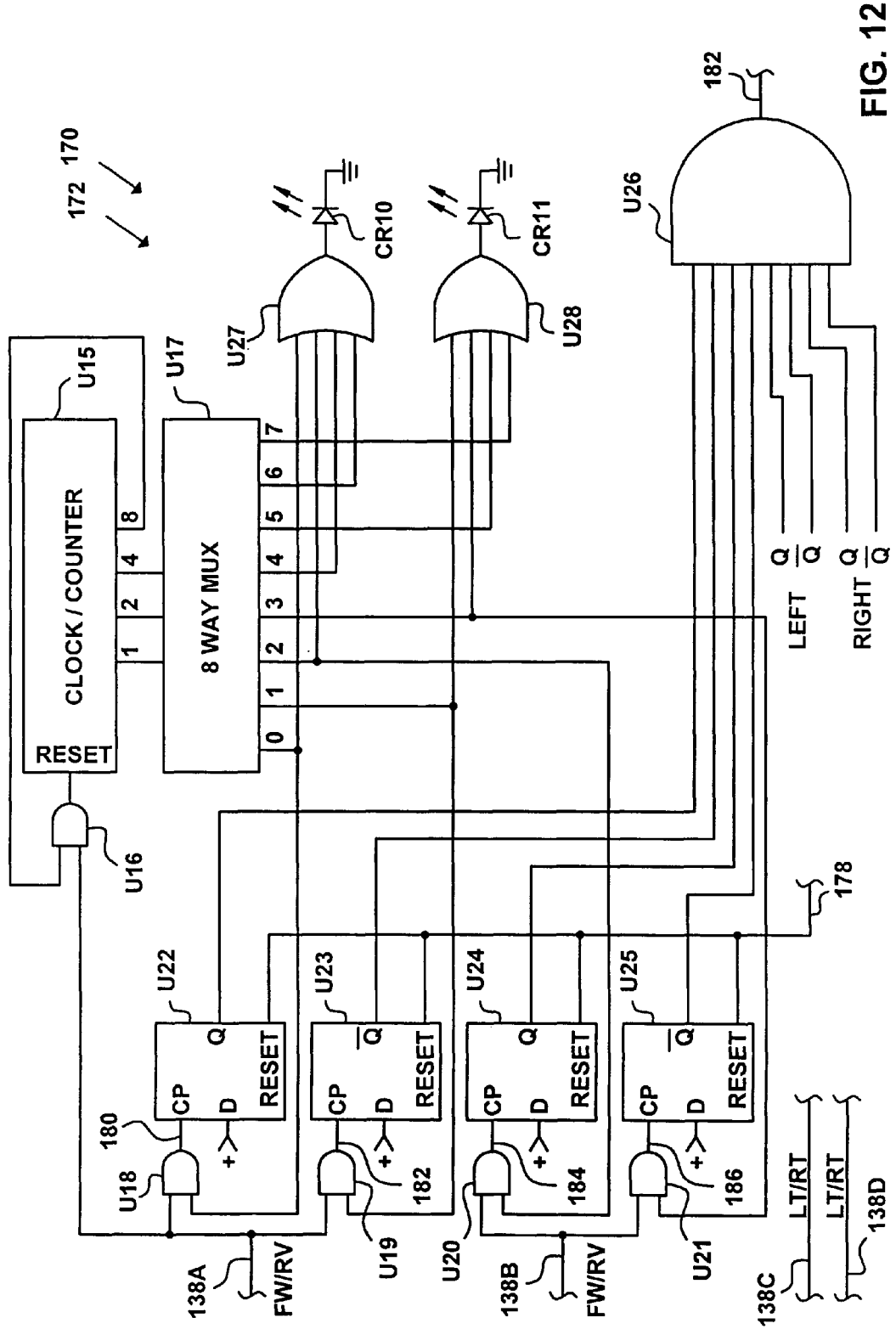
FIG. 12 is a schematic drawing of a portion of a rate-of-change control device in which differentiated electrical signals of two transducers perform timed-opportunity switching operations and task-selecting operations, and proportional electrical signals of the transducers control a wheelchair, and a proportional electrical signal of one of the transducers provides proportional control of selected tasks.
Figure 13:
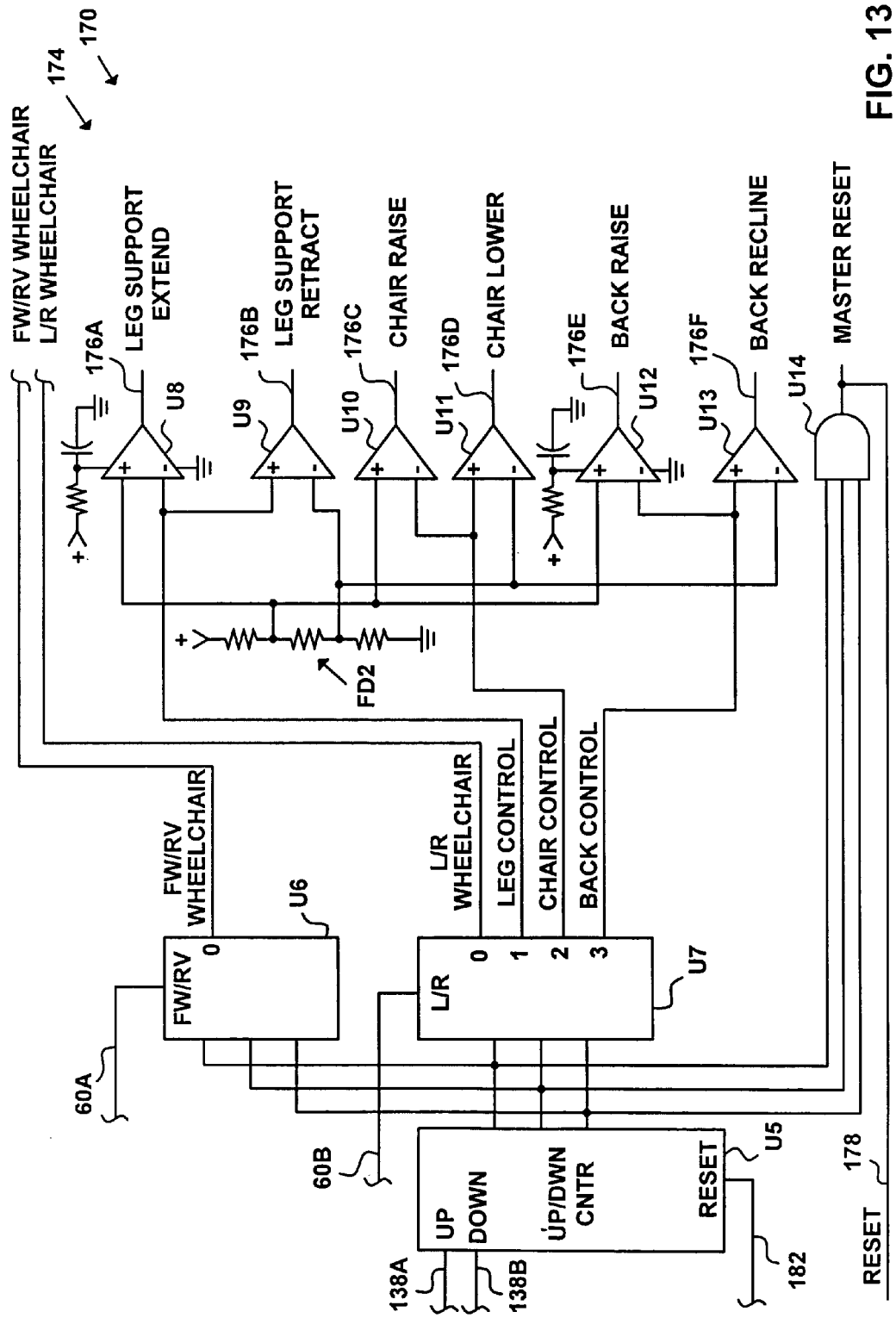
FIG. 13 is an other portion of the rate-of-change control device of FIG. 12.

Referring now to FIGS. 12 and 13, a control system 170 includes the rate-of-change control device 132 of FIG. 8, although not shown in either FIG. 12 or FIG. 13. The control system 170 is connected to conductors 138A and 138B, as shown in FIG. 12. In addition, the control system 170 of FIGS. 12 and 13 is connected to the conductors 60A and 60B, as shown in FIG. 13. The control system 170 further includes a sync pattern detector, or timed-opportunity switch, 172 of FIG. 12, and an environmental control unit (ECU) 174 of FIG. 13.

Referring now to FIG. 13, the ECU 174 allows the person 20 of FIG. 1 to selectively control the wheelchair 12 of FIG. 1, to access control of any reasonable number of tasks, such as a leg support extend task 176A, a leg support retract task 176B, a chair raise task 176C, a chair lower task 176D, a back raise task 176E, and a back recline task 176F, of FIG. 13.

Selection between control of the wheelchair 12 of FIG. 1, in a usual manner, such as by tilting the head 18 of FIG. 1, and selection of the tasks 176A-176F that are to be controlled, is achieved by UP and DOWN signals that are delivered to an incrementing UP/DOWN counter U5 of FIG. 13.

The UP and DOWN signals that are used to increment and decrement the UP/DOWN counter U5, preferably, are those produced in the conductors 138A and 138B by the rate-of-change control device 132 of FIG. 8, as shown by the conductors 138A and 138B of FIG. 13. However, optionally, the UP and DOWN signals may be produced by any kind of switch that will produce momentary contacts.

In response to repeated ones of UP signals in the conductor 138A of FIG. 13, the UP/DOWN counter U5, outputs 3 bits of digital information. Or, in response to DOWN signals, the UP/DOWN counter U5 decrements.

The digital information produced by the UP/DOWN counter U5 is connected to two analog multiplexors, U6 and U7, both of which include outputs 0-7 (not all outputs shown.) An input terminal FW/RV of the multiplexer U6 is connected to the forward/reverse propulsion signals in the Y-axis conductor 60A of FIG. 1, and an input terminal L/R of the multiplexer U7 is connected to the left/right turn signals in the X-axis conductor 60B of FIG. 1.

Thus, the multiplexer U6 inputs and outputs voltages that are produced in the Y-axis conductor 60A by the X-Y transducer 16 in response to movements of the head 18 forward and backward, as shown in FIG. 1. In like manner, the multiplexer U7 inputs and outputs voltages that are produced in the X-axis conductor 60B by the X-Y transducer 16 in response to movements of the head 18 to the left and to the right.

When the UP/DOWN counter U5 is indexed, by UP or DOWN signals, to a position wherein all three output bits are zeros, the multiplexer U6 is in a zero position and connects the Y-axis conductor 60A to the wheelchair 12. In like manner, the multiplexer U7 connects the X-axis conductor 60B to the wheelchair 12. Thus, when the UP/DOWN counter U5 is in its zero input position, the wheelchair 12 of FIG. 1 is controlled by selective positioning of the head 18.

When the UP/DOWN counter U5 is indexed to any position other than the zero position, the forward/reverse voltages of the Y-axis conductor 60A are removed from the wheelchair 12, and turn-signal voltages of the X-axis conductor 60B also are removed from the wheelchair 12.

When, in response to UP or DOWN signals, the UP/DOWN counter U5 is indexed to other positions, control of a task, such as the tasks 176A-176F, becomes controllable through the multiplexer U7 in response to movements of the head 18 of FIG. 1 to the left or to the right. As shown in FIG. 13, the tasks 176A-176F include, respectively: leg support/extend; leg support/retract; chair raise; chair lower; back raise; and back recline.

That is, in response to left and right tilting of the head 18 of FIG. 1, turn-signal voltages are produced, and these turn-signal voltages are used to control selected ones of the tasks 176A-176F. More particularly, the turn-signal voltages and voltages from a fixed voltage divider FD2 are delivered to a selected one of comparators U8-U13, so that the selected comparator activates one of the selected tasks, 176A-176F.

Summarizing operation of the control system 170, as described thus far, selection between control of the wheelchair 12 of FIG. 1 and control of the tasks 176A-176F is made by momentary contact switching, which, preferably, is achieved by relatively rapid tilting of the head 18 of FIG. 1 in forward and backward directions. And, control of one of the selected tasks, 176A-176F, is made by left/right tilting of the head 18.

That is, control of the UP/DOWN counter U5, and selection of the tasks, 176A-176F, by the multiplexer U6, is by momentary contact switching. Preferably, this momentary contact switching is achieved by relatively rapid forward and backward tilting of the head 18 of FIG. 1, by differentiation of the forward/reverse signal voltage of the Y-axis conductor 60A of FIG. 1, by the differentiator 40A of FIG. 8, and by momentary contact switching produced by the discriminator 134 of FIG. 8.

Escape from the ECU 174, and shut-down of the control system 170, is achieved by incrementing the UP/DOWN counter U5 to its maximum input, that is, to a position wherein all outputs are at a digital 1. With all outputs at a digital 1, all three inputs of an AND gate U14 are at a digital 1, so that a digital 1 output is produced in a reset conductor 178 of FIGS. 12 and 13.

Referring again to FIGS. 12 and 13, and more particularly to FIG. 12, the sync pattern detector 172 responds to momentary contact switching that is produced by any means, or any type of switch. However, preferably, momentary contact switching is produced by the rate-of-change control device 132 of FIG. 8, as indicated by the conductors 138A and 138B of FIG. 12.

The sync pattern detector 172 requires a pattern of input signals that provides assurance that the person 20 of FIG. 1 is lucid, rather than being incapable of beneficial use of the control system, whether due to medication, or any other reason.

More particularly, the sync pattern detector 172 requires relatively rapid tilting of the head 18 of FIG. 1, sequentially in forward, backward, leftward, and rightward directions. In addition, the sync detector 172 requires that the person 20 refrain from tilting the head 18 rapidly during periods that are interspersed between the required tiltings of the head 18.

To help the person 20 achieve successful activation of the control system 170, a green light-emitting diode (LED) CR10 is illuminated when head tilting is required, and a red light-emitting diode (LED) CR11 is illuminated when the person 20 must refrain from rapid tilting of the head 18.

A clock/counter U15 is in a quiescent state when it is setting at a count of 8, wherein further counting is inhibited, and all bistable multivibrators U22-U25 are reset, and the green LED CR10 is illuminated.

To initiate, or enable, the control system 170, the person 20 of FIG. 1 rapidly tilts the head 18 forward in a Y direction, producing a forward-propulsion output signal in the Y-axis conductor 60A, and thereby producing momentary-contact switching in the conductor 138A of FIG. 12 that is switched as a function of dy/dt.

This momentary contact switching in the conductor 138A, as applied to an AND gate U16, cooperates with a signal from the clock/counter U15, that is present when the clock/counter U15 is at the 8 count, to start the clock/counter U15 counting upwardly from zero at intervals that may be about one second.

A three-bit output of the clock/counter U15 is connected to an 8-way MUX, or decoder, U17 that sequentially delivers a digital output to AND gates U18-U21, and to four additional AND gates, not shown, same as AND gates U18-U21, but connected to the conductors 138C and 138D. Thus, in sequence, the AND gates U18-U21 are provided one of the signals that each AND gate, U18-21, requires to produce an output in one of conductors generally labeled 180, 182, 184, or 186.

Each of the AND gates U18-U21 is connected to a respective one of the bistable multivibrators U22-U25 by one of the conductors 180, 182, 184, or 186. As shown, Q outputs of the bistable multivibrators U22 and U24 are connected to an AND gate U26, and NOT Q outputs of the bistable multivibrators U23 and U25 also are connected to the AND gate U26.

Therefore, if inputs, produced by tilting the head 18 of FIG. 1, occur at prescribed time intervals and in the prescribed order of tilting, and if the head 18 is not tilted rapidly at intermediate time intervals, the AND gate U26 will be satisfied at the expiration of clocked time intervals, and the AND gate U26 will produce an output in the conductor 182 of FIG. 12, thereby removing the reset input to the UP/DOWN counter U5, of FIG. 13, which is connected to the conductor 182, thereby initiating control of the ECU 174 over the wheelchair 12 of FIG. 1 and the tasks 176A-176F of FIG. 13.

As mentioned previously, the green LED CR10 and the red LED CR11 indicates times when signals must be inputted into the sync pattern detector 172, and times when signals must not be inputted into the sync pattern detector 172. The green LED CR10 and the red LED CR11 are illuminated in accordance with sequential outputs of the decoder U17 and OR gates U27 and U28.

While only Y-axis components of the sync pattern detector 172 have been shown, the conductors 138C and 138D of FIGS. 8 and 12, together with Q and NOT Q signals of FIG. 12, for LEFT and RIGHT signals, make it abundantly clear that four more AND gates and four more bistable multivibrators, neither shown, can be added to make the sync pattern detector 172 require four sequential movements of the head 18 in the order described with NOT Q outputs interposed.

Figure 14:
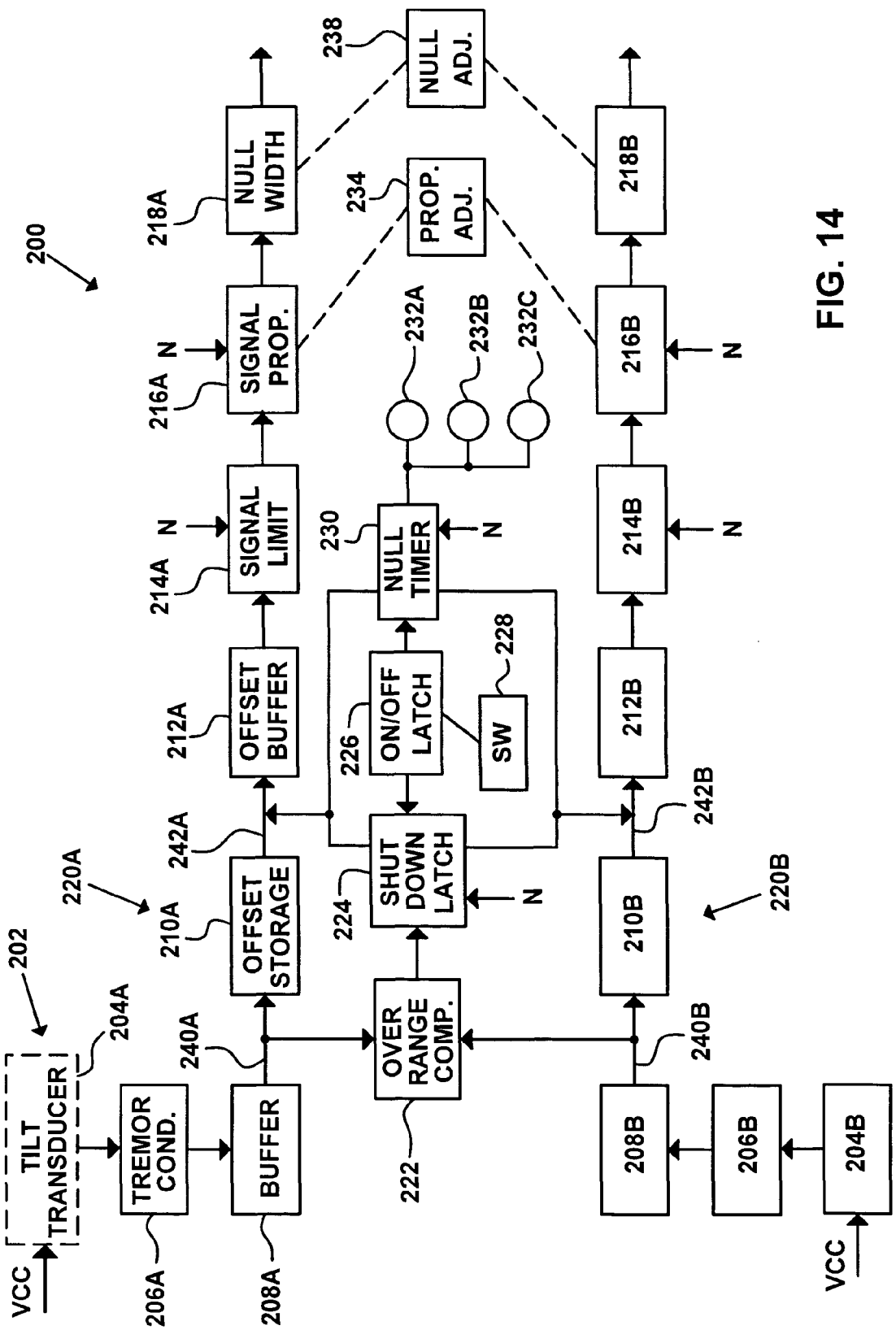
FIG. 14 is a block diagram of a power interface, showing components for one axis in labeled boxes, showing components for the other axis in boxes that are numbered but not labeled, and interposing labeled boxes for components that function with both axes, but omitting turn-signal conditioning components.

Referring now to FIG. 14, a signal conditioner, or power interface 200, operates in response to x and y electrical outputs, or signal voltages, produced by X and Y mechanical-to-electrical transducers, or a first human input device, 202, which are shown in phantom, and which include tilt transducers, 204A and 204B. Any suitable mechanical-to-electrical X and Y transducers may be used, whether in a single package, such as the tilt X-Y transducer 16 of FIGS. 1, 15A, and 15B, the joystick X-Y controller 17 of FIG. 2C, or separate tilt transducers 38A and 38B of FIG. 2A.

Figures 19, 20:
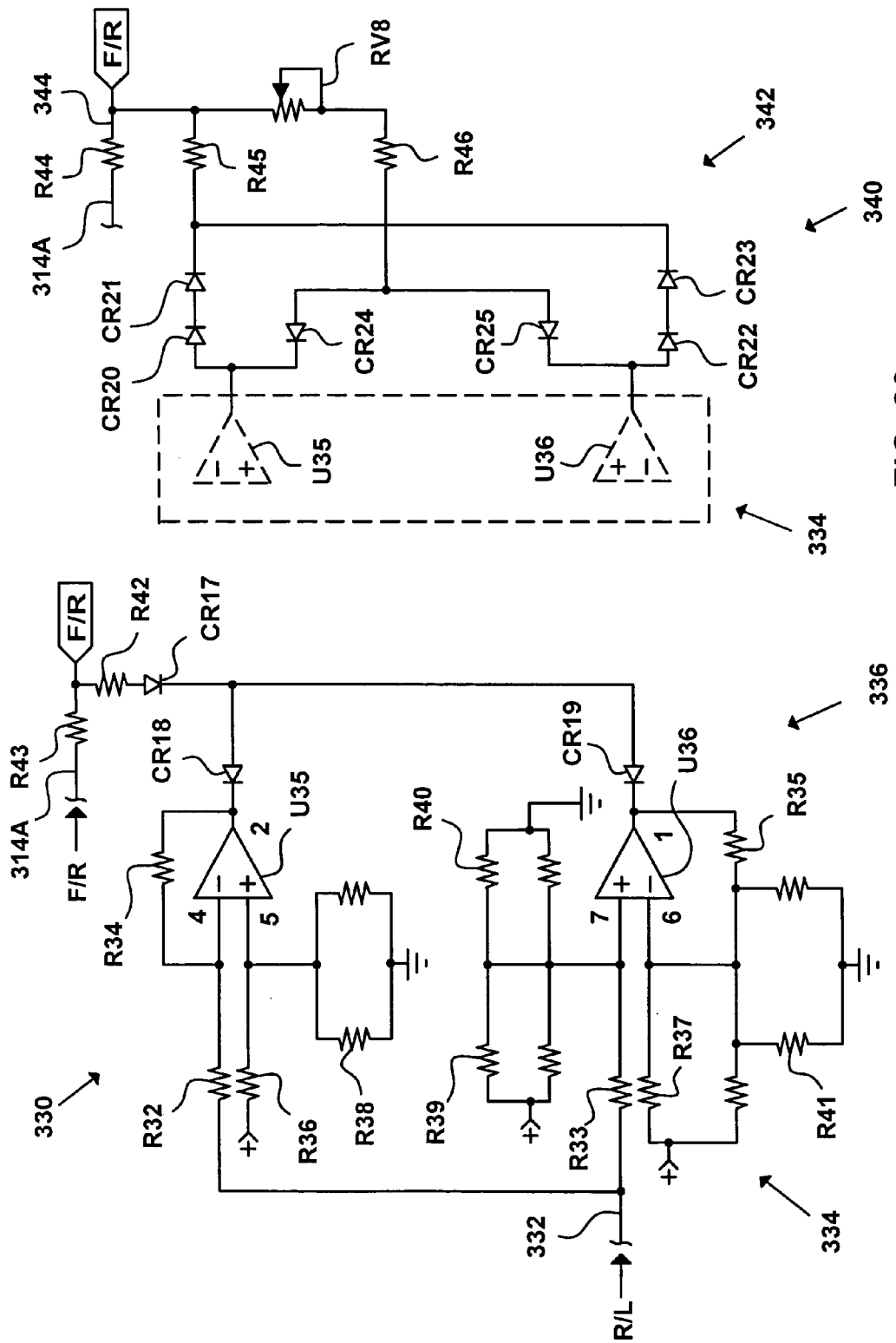
FIG. 19 is a schematic drawing of a turn-signal conditioner that is usable with the power interface of FIG. 14 when transducers are of the type shown in FIG. 2A or 2C, and that condition forward speed signals as a function of turn signals.
FIG. 20 is a schematic drawing of a turn-signal conditioner that also is usable as a part of the power interface of FIG. 14 when transducers are of the type shown in FIG. 2A or 2C, and that conditions both forward and reverse speed signals as a function of turn signals.

The power interface 200 is usable with transducers oriented with respect to X and Y axes as shown in FIG. 2A, or as oriented as shown in FIG. 2B. With either transducer orientation, optionally, but preferably, a turn-signal conditioner is used in conjunction with the power interface 200. When transducers are oriented as shown in FIG. 2A, the turn-signal conditioner of FIG. 19 is preferred. But, when transducers are oriented as shown in FIG. 2B, a turn-signal conditioner, such as taught by Lautzenhiser in U.S. Pat. No. 5,635,807, should be used.

When two separate tilt transducers, 38A and 38B of FIG. 2A or 2B are used, Inclinometers, Part No. SCA600 CBBH1, manufactured by VTI Hamlin, Farmington Hills, Mich., are preferred. An other preferred tilt transducer is, Inclinometer, Part No. ADXL202, manufactured by Analog Devices, Norwood, Me., which includes both tilt transducers, 38A and 38B of the tilt X-Y transducer 16, of FIGS. 1, 15A, and 15B, in a single unit.

Referring again to FIG. 14, it should be noticed that there are three different groups of boxes, or blocks, in the block diagram of the power interface 200 of FIG. 14.

In a first group, located closest to the bottom of the drawing, the boxes are numbered, but they are not labeled. These unlabeled boxes pertain to control signals produced by the tilt transducer 204B.

A second group of boxes, located closest to the top of the drawing, is the same as the unlabeled boxes, except that labels are inserted into the boxes. This second group of boxes pertain to control signals produced by the tilt transducer 204A.

A third group of boxes is disposed between the other two groups. This labeled group of boxes pertain to control signals produced by both tilt transducers 204A and 204B.

Continuing to refer to FIG. 14, the first and second groups of boxes of the power interface 200 include tremor conditioners, 206A and 206B, buffers, 208A and 208B, offset storage devices, or offset storage capacitors, 210A and 210B, offset buffers, 212A and 212B, signal limiters, 214A and 214B, signal proportioners, 216A and 216B, and null-width generators, 218A and 218B.

The buffers 208A and 208B, the offset storage devices 210A and 210B, and the offset buffers 212A and 212B, cooperate to provide null compensators 220A and 220B, respectively.

The third group of boxes of the power interface 200 includes an overrange comparator 222, a shut-down latch 224, an ON/OFF latch 226, a momentary-contact switch 228, a null timer 230, an amber LED standby indicator 232A, a blue LED delay indicator 232B, and a green LED active indicator 232C. A proportionality adjuster 234 is connected to one or both of the signal proportioners, 216A and 216B, and a null-width adjuster 238 is connected to one or both of the null-width generators, 218A and 218B.

The overrange comparator 222 is connected to conductors 240A and 240B. The shut-down latch 224 is connected to conductors 242A and 242B, and the null timer 230 is also connected to the conductors 242A and 242B.

A null voltage N, which preferably is a positive dc voltage, and which usually is approximately one-half of the supply voltage, is developed by a null-voltage divider, or null-voltage generator, which will be numbered and described subsequently in conjunction with FIG. 17A. For now, it is important to know that wherever the capital N appears on FIG. 14, a precise null voltage, that preferably is about one-half of the supply voltage, is supplied.

Referring now to FIGS. 1 and 14, while the power interface 200 may be used to control various types of controllable devices, it may be connected to the electric motors 34A and 34B, of FIG. 1, which are drivingly connected to the wheels 36A and 36B of FIG. 1.

Referring now to FIGS. 1, 2A, 2B, 14, 15A, and 15B, while user-actuation of the transducers 16, 38A and 38B, 39A and 39B, or 204A and 204B, may be by any suitable means, such as movement of any body member, in the discussion that follows it will be assumed that the tilt X-Y transducer 16 of FIGS. 1, 15A, and 15B is mounted onto the head 18, the hand 64, the finger 67, or an other body member, of FIGS. 1 and 5, by any suitable means.

Further it is assumed that the tilt X-Y transducer 16 has been adjusted, both fore and aft and side to side, to be aligned approximately with null angles, or horizontal angles, 248 and 250, of FIGS. 15A and 15B, respectively, when the head 18 of the person 20 is in a comfortable position.

Referring again to FIG. 14, in the following discussion, only electrical outputs produced by the tilt transducer 204A, and components that pertain to electrical signals produced by both the tilt transducers, 204A and 204B, will be considered, since this discussion may also be applied to electrical signals produced by the tilt transducer 204B.

Assume that a switch, not shown, which is preferably voice actuated, has been thrown to provide electrical power from a battery, not shown, to the power interface 200. At this time, the amber LED standby indicator 232A is turned on.

A preferred component for voice actuation of the aforementioned switch is manufactured by Sensory, Inc. of Sunnydale, Calif. The part name is "Voice Direct," and the part number is RSC-264T.

Referring now to FIGS. 14, 15A, and 15B, but when the person 20 of FIGS. 1, 15A and 15B is ready to move, he activates the momentary-contact switch 228 with his head 18, or activates some other switch, by any suitable means, such as the rate-of-change control device 22 of FIG. 1, a sound-pressure switch as taught in U.S. patent application Ser. No. 09/801,201, filed Mar. 7, 2001, and incorporated herein by reference thereto, or the voice-actuated component listed above, thereby latching the ON/OFF latch 226 of FIG. 14 to ON, starting the null timer 230. The null timer 230 provides an adjustable time delay.

At the start of the time delay, the amber LED standby indicator 232A is turned OFF, the blue LED delay indicator 232B is turned ON, and the green LED active indicator 232C is turned on.

Assuming that the person 20 has tilted his head 18 sideways to activate the momentary-contact switch 228, at least one of the tilt transducers, 204A or 204B, is producing a signal voltage that is far from the null voltage.

After tilting his head 18 sideways to activate the momentary-contact switch 228, the person 20 then moves his head 18 back to a comfortable position wherein the X-Y transducer 16 is approximately aligned with the null angles, or horizontal angles, 248 and 250 of FIGS. 15A and 15B, respectively.

Subsequently, the person 20 will be able to control speeds and turns of the power wheelchair 12 of FIG. 1 by tilting his head 18 within head inclination angles, or tilt angles, 252A and 252B of FIG. 15A, and within head inclination angles, or tilt angles, 254A and 254B of FIG. 15B.

However, after moving his head 18 to approximately the null angles, 248 and 250, the X-Y transducer 16 of FIG. 1 produces approximately nulled voltages.

That is, if a 10.0 volt system is used, and a null voltage N is 5.0 volts, then an approximate null position of the tilt X-Y transducer 16 will produce a signal voltage roughly in the range of 4.0 to 6.0 volts, which is one volt above or below the null voltage, more or less.

During the time delay of the null timer 230, which may be adjustable to times preferably in the range of 0 to 7 seconds, the null timer 230 applies the null voltage N to the conductor 242A, holding the voltage in the conductor 242A to a precise null voltage.

If the person 20 has Parkinson's disease, or some other tremor-inducing disease, one or both of the tilt transducers, 204A and/or 204B, most likely will produce a tremoring approximate-null voltage, or a tremoring electrical signal 260, as shown by a tremoring voltage curve 262 of FIG. 16A. The tremoring approximate-null voltage 260 may be, on the average, a volt or so higher or lower, as shown by an approximate-null electrical signal 263, than the precise null voltage N which is shown in FIG. 16A as a precise-null electrical signal 261.

As the tremoring approximate-null voltage 260 from the tilt transducer 204A is applied to the tremor conditioner 206A, tremoring voltages are averaged, so that a tremor-controlled voltage curve 264 of FIG. 16B is produced, and a tremor-controlled approximate-null voltage 266 is produced.

The buffer 208A operates as a follower, faithfully reproducing the output of the tilt transducer 204A in the conductor 240A, so the output of the buffer 208A is also represented by FIG. 16B.

In the meantime, the conductor 242A of FIG. 14 is being held at the null voltage N, and the offset buffer 212A serves as a follower, holding its output to the null voltage N.

Therefore, the offset storage capacitor 210A is subjected to a nulling voltage. That is, the offset storage capacitor 210A is subjected to a signal voltage in the conductor 240A that is produced by the tilt transducer 204A and averaged by the tremor conditioner 206A, and that may be either higher or lower than the precise null voltage N. And, the offset storage capacitor 210A is subjected to a voltage in the conductor 242A that is held to the precise null voltage N.

Thus, it can be seen that the offset storage capacitor 210A stores a voltage that is the difference between the approximate-null voltage 266 of FIG. 16B, which may vary a volt or so from the null voltage N, and the precise null voltage of the null voltage N.

At the end of the time delay produced by the null timer 230, the null voltage N is removed from the conductor 242A, and the blue LED delay indicator 232B is turned OFF, but the green LED active indicator 232C stays on.

At this time, although, the tilt transducer 204A may be developing a signal voltage that would normally cause the power wheelchair 12 of FIG. 1 to lurch forward. And, although the null voltage N has been removed from the conductor 242A, the offset storage capacitor 210A and the offset buffer 212A cooperate to compensate for the approximate-null voltage 266 of FIG. 16B, so that the power wheelchair 12 does not move.

That is, the approximate-null voltage 266 of FIG. 16B is increased or decreased to a corrected null voltage, or null-compensated signal, 268 in a signal voltage curve 270 of FIG. 16C.

Therefore, instead of lurching forward because of the tremoring approximate-null voltage 260 of FIG. 16A, or the approximate-null voltage 266 of FIG. 16B, the power wheelchair 12 of FIG. 1 does not move until the person 20 of FIGS. 15A and 15B tilts his head 18 to actuate the tilt X-Y transducer 16.

From this time on, until the next shutdown, the null compensator 220A, which includes the buffer 208A, the capacitor 210A, and the offset buffer 212A, offsets the electrical signal of the tilt transducer 204A, so that voltages delivered to the signal limiter 214A are compensated for the approximate-null voltage 266, of FIG. 16B, that was produced during the time delay.

At the end of the time delay produced by the null timer 230, the green LED active indicator 232C stays on, but the blue LED delay indicator 232B is turned off. The person 20 of FIGS. 15A and 15B can now control both speed and turns of the power wheelchair 12 by selectively tilting his head 18 toward tilt angles 252A, 252B, 254A, and 254B.

Leaving consideration of signal voltages produced by the offset buffer 212A of the null compensator 220A, it is time to consider the overrange comparator 222. Referring again to FIG. 14, the overrange comparator 222 cooperates with the shut-down latch 224 to limit maximum signal voltages 272A and 272B of a signal voltage curve 274, as shown in FIG. 16D, that can be produced by the tilt transducer 204A without incurring a shutdown of the power interface 200 of FIG. 14 and the power wheelchair 12 of FIG. 1.

Whenever a signal voltage produced by the tilt transducer 204A of FIG. 14 goes beyond either of the maximum signal voltages, 272A or 272B, of the signal voltage curve 274, either plus or minus, the overrange comparator 222 and the shut-down latch 224 cooperate to apply the null voltage N to the conductor 242A, thereby initiating a shutdown.

That is, whenever the conductor 242A is brought to the null voltage N, by any means, the offset buffer 212A holds its output to the null voltage N, and the power wheelchair 12 of FIG. 1 stops.

Prior to overrange shutdown, the green LED active indicator 232C is lit. Now, to indicate shutdown, preferably the amber LED standby indicator 232A and the green LED active indicator 232C flash alternately. By these flashing lights, if the person 20 is conscious, and is able to control the power wheelchair 12, he knows that he has overranged the tilt X-Y transducer 16, and that he must restart the power interface 200.

The overrange comparator 222 provides a safety device for an occasion in which the tilt X-Y transducer 16 may be knocked from the head 18 of the person 20 of FIGS. 15A and 15B. Also, the overrange comparator 222 provides a safety device for any occasion in which the person 20 may drop his head 18, due to sleep, unconsciousness, or some involuntary muscle disorder.

In any of these situations, instead of the power wheelchair 12 of FIG. 1 moving dangerously out of control, the overrange comparator 222 and the shut-down latch 224 cooperate to apply the null voltage N to the conductor 242A. With the conductor 242A held to the null voltage N, the power wheelchair 12 comes to a safe stop.

The person 20, if conscious and both mentally and physically able, after repositioning his head 18 to approximate null angles 248 and 250 of FIGS. 15A and 15B, respectively, may restart the power interface 200 by actuating the switch 228 with his head 18, thereby toggling the ON/OFF latch 226 to OFF. With the ON/OFF latch 226 toggled to OFF, the shut-down latch 224 is released, and the power interface 200 is ready to restart.

As shown in FIG. 14, preferably, the overrange comparator 222 is connected to the conductor 240A wherein the approximate-null voltage 266 of FIG. 16B exists. However, the overrange comparator 222 may be connected to the conductor 242A, so that the overrange comparator 222 is actuated by the corrected null voltage, or null compensated signal 268 of FIG. 16C.

Returning now to consideration of signal voltages exiting from the offset buffer 212A, and referring now to FIG. 16E, signal voltages delivered to the signal limiter 214A from the offset buffer 212A are limited to voltages, 276A and 276B of a signal voltage curve 278 of FIG. 16E.

The limited voltages, 276A and 276B, are limited to magnitudes that are reasonable for the most skilled person 20 of FIGS. 15A and 15B, and his ability in positioning his head 18 to achieve the desired control of speeds and turns of the power wheelchair 12 of FIG. 1. More particularly, the signal limiter 214A limits maximum speeds of the power wheelchair 12 to a safe value for the most skilled person 20.

It should be noticed that, since the overrange comparator 222 is upstream of the signal limiter 214A, the signal limiter 214A can function to limit maximum voltages without interfering with the overrange comparator 222.

Next, voltages from the signal limiter 214A are delivered to the signal proportioner 216A and are adjustably proportioned in accordance with the skill of a particular person 20 of FIGS. 15A and 15B by selectively adjusting the proportionality adjuster 234, thereby producing a proportioned voltage curve 280 of FIG. 16F.

Proportioned voltages are then delivered to the null-width generator 218A of FIG. 14, wherein null widths 282A and 282B of FIG. 16G are selectively provided in a signal voltage 284 of a signal curve 286. The null width 282A extends upward from the null voltage N, or precise-null electrical signal 261, to a null-hi electrical signal 288A, and the null width 282B extends downward from the null voltage N to a null-lo electrical signal 288B. The null widths 282A and 282B are selectively adjusted by the null-width adjuster 238.

With regard to FIGS. 17-20, for the reader's convenience, manufacturer's pin numbers are included on the drawings, whether or not these pin numbers are used in the detailed description. In addition, connections to bipolar transistors and mosfets are labeled for the convenience of the reader, whether or not they are used in the detailed description.

Figures 17, 17A:
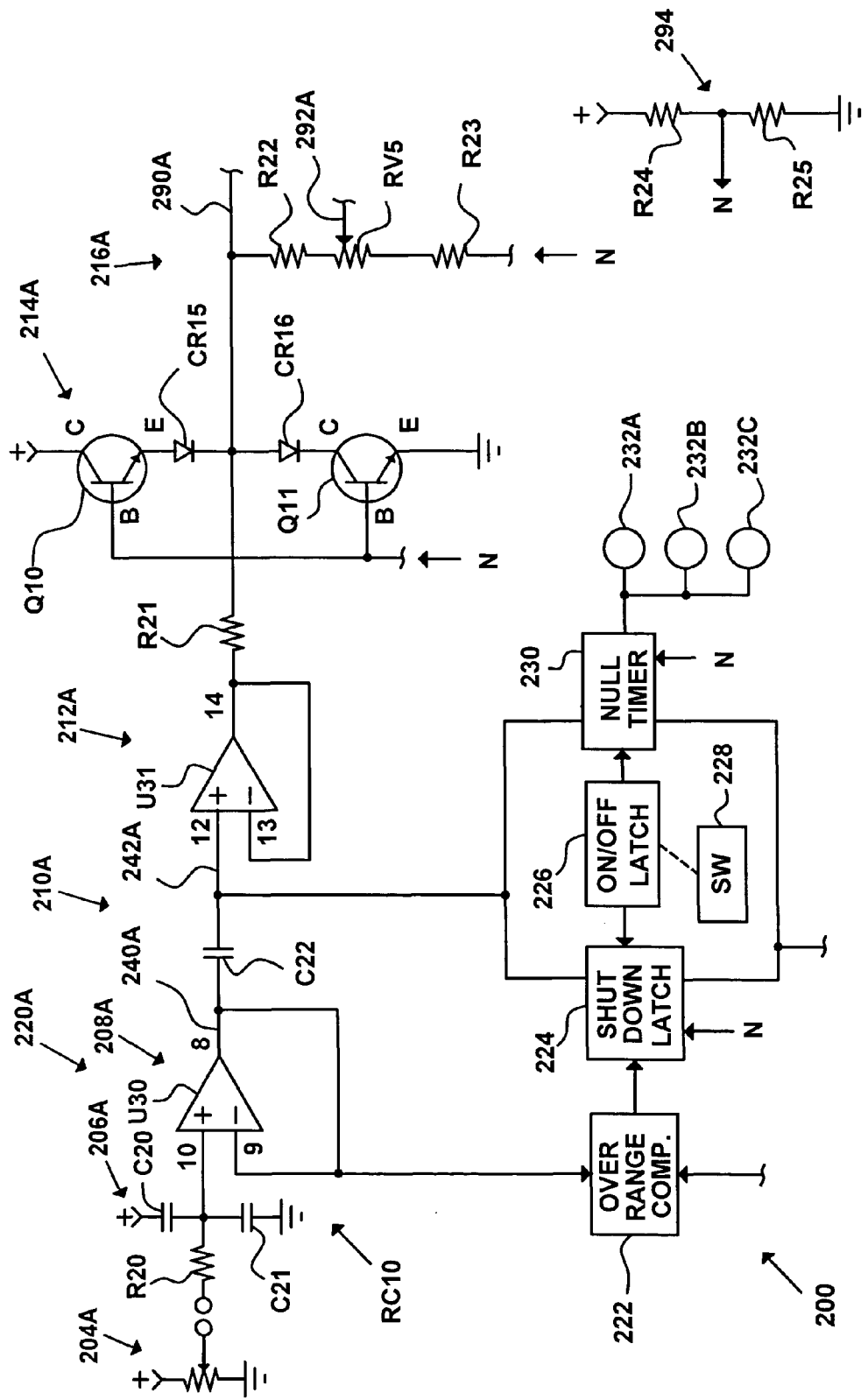
FIG. 17 is a schematic and a block diagram of a portion of the power interface of FIG. 14, showing components used for one axis of the power interface of FIG. 14, except for omitting the null-width generator, and except for omitting the turn-signal conditioner.
FIG. 17A is a null-voltage generator for use with the power interface of FIGS. 14 and 17.

Referring now to FIGS. 14 and 17, FIG. 17 includes some of the labeled boxes of the power interface 200 of FIG. 14, but omits all unlabeled boxes. That is, FIG. 17 includes portions that pertain to the tilt transducer 204A, and includes labeled boxes that cooperate with control signals produced by both tilt transducers, 204A and 204B, but omits portions of the power interface 200 that pertain to the tilt transducer 204B.

Referring now to FIG. 17, the tremor conditioner 206A, which receives a signal voltage from the tilt transducer 204A, includes a resistor R20 and capacitors, C20 and C21. The resistor R20 and the capacitors C20 and C21 cooperate to form a RC circuit RC10 that provides tremor control, as previously discussed in conjunction with FIGS. 14, 16A, and 16B.

The buffer 208A receives the conditioned signal voltage from the tremor conditioner 206A at pin 10. The buffer 208A is a high input-impedance operational amplifier U30 that is connected, as shown, to provide a high-isolation follower, so that the smoothed voltages produced by the tremor conditioner 206A are reproduced in pin 8.

The offset storage device 210A receives the approximate-null voltage 266 of FIG. 16B from the tremor conditioner 206A through the conductor 240A. The offset storage device 210A is a capacitor C22 of the type that will hold its charge for extended periods of time by virtue of using polyester insulation.

The offset buffer 212A is a high input-impedance operational amplifier, U31. Pin 12 of the operational amplifier U31 is connected to the capacitor C22 by the conductor 242A, and the operational amplifier U31 is connected as shown to provide a high-isolation follower.

The null timer 230 holds the conductor 242A at the null voltage N. Thus, the approximate-null voltage 266 in the conductor 240A, as shown by the curve 264 of FIG. 16B, and the null voltage N, cooperate to apply a charging voltage across the capacitor C22, which is the difference between the approximate-null voltage 266, and a precise null voltage, which is the null voltage N.

At the end of the time delay provided by the null timer 230, the null voltage N is removed from the conductor 242A. Thereafter, changes in a signal voltage produced by the tilt transducer 204A are reproduced in pin 14 of the operational amplifier U31 by the offset buffer 212A, except that the signal voltages are corrected to compensate for the approximate null voltage that is produced by inexact mounting of the X-Y transducer 16 on the head 18 of the person 20 of FIGS. 15A and 15B, and/or inexact positioning of the head 18 during the time delay.

Successful operation of the null compensator 220A, which includes the buffer 208A, the offset storage capacitor 210A, and the offset buffer 212A, depends upon holding a precise charge in the offset storage capacitor 210A for hours at a time. In the present invention, this has been achieved by three factors.

The offset storage capacitor 210A is of the polyester type that has extremely low internal leakage, and that has an extremely slow self-discharge rate. Secondly, the buffers 208A and 212A are FET technology operational amplifiers and have extremely high impedances. They operate in accordance with voltage levels, rather than currents, so they do not place a current drain on the offset storage capacitor 210A. Thirdly, any relays that would discharge the capacitor C22 are of a high-isolation type.

The corrected null voltage, or null compensated signal 268, is delivered to the signal limiter 214A by a resistor R21 and a conductor 290A. The signal limiter includes npn transistors Q10 and Q11 and diodes CR15 and CR16 that are connected between the source voltage and ground, as shown. The base B of each transistor, Q10 or Q11, is connected to the null voltage.

When the signal voltage in the conductor 290A is greater than the null voltage by approximately 2.5 volts, the transistor Q11 will conduct pulling the signal voltage downwardly toward null, causing a voltage drop across the resistor R21. Conversely, when the signal voltage in the conductor 290A is less than the null voltage by approximately 2.5 volts, the transistor Q10 will conduct pulling the signal voltage upwardly.

As will be apparent to those skilled in the art, upper and lower limits of the signal limiter 214A depend upon the type of transistors that are used, and both the type and the number of diodes that are used, if any. That is, for a closer range between upper and lower limits, the diodes, CR15 and CR16, may be omitted, and for a higher range, more diodes may be inserted.

Continuing to refer to FIG. 17, the signal proportioner 216A includes a potentiometer RV5 that is connected in series with the pin 14 of the operational amplifier U31, the resistor R21, a resistor R22, a resistor R23, and the null voltage N. Thus, the control signal in the conductor 290A, that is provided by the operational amplifier U31 and the resistor R21, whether it is a forward signal that is above the null voltage N, or a reverse signal that is below the null voltage N, is selectively proportioned by the potentiometer RV5 in a conductor 292A.

Thus, the potentiometer RV5 is a part of the proportionality adjuster 234 of FIG. 14, and an other potentiometer, not shown, that is included in the signal proportioner 216B of FIG. 14, is the other part of the proportionality adjuster 234. When tilt transducers of the type shown in FIG. 2B are used, preferably, the potentiometer, RV5 and an other potentiometer, not shown, are ganged, since both tilt transducers, 38A and 38B control both speeds and turns.

Before leaving FIG. 17, it is important to notice that the conductor 290A carries the limited signal voltage, and that the conductor 292A carries a signal voltage that is both limited and proportioned. A null-width generator 218A of FIG. 18 uses the limited-signal voltage in the conductor 290A.

Referring now to FIG. 17A, a null-voltage generator, or null-voltage divider, 294 includes resistors R24 and R25 that preferably, but not necessarily, have approximately equal resistances. By connecting the resistors R24 and R25 in series between the source voltage and ground, the null voltage N, of FIGS. 14 and 17, is generated.

Figure 18:
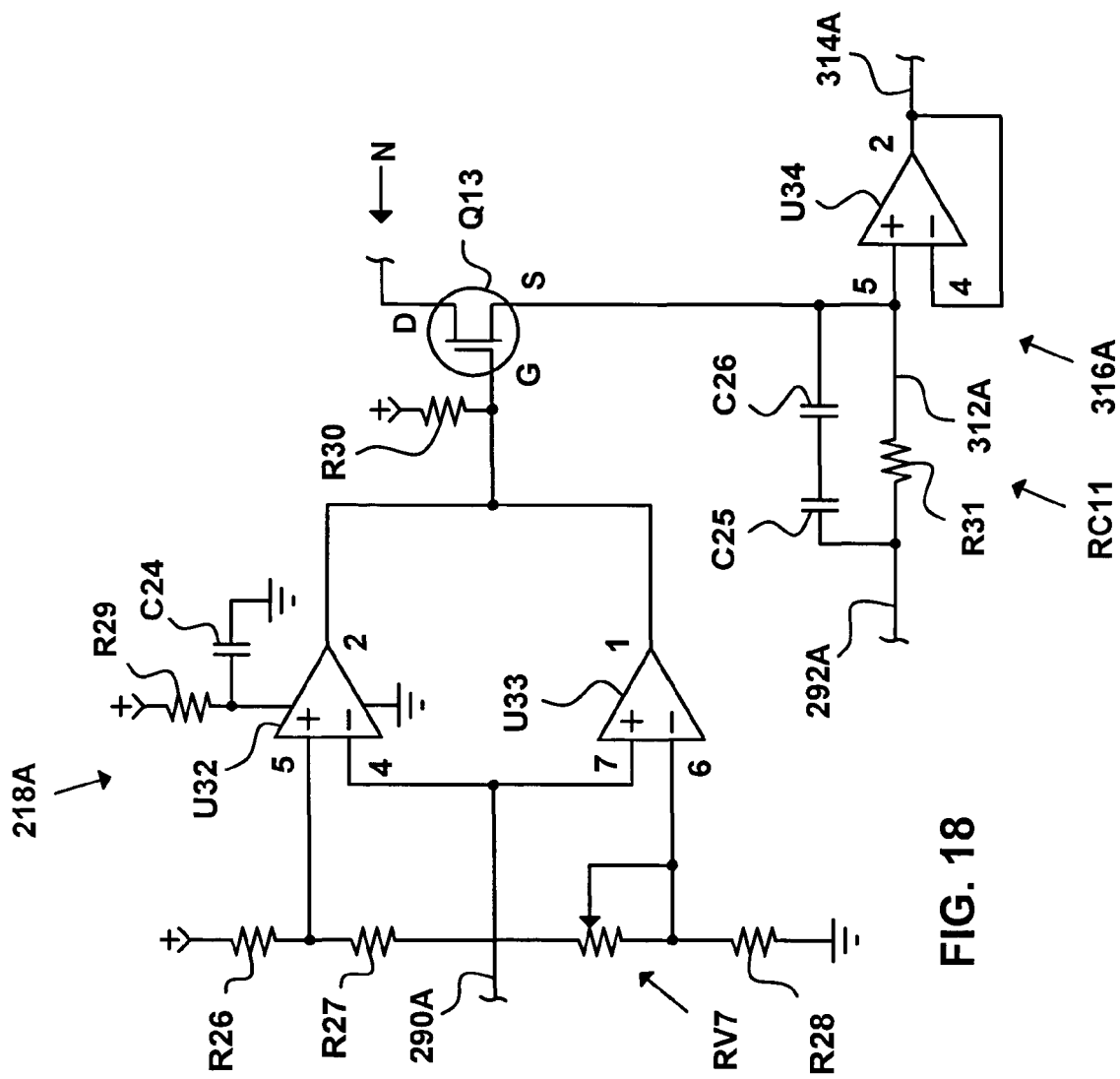
FIG. 18 is the null-width generator for the power interface of FIG. 14.

Referring now to FIG. 18, the present invention includes the null-width generator 218A. The purpose of the null-width generator 218A, of FIG. 18, is to provide a range of signal voltages, or null widths, 282A or 282B, of FIG. 16G, that are disposed above and below the null-voltage N, in which inadvertent operation of an apparatus, such as the power wheelchair 12 of FIG. 1, is precluded.

That is, by selectively adjusting the null widths, 282A and 282B, inadvertent operation of the wheelchair 12 of FIG. 1, as might be caused by poor coordination or body tremors of the person 20, can be obviated for any selected head inclination angle, 252A or 252B of FIG. 15A, or 254A or 254B of FIG. 15B.

Further, the null-width generator 218A of FIG. 18 provides an important improvement over prior art null-width generators. Whereas prior art null-width generators have subtracted their null widths from the signal voltage, the null-width generator 218A of FIG. 18 adds the null width, 282A or 282B of FIG. 16G, back into the signal voltage when the signal voltage is outside the null width 282A or 282B.

Referring again to FIG. 18, the null-width generator 218A includes: comparators U32 and U33; an operational amplifier U34 that serves as a buffer or follower, that has a high input-impedance, and that is configured as a follower; a bilateral switch Q13; resistors R26, R27, R28, and R29; a pull-up resistor R30; a resistor R31; a potentiometer RV7; and capacitors C24, C25, and C26.

The resistors R26, R27, and R28, and the potentiometer RV7 cooperate to provide adjustable reference voltages on pins 5 and 6 of the comparators U32 and U33. The signal voltage that has been limited by the signal limiter 214A in the conductor 290A of FIG. 17, is applied to pins 4 and 7. The resistor R30 serves as a pull-up resistor for the outputs at pins 1 and 2.

The capacitors C25 and C26 cooperate with the resistor R31 to provide an RC circuit RC11. As shown, the capacitors C25 and C26 are positioned back-to-back to provide a non-polarized capacitor. Optionally, a single, non-polarized capacitor may be used.

It should be noticed that it is the limited signal voltage of the conductor 290A of FIG. 17, and not the proportioned signal voltage of the conductor 292A, that is applied to the comparator U32.

By selective adjustment of the potentiometer RV7, reference voltages may be set that are in the order of 0.1 to 0.7 volts above and below the null voltage N.

When the limited signal voltage in the conductor 290A is either above or below a respective one of the voltage limits, one of the comparators, U32 or U33, will output a ground. Since the comparators, are of the open collector type, whenever one of the comparators, U32 or U33, outputs a ground, its ground will pull down the high gate voltage on the bilateral switch Q13 that has been provided by the pull-up resistor R30.

However, when the signal voltage in the conductor 290A is within the upper and lower voltage limits, the outputs of both comparators, U32 and U33, are high at pins 1 and 2, the pull-up resistor R30 applies a high gate voltage to the bilateral switch Q13, and the bilateral switch Q13 conducts, thereby forcing a voltage in a conductor 312A to increase or decrease to the null voltage N.

Further, the signal voltage in the conductor 312A will be reproduced in a conductor 314A, since the operational amplifier U34 is configured as a follower.

Continuing to refer to FIG. 18, with the conductor 312A at the null voltage N, a voltage differential exists across the resistor R31. That is, the proportioned signal voltage in the conductor 292A will be either higher or lower than the null voltage N in the conductor 312A, and that the capacitors C25 and C26 charge in response to this voltage differential. The capacitors, C25 and C26, will retain the voltage differential that exists between the conductors 292A and 312A.

However, as soon as actuation of the tilt transducer 204A of FIG. 14 provides a signal voltage, as proportioned by the signal proportioner 216A of FIG. 14, that is outside one of the limits, upper or lower, of one of the comparators, U32 or U33, the gate G of the bilateral switch Q13 goes low, and the null voltage N is isolated from the conductor 312A.

Since the operational amplifier U34 is voltage operated, rather than current operated, there is no current flow from the capacitors C25 and C26 directly to pin 5 of the operational amplifier U34. Instead, the capacitors C25 and C26 are discharged by the resistor R31 to the pin 5, at a rate determined by the voltage differential, the capacitance of the capacitors, C25 and C26, and the resistance of the resistor R31.

If the RC circuit RC11 were not included, the voltage differential between the limited signal voltage, in the conductor 292A, and the null voltage N, in the conductor 312A, would be increased by the null voltage almost instantaneously, and the power wheelchair 12 of FIG. 1, or other controllable apparatus, would start abruptly.

But, with the RC circuit RC11 included, discharge of the capacitors C25 and C26, and addition of the null signal, to the voltage that is in the conductor 312A, is at a controlled rate-of-change.

As mentioned previously, the null-width generator 218A of FIG. 18 provides an important advance over prior art null-width generators. More particularly, prior art null-width generators subtracted the null width, 282A or 282B from the maximum signal voltage, therefore degrading the maximum achievable speed of an apparatus, such as the power wheelchair 12 of FIG. 1. In stark contrast, the null-width generator 218A of FIG. 18 adds the null width, 282A or 282B, back into the signal voltage when the signal voltage is outside the null width, 282A or 282B, thereby providing the full maximum speed of the wheelchair 12 of FIG. 1, irrespective of the null width, 282A or 282B.

Further, it becomes evident that the capacitors, C25 and C26, the resistor R31, and the operational amplifier, U34 cooperate to provide a rate-of-change control device 316A that may be included as a part of the null-width generator 218A.

For some power wheelchairs, such as the wheelchair 12 of FIG. 1, it is critical that the rate of change for the x signal, or right/left turn signal, be lower than the rate of change for the y signal, or forward/reverse signal, to prevent fishtailing of the power wheelchair 12. For the forward/reverse signal, preferably, the capacitors C25 and C26 are 3.3 µfd, and the resistor R31 is 249K ohms, but for the right/left turn signal, the resistor R31 is changed to 1.5 megohms.

Referring now to FIG. 19, a turn-signal conditioner 330 is one of two that are taught herein for use with transducers of the type shown in FIGS. 2A, 15A, and 15B.

The turn-signal conditioner 330 is connected to two null-width generators, such as the null-width generator 218A of FIG. 18. That is, the turn-signal conditioner 330 is connected to the conductor 314A of FIG. 18, and to a similar null-width generator, not shown, for the right/left turn signal of the tilt transducer 204B, by a conductor 332 of FIG. 19.

The turn-signal conditioner 330 includes paralleled resistors for the purpose of achieving precise resistances. Since each pair functions as a single resistor, each paralleled pair will be named and numbered as if a single resistor were used.

The turn-signal conditioner 330 includes operational amplifiers, U35 and U36, input resistors R32 and R33, feedback resistors R34 and R35, resistors R36-R43, and diodes CR17, CR18, and CR19. The resistors R32 and R33 are input resistors, and the resistors R34 and R35 are feedback resistors, and the remaining resistors, except for the resistor R42, are used to set, or divide, voltages.

As shown in FIG. 19, the operational amplifier U35 is configured as an inverting amplifier, the operational amplifier U36 is configured as a non-inverting amplifier, and pins 1 and 2 are set high.

As a right/left turn-signal voltage is applied to the turn-signal conditioner 330 by the conductor 332, one of the operational amplifiers, U35 or U36, goes low pulling the forward/reverse signal voltage in the conductor 314A down through the resistor R42, the diode CR17, and one of the other diodes, CR18 or CR19.

The resistor R42 and/or the diode CR17 may be omitted, in accordance with design choices.

In operation, the forward/reverse signal is pulled down as a function of the right/left turn signal by the turn-signal conditioner 330, thereby cooperating with a pair of the null-width generators, such as the null-width generator 218A of FIG. 18, and optionally cooperating with the rate-of-change control device 316A that is a part of the null-width generator 218A of FIG. 18, to prevent fishtailing of power wheelchairs.

Referring now to FIGS. 19 and 20, the turn-signal conditioner 330 of FIG. 19 includes a comparing circuit 334 and a conditioning circuit 336. A turn-signal conditioner 340 of FIG. 20 also includes the comparing circuit 334. However, the comparing circuit 334 of FIG. 20 is illustrated symbolically by a box in phantom lines that contains the operational amplifiers, U35 and U36, also shown in phantom lines.

Referring now to FIG. 20, the turn-signal conditioner 340, rather than including the conditioning circuit 336 of FIG. 19, includes a conditioning circuit 342. The conditioning circuit 342, includes six diodes CR20, CR21, CR22, CR23, CR24, and CR25, three resistors, R44, R45, and R46, and a potentiometer RV8.

If the turn-signal conditioner 340 is used with a system in which the null voltage is 2.5 volts, and if the maximum signal voltage, as limited by the signal limiters 214A and 214B of FIG. 14, is 0.9 volts, then the maximum voltage for a forward signal is 3.4 volts, and the minimum voltage for a reverse signal is 1.6 volts.

The operational amplifiers U35 and U36 are configured to provide 2.8 volts on pins 1 and 2 when there is no right/left turn signal. That is, the right/left turn-signal voltage, as applied to the conductor 332 of FIG. 19, is 2.5 volts.

When the maximum forward/reverse signal voltage in the conductor 314A is 3.4 volts, with a 0.6 voltage drop across the diodes CR24 and CR25, the voltage applied to the pins 1 and 2 is 2.8 volts, which is the same voltage that the pins 1 and 2 are producing from the operational amplifiers U35 and U36, so the turn-signal conditioner 340 is not conditioning the forward/reverse signal voltage.

However, if the right/left turn-signal voltage in the conductor 332 increases for a right turn, since the operational amplifier U35 is an inverting amplifier, the pin 2 will decrease pulling the forward/reverse signal voltage down through the resistor R44, the potentiometer RV8, the resistor R46, and the diode CR24. Conversely, if the right/left turn-signal voltage in the conductor 332 decreases for a left turn, the output of the operational amplifier U36 will decrease, pulling the forward/reverse signal voltage down.

Operation described thus far for the turn-signal conditioners, 330 and 340, of FIGS. 19 and 20, are essentially the same. That is, they receive forward/reverse signals in the conductor 314A and condition forward-speed voltages as a function of right/left turn signals. The turn-signal conditioner 340 of FIG. 20 adds conditioning of the reverse speeds as a function of right/left turn signals.

As mentioned above, a minimum signal voltage of 1.6 volts produces a maximum reverse speed. With the pins 1 and 2 set at 2.8 volts, and with series-connected diodes CR20 and CR21 producing a maximum voltage drop of 1.2 volts, or with series-connected diodes CR22 and CR23 producing a voltage drop of 1.2 volts, the voltage delivered from pins 1 and 2, through the respective pair of diodes, CR20 and CR21, or CR22 and CR23, to a F/R conductor 344 will be 1.6 volts.

Thus, when there is no right/left turn signal, that is when the right/left turn-signal voltage in the conductor 332 is 2.5 volts, the turn-signal conditioner 340 will have no effect on the reverse speed.

However, assuming that the right/left turn signal increases, the noninverting operational amplifier U36 will produce an increased voltage on pin 1, and this increase above the set point of 2.8 volts, although reduced by flowing through the diodes, CR22 and CR23, will cause an increase in voltage in the F/R conductor 344, thereby slowing reverse speeds as a function of right/left turn signals.

Referring again to FIGS. 19 and 20, while the use of diodes, as voltage dropping devices, has been taught herein, it should be understood that this is only one of various types of solid-state devices that could be used to provide voltage drops in place of the diodes. For instance, it is well known that other solid-state devices, such as transistors and FETS, also provide voltage drops.

Referring now to FIG. 21, a headset 370, positioned on the head 18 of the person 20, includes the tilt X-Y transducer 16 of FIGS. 1, 15A, and 15B and a chin-actuated switch 372, so that the person 20 may provide the switching function of the switch 228 of FIG. 14 by moving his chin 374 downward slightly. Preferably, the chin-actuated switch 372 is made from material manufactured by Tapeswitch in Farmington, N.Y. However, the rate-of-change control device 22 of FIG. 1 is preferred for computer-control operations.

Referring now to FIG. 22, a head-actuated, or body-component actuated, mouse, 380, which may be used as a cursor-control system for a computer, or controllable device, 382, or as a head-actuated control for various types of controllable devices, includes the tilt X-Y transducer 16 of FIGS. 1, 15A, 15B, and 21.

The head-actuated mouse 380 also includes the signal conditioner 200 of FIG. 14, or any combination of the components/functions described herein.

Most importantly, as used in the head-actuated mouse 380 of FIG. 22, the signal conditioner 200 includes a pair of null compensators, such as the null compensators, 220A and 220B of FIGS. 14 and 17.

Inclusion of a pair of the null compensators, 220A and 220B of FIGS. 14 and 17, frees the user from choosing between two unfortunate choices: attempting to exactly position the headset 370 on the head 18 to achieve a null voltage; or working with the head 18 cocked at an uncomfortable angle to compensate for initial inexact positioning of the headset 370 on the head 18.

Of perhaps equal importance is inclusion of a pair of null-width generators, such as the null-width generators 218A and 218B of FIG. 14, but more particularly the null-width generator 218A of FIG. 18.

Inclusion of a pair of null-width generators, such as the null-width generator 218A of FIG. 18, allows both inclusion of, and adjustment of, the null width, 282A or 282B of FIG. 16G, in accordance with the motor skills of the person 20 in positioning of the head 18. With some paralyzed persons, head movement may be extremely limited, so that a narrow null width is desirable. With others, body tremors may dictate use of a relatively large null width.

The head-actuated mouse 380 also includes a second human input device, or mouse-clicking device, 384. Among the many possibilities, the chin-actuated switch 372 of FIG. 21, a foot switch (not shown), or a certain key on a computer keyboard (not shown) may be used as the second human input device 384.

Optionally, a prioritize select 386 is included for use with computer programs that do not prioritize X or Y movement of a display cursor 388 of a monitor or display device 390, and for other controllable devices in which optimal operation can be achieved by inclusion of a prioritizing function.

For instance, computer assisted drawing (CAD) systems typically prioritize movement along the axis that has the largest input so that perfectly straight lines can be drawn with ease.

If the prioritize select 386 has been set to give priority to x electrical signals, when an x electrical signal enters the prioritize select 386, if an x electrical signal is greater than a y electrical signal, or occurs before a y electrical signal occurs, the y electrical signal is locked out, and the cursor 388 is allowed to move only in left and right horizontal directions, as shown in FIG. 22.

That is, the prioritize select 386 may be configured to sense the first occurring electrical signal, x or y, or the greater electrical signal, x or y. As used herein, the greater electrical signal refers to the absolute value in relation to a null.

A human interface device (HID) 392 is interposed between the prioritize select 386 and the computer 382. The HID 392 translates inclination of the head 18 of the person 20 of FIGS. 15A, 15B, and 21, and the resultant proportional outputs from the tilt X-Y transducer 16 into computer language. Preferably, velocities of movement of the cursor 388 of the monitor or display device 390 of the computer 382 are proportional to head inclination angles 252A, 252B, 254A, and 254B of FIGS. 15A and 15B.

That is, preferably, instead of requiring a continuous input movement, as do conventional mice, the head-actuated mouse 380 of the present invention, whether head actuated or actuated by any other suitable means, continues to move the cursor 388, proportional to the tilt angles 252A and 254A of FIGS. 15A and 15B, as long as the head 18 is inclined.

The HID 392, in addition to translating inputs from the first human input device 202, which is preferably the tilt X-Y transducer 16 of FIGS. 1, 15A, and 15B, into computer language, also provides means for receiving commands from the second human input device 384.

Optionally, a voice-recognition IC 394 is used as the second human input device 384. With inclusion of the voice-recognition IC 394, the head-actuated mouse 380 becomes a head-voice control 396 for the computer 382, and other controllable devices, such as the power wheelchair 12 of FIG. 1.

The HID 392 may be obtained from Fairchild Semiconductor in South Portland, Me. One model is shown on data sheet USB 100. The voice-recognition IC 394 may be obtained from Sensory Inc. in Sunnyvale, Calif.

In operation, movement of the cursor 388 is as described above. "Pointing" to programs and/or operating functions may be made by head-actuation of the head-actuated mouse 380 and subsequent "clicking" by the chin-actuated switch 372 of FIG. 21. Optionally, "clicking" may be accomplished by the voice-recognition IC 394; a sound pressure switch that is sensitive to a breathing, whistling, or clicking sound made by the mouth or tongue; a proximity switch; or by any other means. However, preferably, clicking is accomplished by use of a rate-of-change device, such as the rate-of-change control device 22 of FIG. 1.

For use with CAD drawing programs and other complex computer programs, preferably, a rate-of-change device, such as the rate-of-change control device 22 of FIG. 1 is used.

However, a sound-pressure switch or the voice-recognition IC 394 may be used for the second human input device 384. If a sound-pressure switch or the voice-recognition IC 394 is used, programs and program functions are selected by sound-pressure or voice command, and inclination angles, 252A and 254A of FIGS. 15A and 15B, respectively, are used to quantify cursor movements.

While use of the tilt X-Y transducer 16 of FIGS. 1, 15A, and 15B has been shown and described as being mounted to the head 18 of the person 20, the present invention includes use of the joystick X-Y controller 17, or any other type of transducers that are mounted to, actuated by, or actuated by proximity to, one or more body members.

While only X and Y axis operation has been shown and described, the present invention includes Z axis actuation. Z axis input of the present invention includes actuation of a Z, or third, input device by any body member, whether mounted thereto or not. Preferably, Z axis input is achieved by a head-actuated rotational-position transducer in which Z axis input is achieved by the person 20 positionally rotating the head 18, although an accelerometer may be used as an input device for the Z axis, or any axis.

Finally, while control of the power wheelchair, 12 of FIG. 1, and the computer, 382 of FIG. 22, has been shown and described herein, the present invention is applicable to various other types of controllable devices.

Figure 23:
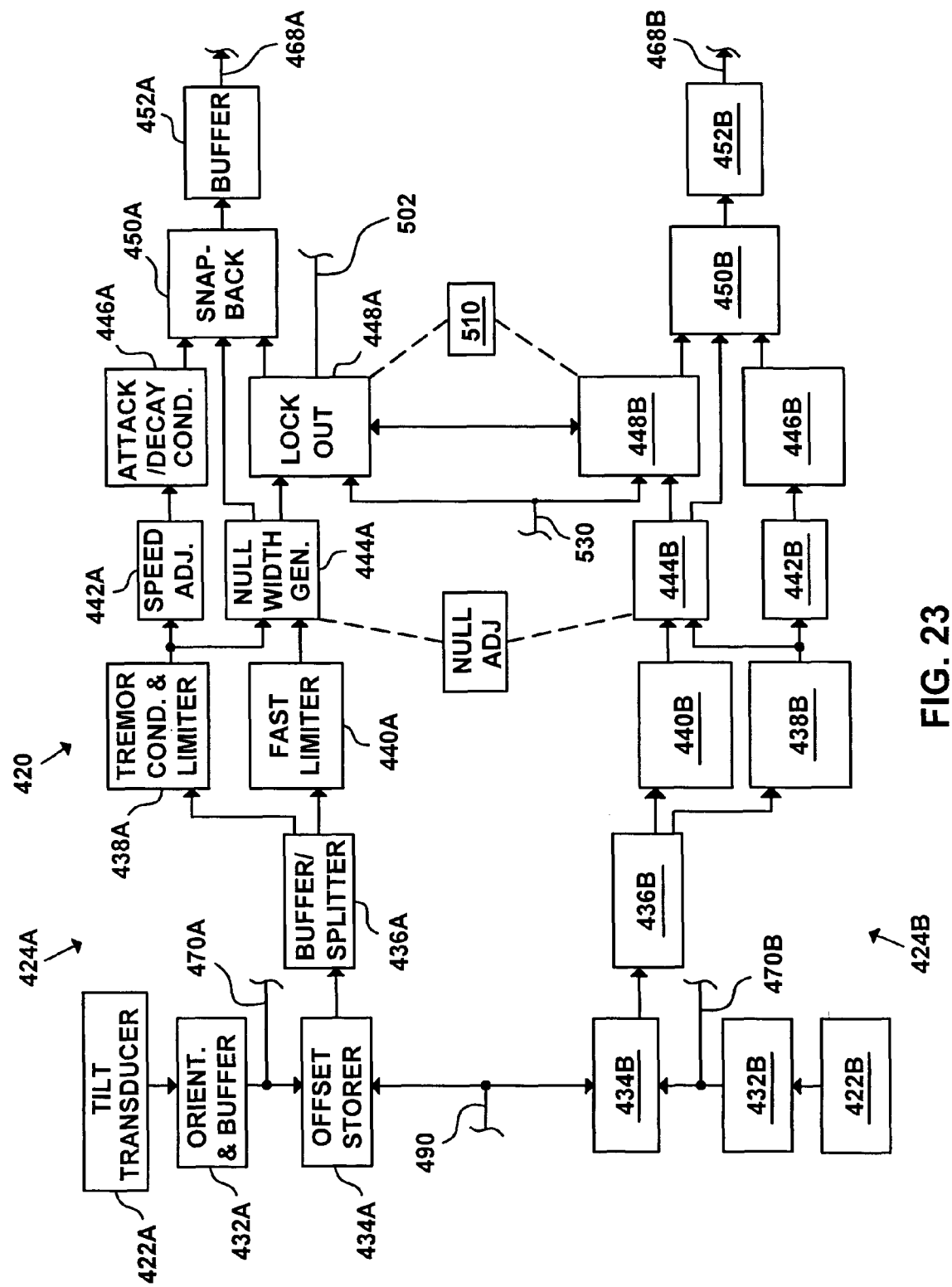
FIG. 23 is a block diagram of a first portion of a mouse, showing components for one axis in numbered and labeled boxes, and showing components for the other axis in boxes that are numbered but not labeled, and interposing labeled boxes for components that function with both axes.
Figure 24:
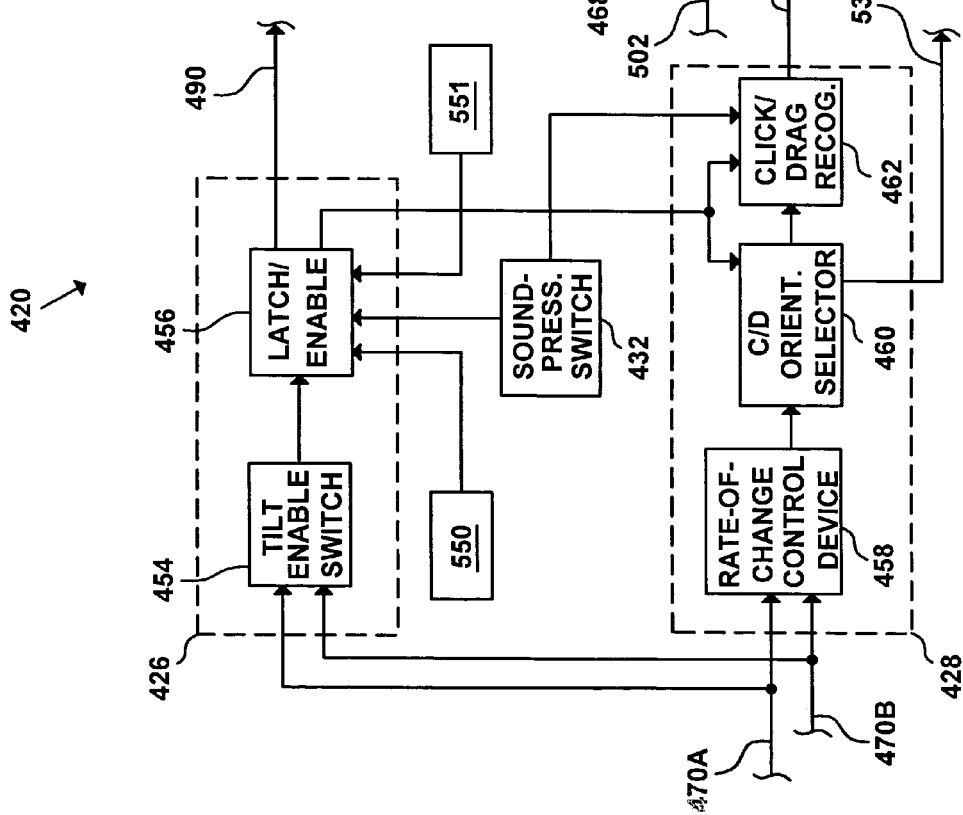
FIG. 24 is a block diagram, that together with the block diagram of FIG. 23, forms a mouse of the present invention.

Before proceeding to describe a preferred embodiment of FIGS. 23 and 24, a brief overview will be helpful. A mouse 420, of FIGS. 23 and 24, controls movements of the cursor 388, of FIG. 22, of the monitor or display device 390, of FIG. 22, in vertical, horizontal, and diagonal directions. For instance, the mouse 420 may be selectively switched so the cursor 388, of FIG. 22, will be moved in vertical directions in response to tilt angles 252A and 252B, of FIG. 15A, of the X-Y tilt transducer 16, of FIGS. 15A and 15B, and in horizontal directions in response to angles 254A and 254B of FIG. 15B. Further, the mouse 420 may be selectively switched to move the cursor horizontally to the right in response to increasing or decreasing signals, and may be selectively switched to move the cursor vertically in response to increasing or decreasing signals or diagonally by utilizing x and y signals simultaneously.

Click and drag functions of the mouse 420 are provided by rate-of-change switching as described previously in conjunction with FIG. 1. That is, click and drag functions are achieved by tilting the X-Y tilt transducer 16 of FIGS. 15A and 15B in selectively switched directions at velocities that exceed a predetermined magnitude.

Operation of the mouse 420 is enabled in one of several ways. In the most unique method, the mouse 420 is enabled in response to a predetermined magnitude of a signal voltage that is produced by a mechanical-to-electrical transducer. For instance, a switching function, to enable operation of the mouse 420, may be achieved by the person 20, of FIG. 15A, tilting his head 18 to the angle 252B, of FIG. 15A, in which the electrical signal produced thereby approaches the maximum electrical signal that the X-Y tilt transducer 16, of FIG. 15A can produce.

Therefore, the present invention teaches using an electrical signal from a mechanical-to-electrical transducer in three ways: performing an enabling operation as a function of magnitudes of the electrical signal; performing proportional control of an apparatus as a function of the same electrical signal; and performing a switching operation as a function of derivatives, with respect to time, of the same electrical signal.

Returning again to methods of enabling the mouse 420 of FIGS. 23 and 24, alternately, enabling of the mouse 420 can be achieved by any method of switching such as voice recognition, sound-pressure actuation, the chin-actuated switch 372 of FIG. 21, or any other manually actuated switch.

Referring now to FIG. 23, in a preferred embodiment, the mouse 420 includes X and Y mechanical-to-electrical transducers, or tilt transducers, 422A and 422B, and signal conditioners, or cursor-control portions, 424A and 424B.

That is, the signal conditioners 424A and 424B include all of the components that are used to condition the electrical signals for control of movement of the cursor 388 of FIG. 22, as contrasted to components that are used for click and drag functions, and for components that are used for enabling the mouse 420.

Preferably, as named, tilt transducers are preferred for use in the mouse 420. However, any mechanically or manually actuated transducers, of any suitable type, such as the joystick X-Y controller 17 or a proximity transducer, may be used.

In addition to components that are used in the signal conditioner 424A of FIG. 23, the mouse 420 includes an enabler 426, a click and drag interpreter 428, an interface 430, and a sound-pressure switch 432 of FIG. 24.

Referring again to FIG. 23, it should be noticed that there are three different groups of boxes, or blocks, in the block diagram.

In the first group, located closest to the bottom of the drawing, the boxes are numbered, but they are not labeled. These unlabeled boxes pertain to control signals produced by the tilt transducer 422B.

A second group of boxes, located closest to the top of the drawing, is the same as the unlabeled boxes, except that labels are inserted into the boxes. This second group of boxes pertains to control signals produced by the tilt transducer 422A.

A third group of boxes is disposed between the other two groups. This labeled group of boxes pertains to control signals produced by both tilt transducers, 422A and 422B.

Continuing to refer to FIG. 23, only one of the signal conditioners, 424A, will be described, since the signal conditioners 424A and 424B are identical.

The signal conditioner 424A includes an orientator and buffer 432A, an offset storer 434A, a buffer/splitter 436A, a tremor conditioner and limiter 438A, a fast limiter 440A, a speed adjuster 442A, a null-width generator 444A, an attack/decay conditioner 446A, a lockout 448A, a snap-back 450A, and a buffer 452A.

Referring now to FIG. 24, the enabler 426 includes a tilt-enable switch 454 and a latch enabler 456. The click and drag interpreter 428 includes a rate-of-change control device 458, a click/drag orientation selector 460, and a click/drag recognizer 462. The interface 430 includes a translator 464 and an rf link 466.

Referring again to FIG. 23, in operation, the tilt transducer 422A produces an electrical signal, or signal voltage, proportional to a tilt angle, not shown, of the transducer 422A, in like manner to the tilt angle 252A of FIG. 15A. Whether an increasing signal voltage, or a decreasing signal voltage, is delivered to the offset storer 434A, in response to the tilt angle 252A of FIG. 15A, is selectively determined by the orientator and buffer 432A.

As shown in FIG. 23, the orientator and buffer 432A, which is a part of the signal conditioner 424A, outputs a signal voltage that proceeds through the remaining components of the signal conditioner 424A to a conductor 468A of the buffer 452A. The translator 464 of the interface 430 of FIG. 24 receives the conditioned signal voltage from the conductor 468A of FIG. 24, as shown. The translator 464, of FIG. 24, delivers a cursor-control signal to the rf link 466, and the rf link 466 outputs to either a USB port or a PS2 port, as shown in FIG. 24, to selectively move the cursor 388 of FIG. 22 in upward and downward, or Y directions. In addition, the translator 464 of FIG. 24 delivers left click, right click, and/or drag functions to the rf link 466 and to both the USB port and the PS2 port.

In like manner, a signal voltage from the tilt transducer 422B of FIG. 23 is conditioned in the conditioner 424B, outputted through a conductor 468B, delivered to the translator 464 of FIG. 24 to the rf link 466, and delivered to either the USB port, or the PS2 port, as shown in FIG. 24, to selectively move the cursor 388 of FIG. 22 in left and right horizontal directions. The simultaneous usage of signal voltages, originating from transducers 422A and 422B, result in diagonal cursor movements.

Referring again to FIG. 23, in addition to using signal voltages from the transducers 422A and 422B to move the cursor 388 of FIG. 22, the signal voltages from the transducers 422A and/or 422B may be used to perform switching operations as a function of predetermined rates of changes of the signal voltages produced by the transducers 422A and 422B.

More particularly, signal voltages from respective ones of the orientator and buffers, 432A and 432B, proceed from conductors 470A and 470B to the click and drag interpreter 428, as shown in FIG. 24. The signal voltages from the conductors 470A and 470B are used by the rate-of-change control device 458 to provide switching functions, such as click and drag.

The click/drag orientation selector 460 selects a click or a drag function, and the click/drag recognizer 462 delivers a click or drag command to the translator 464 by a conductor 472. The translator 464 and the rf link 466 then deliver click and drag commands to the USB and PS2 ports.

Figure 25:
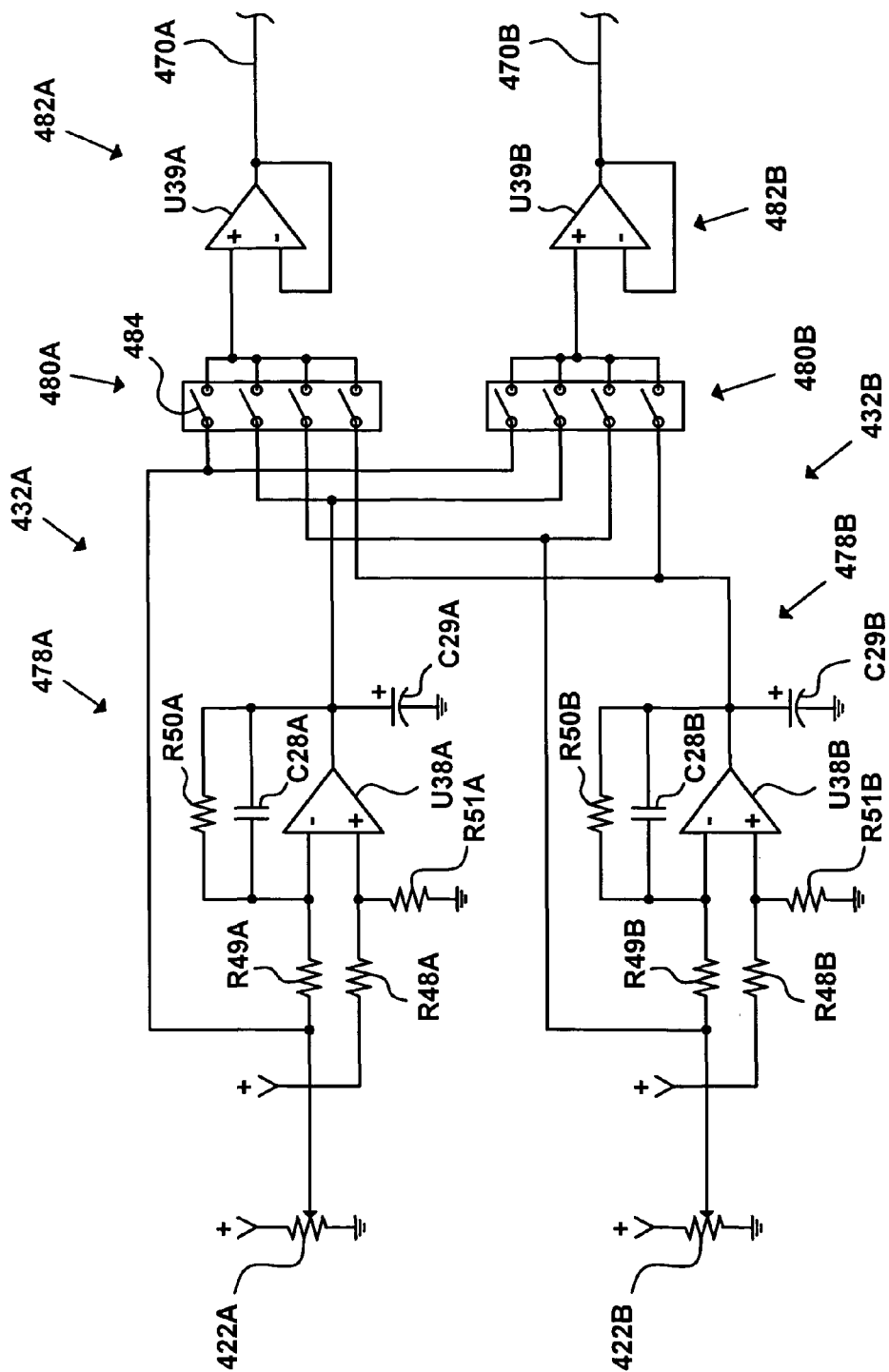
FIG. 25 is a schematic drawing of the orientator/buffers that are shown on FIG. 23.

Referring now to FIGS. 23 and 25, and more particularly to FIG. 25, the Y transducer 422A, and the orientator and buffer 432A are shown on the top half of FIG. 25; and the X transducer 422B, and the orientator and buffer 432B are shown on the bottom half of FIG. 25.

Referring now to FIG. 25, the orientator and buffers 432A and 432B include, respectively, inverting amplifiers 478A and 478B, orientation switches 480A and 480B, and buffers 482A and 482B. The inverting amplifier 478A includes an operational amplifier U38A, capacitors C28A and C29A, and resistors R48A-R51A. The inverting amplifier 478B includes an operational amplifier U38B, capacitors C28B and C29B, and resistors R48B-R5B1. The buffers 482A and 482B include operational amplifiers U39A and U39B, respectively, that are configured as unit gain amplifiers. The buffers 482A and 482B output their electrical signals to the conductors 470A and 470B, respectively.

In operation, electrical signals from the transducers 422A and 422B are outputted directly to the orientation switches, 480A and 480B, respectively, and electrical signals from the transducers 422A and 422B are also inverted through the inverting amplifiers 478A and 478B, and delivered to the orientator switches.

By selectively closing contacts that are generally numbered 484, the electrical signals from the transducers 422A and 422B can be made to produce increasing, or decreasing, electrical signals in response to a given tilt angle, such as the tilt angles 252A of FIG. 15A and the tilt angles 254A of FIG. 15B. In addition, the electrical signals from the transducers 422A and 422B may be selectively made to output to opposite ones of the buffers 482A and 482B.

Therefore, the orientation switches 480A and 480B allow users to selectively cause either the transducer 422A or the transducer 422B to control horizontal or vertical movements of the cursor 388 of FIG. 22, to reversibly control directions of movement of the cursor 388, and, optionally, to allow the transducers 422A and 422B to move the cursor 388 diagonally, in both X and Y directions.

Figure 26:
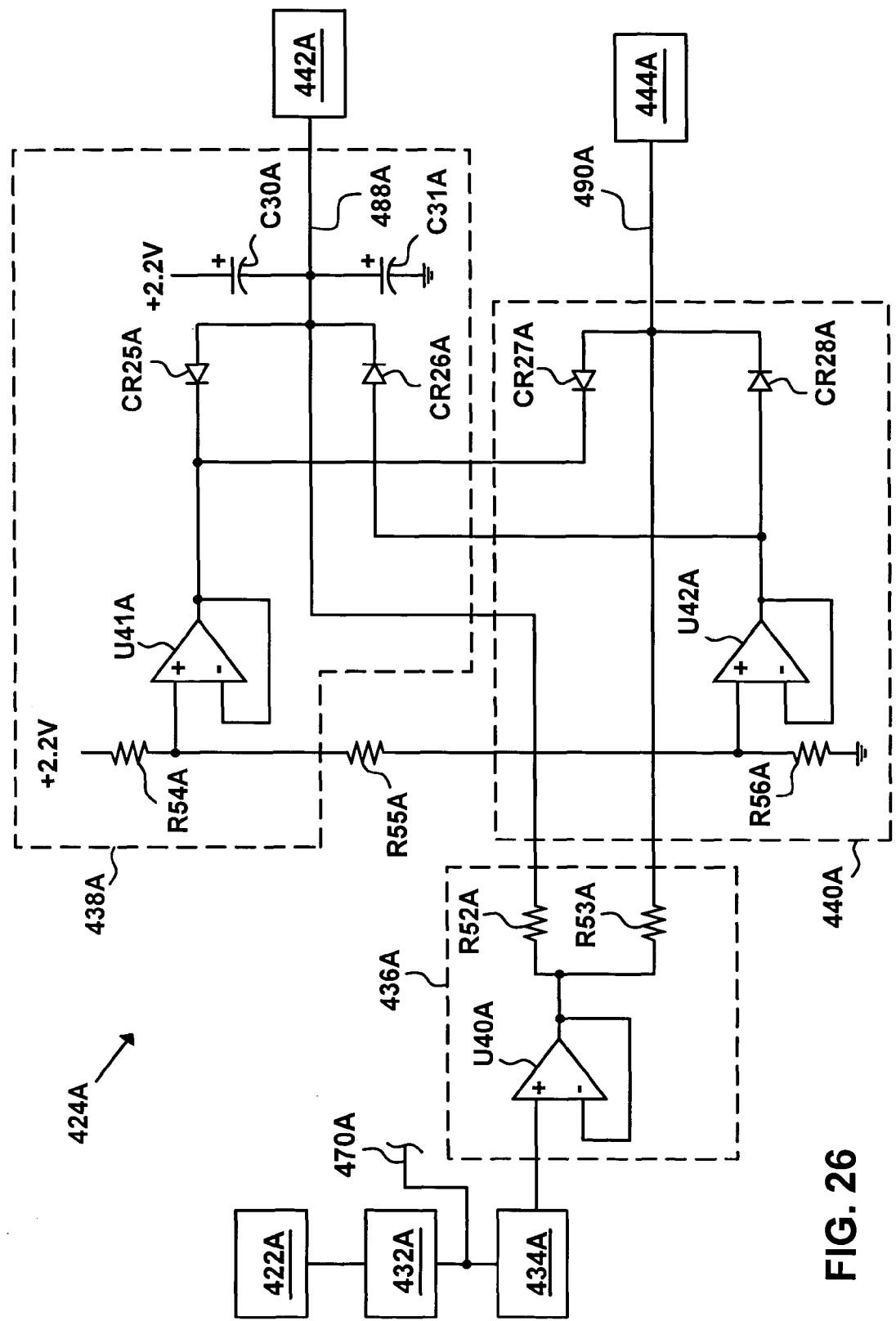
FIG. 26 is a schematic drawing of one of the buffer/splitters, one of the tremor conditioners, and one of the fast limiters of FIG. 23.

Referring now to FIGS. 23 and 26, and more particularly to FIG. 26, the transducer 422A delivers an electrical signal to the orientator and buffer 432A, and the conductor 470A delivers the electrical signal to the offset storer 434A, which is a capacitor of the type discussed for the capacitor C22 of FIG. 17, and the offset storer 434A delivers the electrical signal to the buffer/splitter 436A.

The buffer/splitter 436A includes an operational amplifier U40A that is configured as a buffer, and resistors R52A and R53A. The buffer/splitter 436A is connected to the tremor conditioner 438A by a conductor 488A and the fast limiter 440A by a conductor 490A.

As can be seen by inspection of FIG. 26, the tremor conditioner 438A and the fast limiter 440A share components that provide signal limiting, although it is apparent that they could use separate components. That is, signal limiting is provided for both the tremor conditioner 438A and the fast limiter 440A by buffers U41A and U42A, resistors R54A, R55A, and R56A. The buffer U41A sets an upper limit and the buffer U42A sets a lower limit.

In addition to the components that are shared with the fast limiter 440A, the tremor conditioner 438A includes diodes CR25A, CR26A, CR27A, and CR28A, and capacitors C30A and C31A.

In operation, after the electrical signal is divided into two equal electrical signals by the buffer/splitter 436A of FIG. 26, one of the divided electrical signals is delivered to the capacitors C30A and C31A by the conductor 488A for tremor conditioning by the capacitors C30A and C31A as they charge and discharge, absorbing the tremoring electrical signals 260 of FIG. 16A. The other electrical signal is delivered to the fast limiter 440A by the conductor 490A.

Signal limiting for the upper limit of the electrical signal in the conductor 488A occurs when the electrical signal, as conducted by the diode CR25A to the buffer U41A, exceeds an upper limit as set by the resistors R54A, R55A, R56A, and the diode CR25A. In like manner, limiting of the lower limit occurs when the electrical signal, as conducted by the diode CR26A, is below the lower limit of the buffer U42, as set by the resistors R54A, R55A, and R56A.

In like manner signal limiting for the fast limiter 440A occurs as the diode CR27A conducts the upper limit, as set by the resistors R54A, R55A, and R56A to the buffer U41A, and as the diode CR27A allows a signal voltage from the buffer U42A to conducts the lower limit to the conductor 490A.

As shown by blocks in FIG. 26, the tremor conditioner 438A delivers a tremor-conditioned electrical signal to the speed adjuster 442A and to the null-width generator 444A by the conductor 488A. Also, as shown by blocks, the fast limiter 440A delivers an electrical signal to the null-width generator 444A by the conductor 490A.

The capacitors C30A and C31A of the tremor conditioner 438A provide tremor buffering, and thereby allow individuals with severe body tremors to successfully operate the mouse 420 of FIG. 23, or other apparatus. However, because of tremor conditioning, electrical signals in the conductor 488A do not follow closely to the electrical signals produced by the transducer 422A, so the cursor 388 of FIG. 22 tends to overshoot a desired location.

However, since electrical signals exiting from the fast limiter 440A in the conductor 490A do follow closely to the electrical signals produced by the transducer 422A, and as will be shown later, the electrical signals exiting from the fast limiter 440A are used in the snap back 450A of FIG. 23 to bring the cursor 388 of FIG. 20 to a stop exactly in the position desired by the user.

The tremor conditioner and limiter 438A of FIG. 23, when used with the power wheelchair 12 of FIG. 1, provides tremor control while minimizing fish-tailing that would result from using the tremor control 206A of FIG. 14. The ability to have both tremor control and a rapid settling time will be discussed more fully in conjunction with a description of the snap back 450A.

Figure 27:
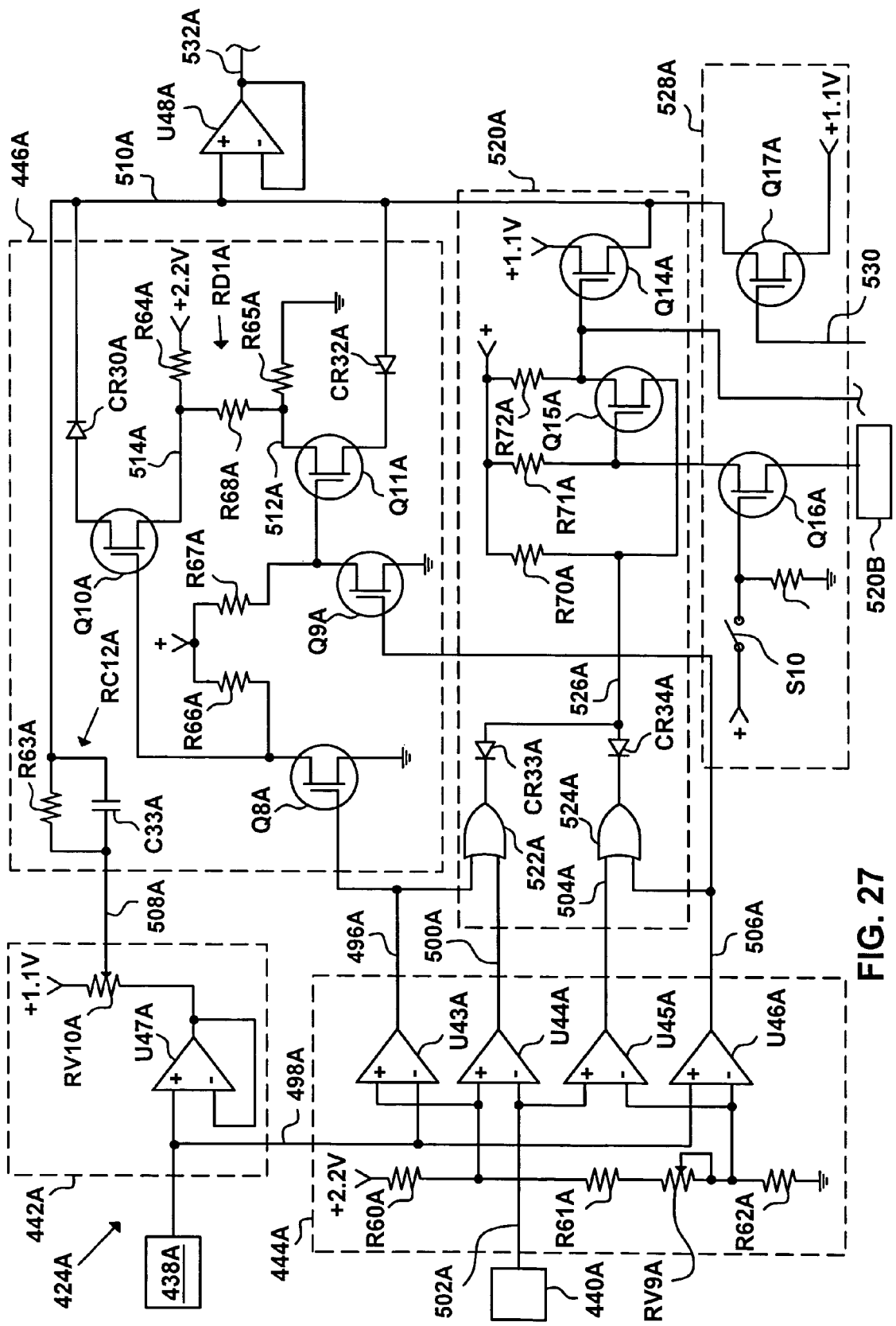
FIG. 27 is a schematic drawing of one each of the speed adjusters, the null width generators, the attack/decay conditioners, the lockouts, the snap backs, and the buffers that are connected to the snap backs.

Referring now to FIG. 27, the remaining portions of the signal conditioner, or cursor control portion, 424A are shown, some in blocks and some in schematic drawings.

Continuing to refer to FIG. 27, the null-width generator 444A functions generally as taught for the null-width generator 218A of FIG. 18, but utilizes real-time electrical signals from the fast limiter 440A as well as tremor-conditioned, or delayed, electrical signals that have been filtered to remove body-caused tremors by the tremor conditioner and limiter 438A.

The null-width generator 444A includes comparators U43A and U44A to detect electrical signals above an adjustable threshold. The comparator U43A responds to tremor-conditioned electrical signals from the tremor conditioner 438A, and the comparator U44A responds to real-time electrical signals from the fast limiter 440A.

In addition, the null-width generator 444A includes comparators U45 and U46 to limit electrical signals that are below an adjustable threshold. The comparator U46 responds to tremor-conditioned electrical signals from the tremor conditioner 438A, and the comparator U45 responds to real-time electrical signals from the fast limiter 440A.

The comparators U43A, U44A, U45A, and U46A are biased by a 2.2 volt supply and resistors R60A, R61A, R62A, and a potentiometer RV9A that is connected to function as a rheostat, thereby setting the aforesaid high and low limits. The potentiometer RV9A provides for user adjustment of the null widths 282A and 282B of FIG. 16G. The null width 282A extends upwardly from the null voltage N to a null-hi electrical signal 288A of FIG. 16G, and the null width 282B extends downwardly from the null voltage N to a null-lo electrical signal 288B of FIG. 16G.

The comparator U43A monitors the tremor-conditioned electrical signal from the tremor conditioner 438A, and trips the comparator U43A when the tremor-conditioned electrical signal increases above the null-hi electric signal 288 of FIG. 16G. The comparator U44A monitors the real-time electric signal from the fast limiter 440A and trips the comparator U44A at the same voltage level but more quickly than the comparator U43A.

That is, the comparators U45A and U46A are referenced with the lower of the two reference voltages, so that they both trip at the null-lo electrical signal 288B of FIG. 16G. The comparator U45A monitors the real-time electrical signal from the fast limiter 440A, and the comparator U46A monitors the tremor-conditioned electrical signal from the tremor conditioner 438A. Therefore, the comparators U45A and U46A will both trip at the same voltage level, but the comparator U45A will trip sooner in time than the comparator U46A.

Continuing to refer to FIG. 27, and the null-width generator 444A, the comparators U43A, U44A, U45A, and U46A provide active low signals: in a conductor 496A when a tremor-conditioned signal, or a delayed signal in a conductor 498A is greater than the null-hi signal 288A of FIG. 16G; in a conductor 500A when a null-hi fast signal in a conductor 502A is greater than the null-hi signal 288A of FIG. 16G; in a conductor 504A when a fast signal in the conductor 502A is lower than the null-lo signal 288B of FIG. 16B; and in a conductor 506A when the tremor-conditioned signal in the conductor 498A is lower than the null-lo signal 288B of FIG. 16G.

Continuing to refer to FIG. 27, a tremor-conditioned signal is delivered to the speed adjuster 442A from the tremor conditioner 438A by the conductor 498A. The speed adjuster 442A includes an operational amplifier U47A that is configured as an buffer, and a potentiometer RV10A that selectively proportions the tremor-conditioned electrical signal, thereby providing adjustable response to the tilt angles 252A and 252B of FIG. 15A, or tilt angles 254A and 254B, of the electrical signal produced by the tilt transducers 16 of FIG. 15A or 15B.

Continuing to refer to FIG. 27, a conductor 508A delivers the electrical signal from the speed adjuster 442A to the attack/decay conditioner 446A.

The attack/decay conditioner 446A provides separate ON and OFF slew rates as the signal departs from its null position or returns to null. The attack/decay conditioner 446A provides three signal conditioning functions.

The attack/decay conditioner 446A limits start-up velocity of the cursor 388 of FIG. 22, allows the speed of cursor movement to increase to a speed that is proportional to an electrical signal produced by the tilt transducer 16 of FIGS. 15A and 15B, and reduces the electrical signal quickly to the null voltages when the tilt transducer 16 returns to its null position.

Starting slowly allows small and precise movements of the cursor 388 of FIG. 22 without overshooting the intended stopping point. Allowing the cursor speed to increase proportional to tilt angles 250A and 250B of FIG. 15A, and 250A and 250B of FIG. 15B allow rapid positioning of the cursor 388 of FIG. 20. Inversely, stopping quickly from a full-speed cursor movement avoids cursor overshoot.

The attack/decay conditioner 446A includes an RC circuit RC12A that consists of a resistor R63A and a capacitor C33A, bilateral switches Q8A, Q9A, Q10A, and Q11A, resistors R64A, R65A. R66A, R67A, and R68A, and diodes CR30A and CR31A.

Continuing to refer to FIG. 27 and the attack/decay conditioner 446A, a low is produced in the conductor 496A by the comparator U43A when a tremor-conditioned signal from the tremor conditioner 438A is above the null-hi signal 288A of FIG. 16G, disabling the bilateral switch Q8A, which in turn activates the bilateral switch Q10A, so that a positive bias voltage is applied to a combined cursor signal in a conductor 510A through the resistor R64A, the bilateral switch Q10A, and the diode CR30A, nudging the cursor signal in the conductor 510A in a positive direction.

When the tremor-conditioned signal, as applied to the comparator U43A is no longer higher than the null-hi signal 288G of FIG. 16G, the low in the conductor 496A returns to its inactive state, the bilateral switch Q10A opens and no longer provides a positive voltage.

When a tremor-conditioned signal supplied to the comparator U45A is below the null-low signal 288B of FIG. 16G, the comparator U45A produces a low, and the low in the conductor 506A disables the bilateral switch Q9A, which in turn activates the bilateral switch Q11. This allows a bias-low signal in a conductor 512A to be applied to the conductor 510A through the resistor R65A, the bilateral switch Q11A, and the diode CR32, thereby nudging the signal in the conductor 510A in a negative direction.

When the tremor-conditioned signal in the conductor 502A is no longer below the null-lo signal 88B of FIG. 16G, the bilateral switch Q11 will open and no longer provide this bias-low signal.

Continuing to refer to FIG. 27 and the attack/decay conditioner 446A, as shown herein, for the sake of simplicity and clarity of illustration, the bias-hi and bias low signals are provided by a resistor divider RD1A that includes the resistors R64A, R65A, and R68A. However, preferably, a unity gain operational amplifier, not shown, is interposed between the conductor 514A and the bilateral switch Q10A, and another unity gain operational amplifier, not shown, is interposed between the conductor 512A and the bilateral switch Q11A.

In summary, the attack/decay conditioner provides non-linear attack/decay signals to the conductor 510A. The null-width generator provides a tremor free adjustable neutral zone that stabilizes cursor movements. The size of the null width is adjustable to accommodate user requirements.

Continuing to refer to FIG. 27, and beginning discussion of the snap-back 520A operation; while the attack/decay conditioner 446A does an excellent job at conditioning a start-up speed of the combined cursor signal in the conductor 510A, further controls are required to supplement the decay signal characteristics in order to enhance stopping characteristics, which provides optimal cursor positioning.

In addition to the decay characteristics of the R63A and C33A components, the snap-back 520A functionality is paramount to the successful implementation of the decay signal traits. The four active low outputs of the null width 444A function are routed to OR gates, 522A and 524A of the snap-back 520A circuitry. These four signals are collectively gated, using summing diodes CR33A and CR34A with the snap signal 526A resulting. Resistors R70A, R71A, and R72A are pull-up resistors.

The snap signal 526A, in conjunction with the lockout 528A function, controls the conductivity of bilateral switch Q14A which forces the combined cursor signal in the conductor 510A to a null state when activated.

Continuing to refer to FIG. 27, and continuing discussion of the snap-back 520A operation; The snap signal 526A, when permitted by the bilateral switch Q15A, is designed to deactivate the bilateral switch Q14A only when both the delayed sensor signal in the conductor 498A and the real-time sensor signal in the conductor 502A are active.

During initial cursor movement, the cursor will commence moving after both signals have become active. Cursor movement will cease, when the first of either one of the signals returns to a null position. Normally, the real-time sensor signal in the conductor 502A will be the first signal returned to a null position. Snapping the cursor signal back to the inactive state and stopping the cursor movement, when the sensor input is first detected to have returned to its null position, is crucial to the successful operation of the cursor.

Continuing to refer to FIG. 27, and continuing discussion of the snap-back 520A operation, the bilateral switch Q15A is biased in an ON state, by design, and is deactivated only when inhibited by the lockout function 528A. The bilateral switch Q15A combines control from both the snap signal 526A and the lockout function 528A to inhibit cursor movement.

Continuing to refer to FIG. 27, an other desirable function of the mouse 420 is the lockout function 528A, that combines an axis-lock switch S10, and a busy signal in a conductor 530, of FIGS. 23 and 27, and inputs and utilizes them to inhibit movement of the cursor 388 of FIG. 22 in one direction, X or Y, while attempting to move the cursor 388 only in the other direction, Y or X. With the axis-lock switch S10 in the OFF position, the prioritizing axis lock feature does not prevent moving the cursor 388 in X and Y directions simultaneously.

That is, with the axis-lock switch S10 in the ON position, cursor activity is limited to movement in one axis only. This is accomplished by the biasing on the gate of bilateral switch Q16A which is HIGH when the axis-lock switch S10 in the ON position. The bilateral switches Q16A and Q15A are cross-coupled to the bilateral switches Q16B and Q15B and provide for direct feedback to the opposite axis. The axis that detects cursor movement first, disables the other axis by directing a LOW to the bilateral switch Q15A, thereby forcing the combined cursor signal in the conductor 510A to a null voltage by enabling the bilateral switch Q14A to conduct.

Continuing to refer to FIG. 27, and continuing discussion of the lockout function 528A; a very critical function in the successful implementation of the mouse 420 is the click/drag lockout of cursor movements while click or drag functions are occurring. During click or drag operations, as well as any activity of the sensor input that trips the rate-of-change circuitry, cursor movement is disabled when a busy signal in the conductor 530 activates. That is, the busy signal in the conductor 530 is connected to the gate of bilateral switch Q17A and forces the combined cursor signal in the conductor 510A to a null voltage by enabling the bilateral switch Q17A to conduct.

This significant feature prevents inadvertent cursor movements while the operator rapidly actuates one axis of an X-Y transducers, such as the transducer 16 of FIG. 1, to command either a click or drag function. This circuitry also has the ability to prevent involuntary rapid movements of the user from causing undesired cursor movements.

The combined cursor signal in the conductor 510A is buffered by an operational amplifier U48A which provides axis output signal 532A to the translator 464.

Figure 28:
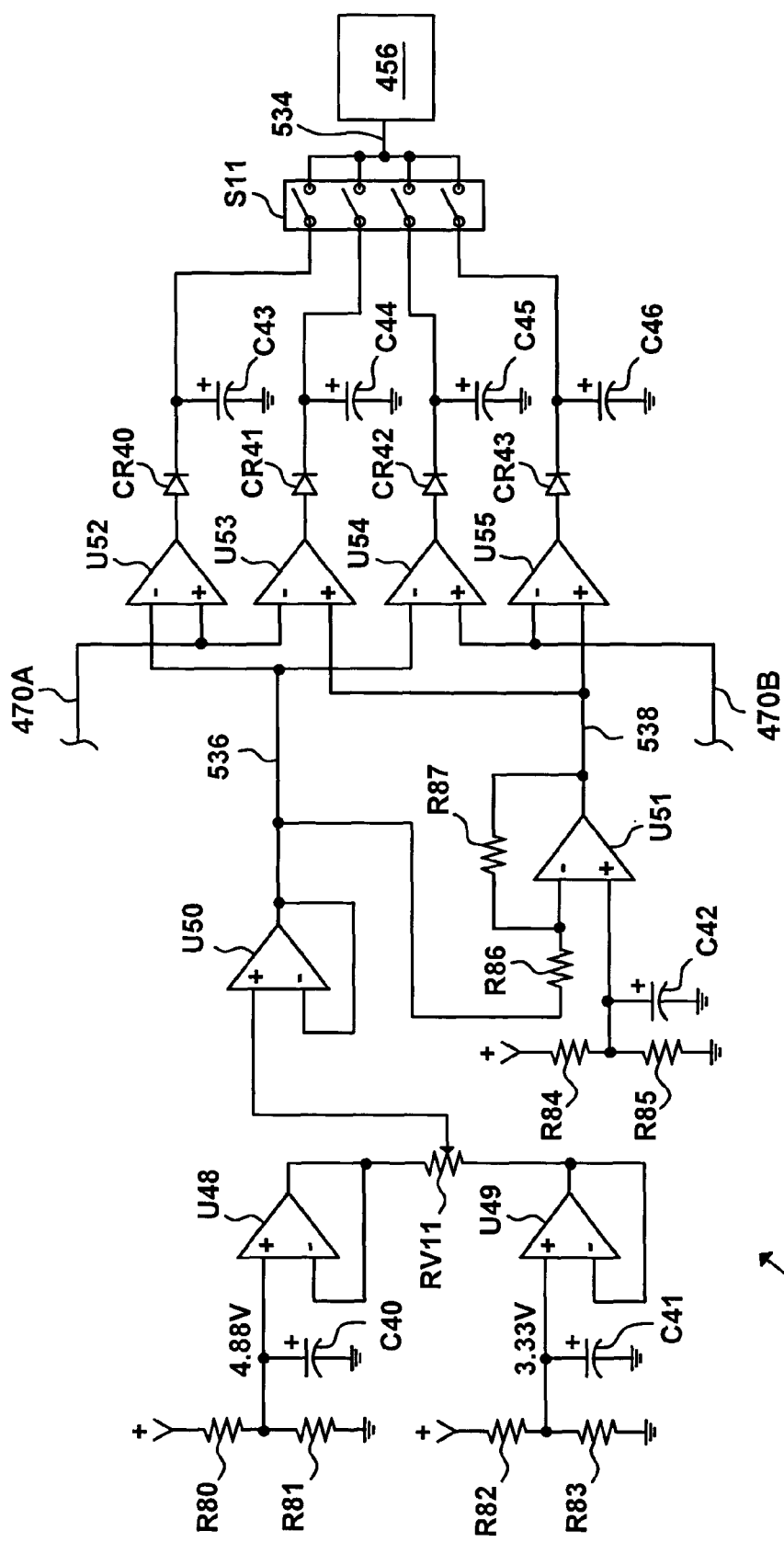
FIG. 28 is a schematic drawing of the tilt-enable switch of FIG. 24 that provides for adjustable on/off switching of the system in response to signal voltages produced by the tilt transducers of FIG. 23.

Referring now to FIG. 28, and beginning a discussion of the tilt-enable switch 454 of FIGS. 24 and 28, an operational amplifier U49A provides a fixed voltage source of 4.88 volts. Resistors R80 and R81 provide proper bias for the operational amplifier U49A, and a capacitor C40 provides stability. An operational amplifier U49B provides a fixed voltage source of 3.33 volts. Resistors R82 and R83 provide proper bias for the operational amplifier U49B, and a capacitor C41 provides stability.

A tilt angle adjustment potentiometer RV11 sources an operational amplifier U50 with a range of voltages between the two fixed values. The operational amplifier U50 provides unity gain buffering for added stability in sourcing a positive tilt bias signal in a conductor 536. Resistors R84 and R85 provide proper bias for the operational amplifier U50, and resistors R86 and R87 set the gain.

An operational amplifier U51 functions as a level shifter, converting voltage differences above 2.5 volts of the positive tilt bias signal in the conductor 536, and producing a similar voltage difference below 2.5 volts of the negative tilt bias signal in a conductor 538.

The tilt-enable switch 454 is designed to accommodate a 2.5 volt null voltage. The positive tilt bias signal in the conductor 536 has an adjustable range of 3.33 volts to 4.88 volts while the negative tilt bias signal in the conductor 538 has a range of 1.67 volts to 0.12 volts.

Continuing to refer to FIG. 28, comparators U52 and U53 monitor the Y-axis transducer voltage and trip when voltage levels exceed the applied positive or negative values. Diodes CR40 and CR41 block reverse dc voltages while capacitors C43 and C44 provide stability. Comparators U54 and U55 monitor the X-axis transducer voltage and trip when voltage levels exceed the applied positive or negative values. Diodes CR42 and CR43 block reverse dc voltages while capacitors C45 and C46 provide stability.

A four element DIP switch, S11, cooperates with the output signals from comparators U52, U53, U54, and U55, and selectively produces a tilt-enable signal in a conductor 534 from one or more adjustable tilt angle quadrants.

The purpose of the tilt-enable switch 454 is to allow the person 20 of FIGS. 1, 15A, and 15B, to enable, that is to initiate operation, of the mouse 420, of FIG. 24, by tilting his head 18. Alternately, the tilt-enable switch 454 allows the person 20 to enable the mouse 420, of FIG. 24, by manually actuating any transducer, by any means, and producing an electrical signal that approaches either a maximum voltage or a minimum voltage.

One function of the tilt-enable switch 454 is to selectively determine whether the mouse 420, of FIG. 24, is enabled by the person 20, of FIGS. 15A and 15B, by moving his head 18 forward, rearward, to his left side, or to his right side. Another function of the tilt-enable switch 454 is to selectively determine a magnitude of a tilt angle, 252A, 252B, 254A, or 254B, of FIGS. 15A and 15B, that will enable the mouse 420, of FIG. 24.

Figure 29:
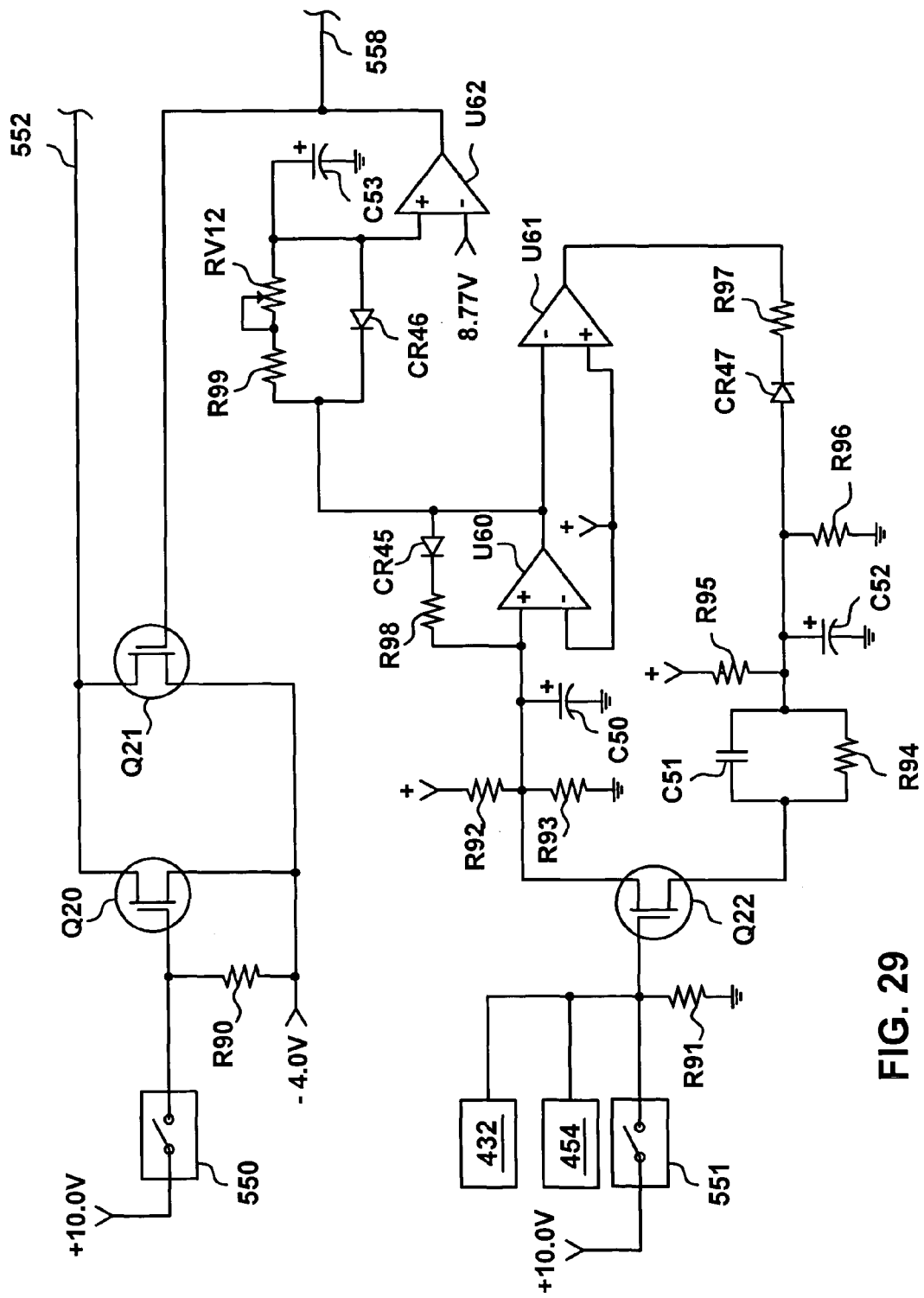
FIG. 29 is a schematic drawing of the latch enabler that provides for multiple methods of controlling the on/off function of the mouse.

Referring now to FIG. 29, the latch enabler 456 of FIGS. 24 and 29, provides several ways that the mouse 420 of FIGS. 23 and 24 can be enabled. The latch enabler 456 will enable the mouse 420 in response to either: the sound-pressure switch 432 of FIG. 24; the tilt-enable switch 454 of FIGS. 24 and 28; a push-and-hold switch 550 of FIGS. 24 and 29; or a momentary-contact switch 551 of FIGS. 24 and 29.

The push-and-hold switch 550 is connected to 10.0 volts, so that when manually actuated and held closed, a voltage is produced that enables a bilateral switch Q20, thereby providing a low-voltage pre-delay signal in a conductor 552 that enables the mouse 420 of FIGS. 23 and 24.

An output of a bilateral switch Q21 toggles between approximately 0.3 volts and 9.7 volts. With a bilateral switch Q22 disabled, an operational amplifier that is configured as a comparator U60 powers up with a low voltage level, and toggles to a high when the bilateral switch Q22 conducts. That is, comparators U60 and U61 and their associated components, resistors R92, R93, R94, R95, R96, R97, and R98, capacitors C50, C51, and C52, diodes CR45, CR46, and CR47, make a latch circuit that changes state each time the bilateral switch Q22 conducts.

A delay adjustment potentiometer RV12 adjustably slows down the rate at which a capacitor C53 is able to charge, thus delaying the time it takes for a comparator U62 to switch high. A delay signal in a conductor 558 controls conduction of the bilateral switch Q21, turning it ON, thereby activating the mouse 420 of FIGS. 23 and 24.

Figure 30:
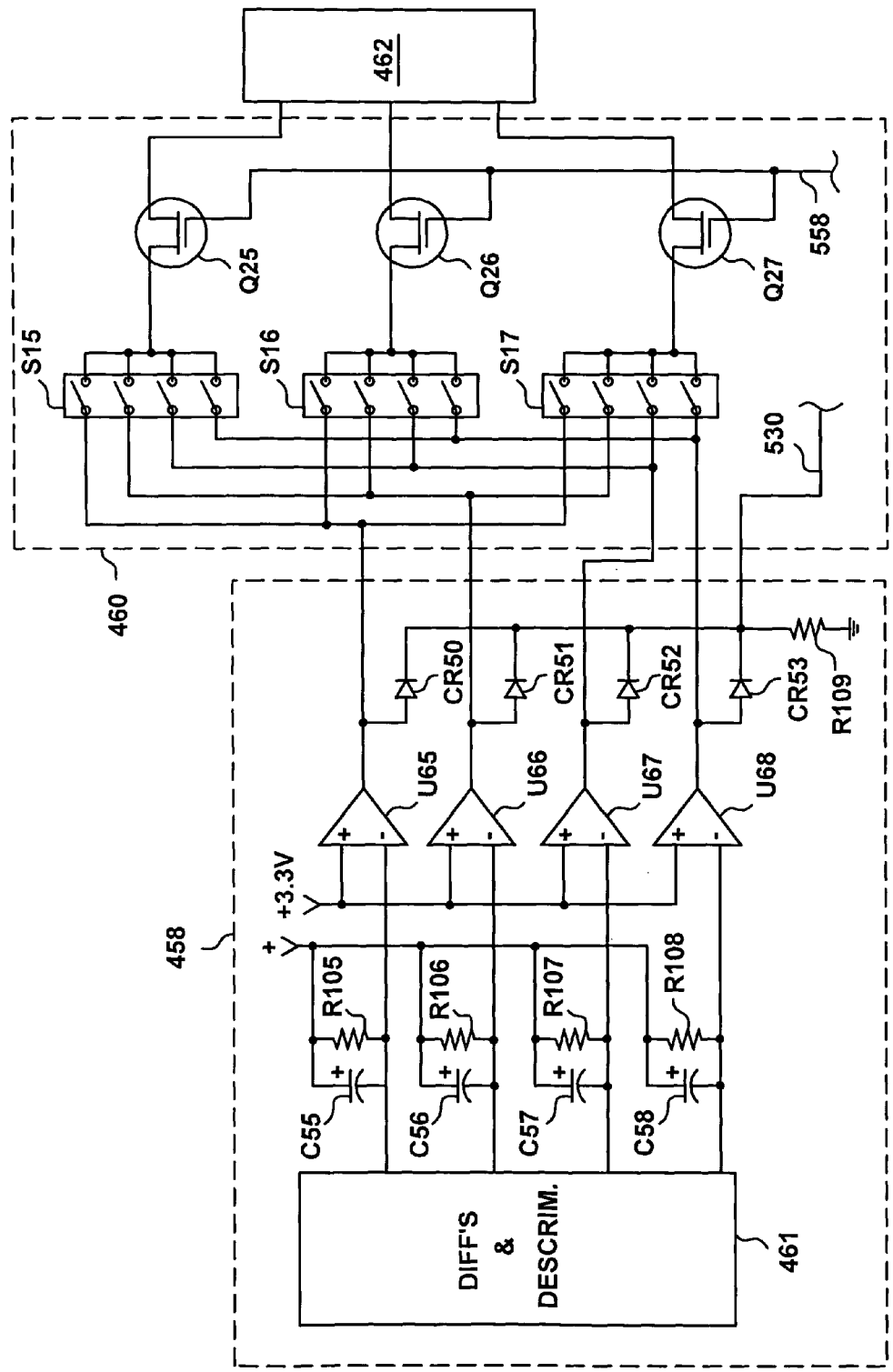
FIG. 30 is a schematic drawing of the rate-of-change control device and click/drag selector of FIG. 24.

Referring now to FIG. 30, and the rate-of-change control device 458 of FIGS. 24 and 30, a differentiator and discriminator 461 is generally the same, and functions the same as, the differentiators 40A and 40B and the discriminator 134 of FIG. 8, as described previously.

Portions of FIG. 8 that are included in the rate-of-change control device 458, of FIG. 30, begin with inputs from the conductors 60A & 60B and continue through outputs of the comparators U2A, U2B, U2C, and U2D in the conductors 138A, 138B, 138C, and 138D, respectively.

Each of four discriminated outputs from the conductors 138A, 138B, 138C, and 138D of FIG. 8 is filtered by one of four resistor and capacitor networks of FIG. 30, consisting of: a capacitor C55 and a resistor R105; a capacitor C56 and a resistor R106; a capacitor C57 and a resistor R107; and a capacitor C58 and a resistor R108. The four filtered outputs are then applied to respective ones of operational amplifiers, U65, U66, U67, and U68 that are configured as comparators.

The capacitors C55, C56, C57, and C58, in conjunction with the resistors R105, R106, R107, and R108 condition the discriminated signals into logic pulses which are then detected by the comparators U65, U66, U67, U68 that provide detection for all quadrants (plus X, minus X, plus Y, or minus Y) of transducer signals.

Resistor R109 is a pull-down resistor for a rate-of-change ROC busy signal in the conductor 530, which utilizes four summing diodes CR50, CR51, CR52, and CR53 to provide a positive source for the ROC busy signal in the conductor 530 when a rate-of-change activity is detected in any of four quadrants.

Continuing to refer to FIG. 30, and click/drag orientation selector 460 of FIGS. 24 and 30. The comparators U65, U66, U67, and U68 provide signals to orientation switches S15, S16, and S17. The orientation switch S15 is a right click switch, the orientation switch S16 is a left click switch, and the orientation switch. S17 controls the drag function.

Output of the right click switch S15 is controlled by a bilateral switch Q25, which disables the signal path when the cursor 388 of FIG. 22 is not in its active mode as controlled via a delay signal in the conductor 552 of FIGS. 29 and 30. In like manner, a bilateral switch Q26 controls the left click, and a bilateral switch Q27 controls the drag function.

Figure 31:
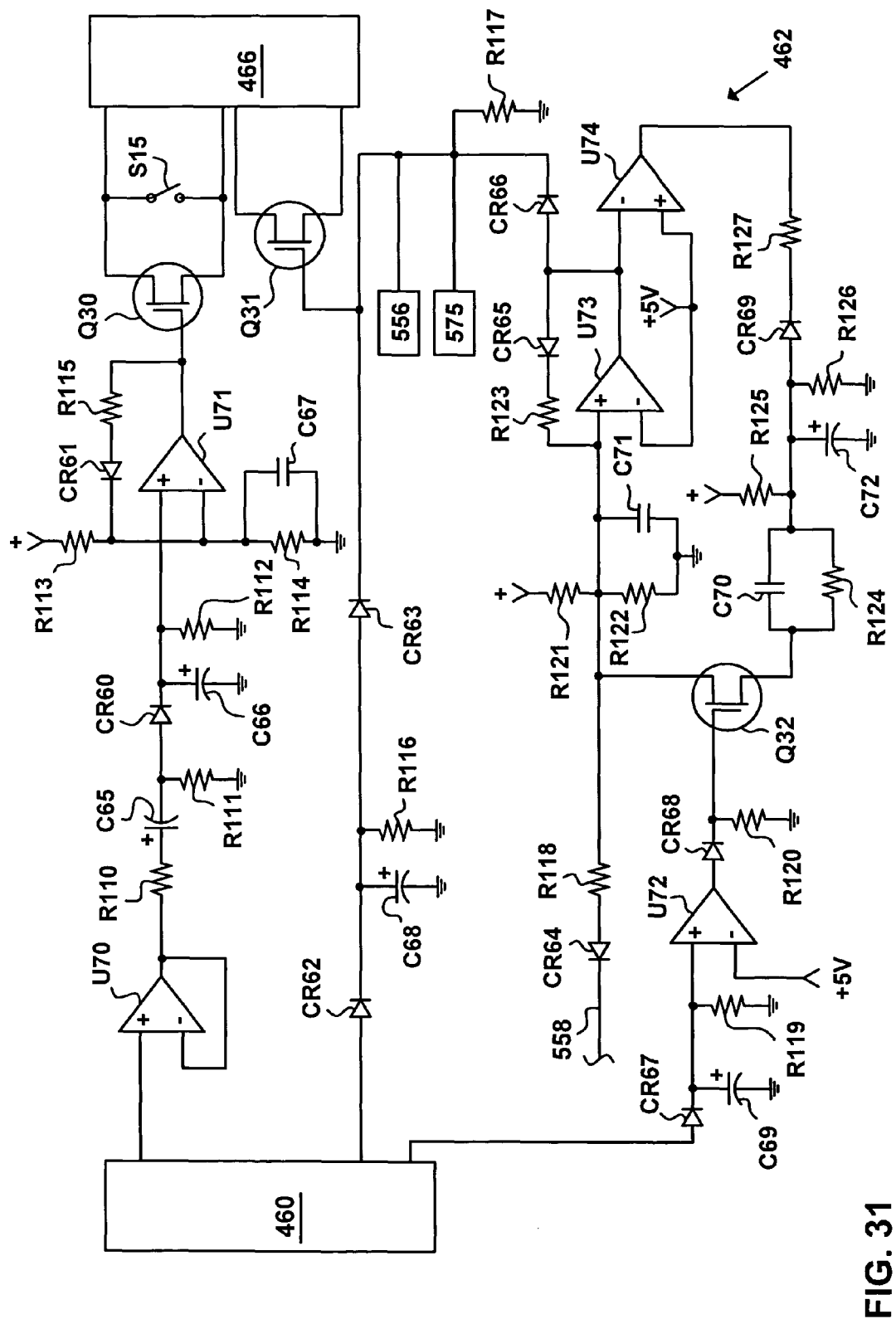
FIG. 31 is a schematic drawing of the click/drag recognizer that provides for multiple methods of controlling click and drag functions of the mouse of the present invention.

Referring now to FIG. 31, the click/drag recognizer 462 of FIGS. 24, 30, and 31, and the right click function, a buffer U70 receives the right click signal from the click/drag orientation selector 460 of FIGS. 24, 30, and 31. A capacitor C66 provides the main storage, which detects and stores right click pulse activity from the buffer U70.

If two pulses from the buffer U70 occur within a two second time-period, the charge voltage of the capacitor C66 will exceed a predetermined value and cause an operational amplifier U71, that is configured as a comparator, to activate.

A resistor R111 functions as a bleed-off resistor for a capacitor C65, while a resistor R112 provides a discharge path for the capacitor C66, and a resistor R110 increases the charge time of a capacitor C65. The operational amplifier U71, that is configured as a comparator and pulse width limiter with hysteresis, utilizes feedback during signal detection to limit the width of the output pulse to a bilateral switch Q30.

When the comparator U71 activates, a resistor R115 supplies current to allow a capacitor C67 to charge. When the charge in the capacitor C67 increases above that of the capacitor C66, the comparator U71 deactivates. This combination of events produces a proper pulse width to emulate that of a mouse click circuit.

A diode CR61, a resistor R113, and a resistor R114 combine with the resistor R115 and the capacitor C67 to provide hysteresis, thereby preventing multiple pulses. The bilateral switch Q30 conducts while the comparator U71 is activated, and is paralleled with the right click switch S15.

Continuing to refer to FIG. 31 and the click/drag recognizer 462 of FIGS. 24, 30, and 31, a left click signal is delivered to a diode CR62 by the click/drag orientation selector 460, and is conditioned by a capacitor C68 and a resistor R116 before being applied to a gate of a bilateral switch Q31 through a diode CR63.

The bilateral switch Q31 conducts when a left click function is desired, and is controlled by any of four independent inputs: the click/drag recognizer 462 of FIGS. 24, 30, and 31; the sound-pressure switch 432 of FIG. 24; a left input switch 556; a left click input jack 575; and a drag circuitry output from a diode CR66. That is, drag output from the diode CR66 also activates a click. A resistor R117 is a pull-down resistor for a control input for the bilateral switch Q31.

Continuing to refer to FIG. 31 and the drag function of the click/drag recognizer 462, a drag signal delivered to a diode CR67 by the click/drag orientation selector 460, is conditioned by a capacitor C69 and a resistor R119 before being routed to a comparator U72. The comparator U72, in conjunction with a diode CR68 and a resister R120, controls conduction of a bilateral switch Q32.

The drag function is initiated when the person 20 of FIG. 1, 15A, or 15B, provides a rate-of-change signal (dx/dt or dy/dt) that exceeds a predetermined threshold, by tilting his head 18, hand 64, or finger 67, rapidly. Subsequent to initiation of the drag function, the drag function latches on until a second rate-of-change signal, produced by rapid tilting of the head 18, hand 64, or finger 67, in a selected quadrant, is provided to turn the drag function off.

The latch circuit for the drag function is identical to the one described in FIG. 29, with the exception; an added input from the delay signal in the conductor 558 prevents any activity while the mouse 420 of FIG. 24 is in its standby mode. A diode CR64 and a resistor R118 are connected in series to provide a signal path between the delay signal in the conductor 558 and the click/drag recognizer 462.

Comparators U73 and U74, together with their associated components, resistors R121, R122, R123, R124, R125, R126, and R127, diode CR65, capacitors C70, C71, and C72, and a diode CR69 combine to form a latch circuit that changes state each time the bilateral switch Q32 commences conducting.

An output of the bilateral switch Q31 toggles between approximately 0.3 volts and 9.7 volts. When the bilateral switch Q32 is disabled, the bilateral switch Q30 powers up at a low voltage level, and increases to a high when the bilateral switch Q32 begins conducting. The drag circuitry output is provided through the diode CR66 to the bilateral switch Q31.

Figure 32:
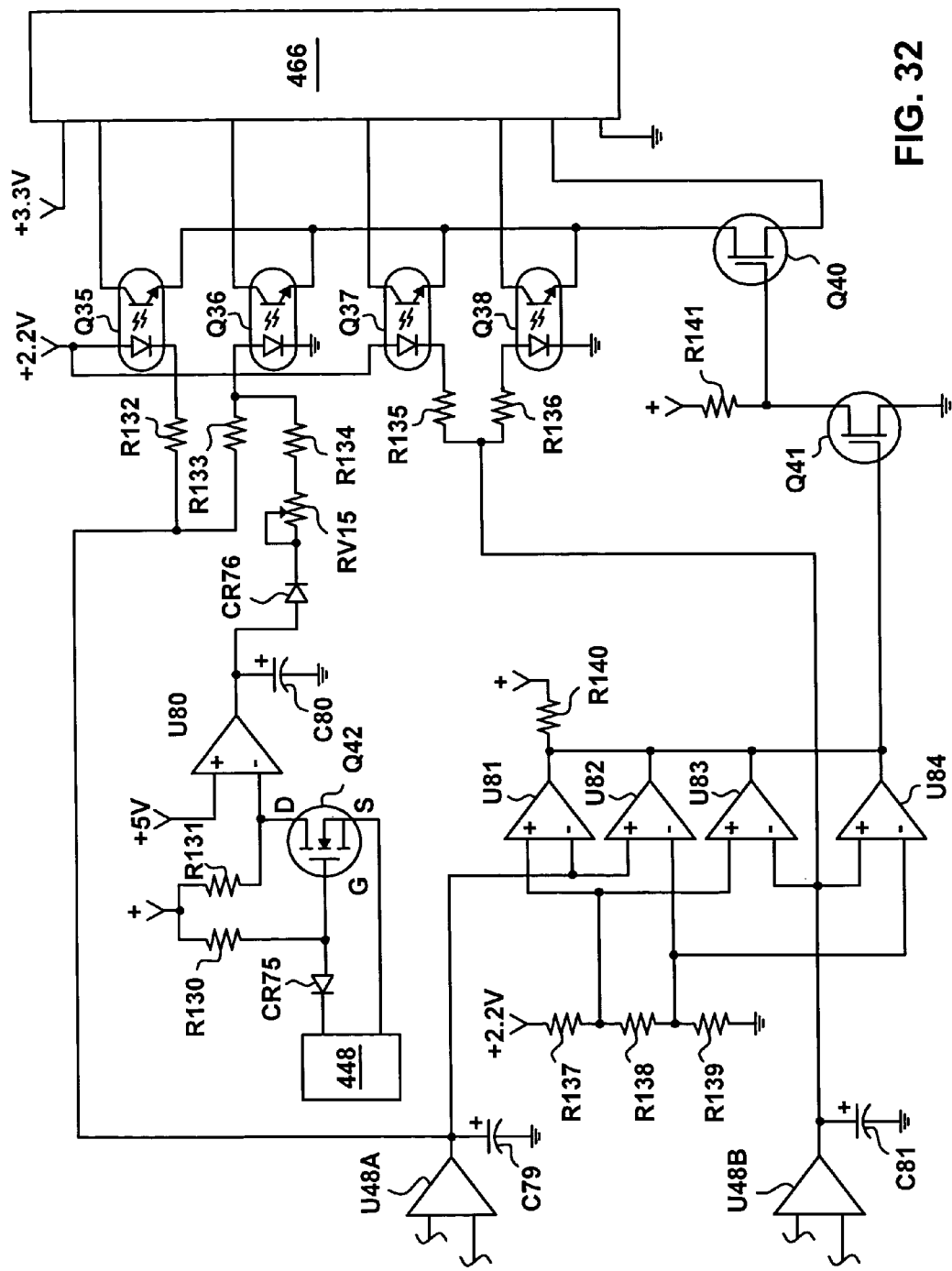
FIG. 32 is a schematic drawing of an interface that connects the proprietor electrical circuits of the mouse to an acquired rf link.

Referring now to FIG. 32, and the translator 464 of FIGS. 24 and 32, the Y-axis electrical signal from the operational amplifier U48A is inputted to a capacitor C79, resistors R132 and R133, and also comparators U81 and U82.

The resistors R132 and R133 divide the electrical signal, and applies the divided signals to optical couplers Q35 and Q36. Electrical signals that are increasing cause the optical coupler Q36 to become active, while electrical signals that are decreasing activate the optical coupler Q35.

In order to compensate for drift in the acquired rf link 466 of FIGS. 24, 31, and 32, a drift compensation circuit is necessary. Diode CR75, resistors R130 and R131, a capacitor C80, and a field-effect transistor (FET) Q42 provide control for an operational amplifier U80 that is configured as a comparator, to activate when drift compensation is necessitated. The degree of drift offset is controlled through a diode CR76 by a drift adjustment potentiometer RV15.

Continuing to refer to FIG. 32 and the translator 464 of FIGS. 24 and 32, an operational amplifier configured as a buffer U48B of FIGS. 27 and 32 inputs the X-axis electrical signal to a capacitor C81, resistors R135 and R136, and also comparators U83 & U84.

The resistors R135 and R136 divide the X-axis electrical signal applied to optical couplers Q37 and Q38. Signals activating positive from the null voltage N will cause the optical coupler Q38 to activate, while negative signals will activate the optical coupler Q37.

Continuing to refer to FIG. 32 and the translator 464 of FIGS. 24 and 32; to prevent any undesired movements of the cursor 388, of FIG. 22, during periods of inactivity of the mouse 420 of FIGS. 23 and 24, a ground path through the optical couplers Q35, Q36, Q37, and Q38 is provided by a bilateral switch Q40.

The comparators U81, U82, U83, and U84 are biased by resistors R137, R138, and R139, to activate if movement of the cursor 388 of FIG. 22 occurs, whether upward, downward, to the left, or to the right. Any movement of the cursor 388 will result in an output signal from one of the comparators U81, U82, U83, or U84, sinking a pull-up voltage provided by a resistor R140, causing a bilateral switch Q41 to open, and thereby allowing a resistor R141 to provide a high to the bilateral switch Q40, causing the bilateral switch Q40 to conduct.

Continuing to refer to FIG. 32, and the rf link 466 of FIGS. 24 and 32; the rf link 466 is a commercially available RF pointing device, designed to provide remote control of computer equipment. It is a two piece system consisting of a hand-held transmitter, and a receiver that attaches to the host computer.

The transmitter unit is disassembled and the transmitter assembly is installed into an enclosure, not shown, of the mouse 420 of FIGS. 23 and 24. The receiver unit is connected to the target computer via the USB or PS2 port. The rf link 466 is called a Remote Point RF, Model Number VP4810, manufactured by Interlink Electronics, Inc., 546 Flynn Road, Camarillo, Calif. 93012.

Figure 33:
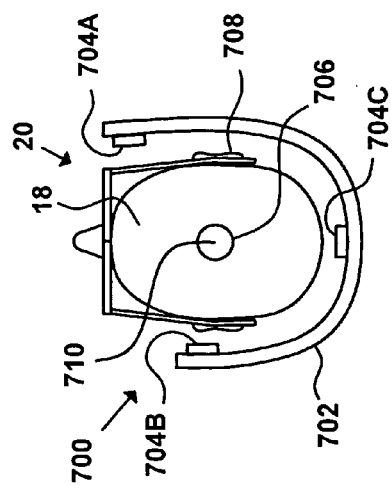
FIG. 33 is a top view of a person with a proximity transducer embodiment of the present invention wherein a first proportional proximity transducer is mounted on a structure adjacent to one side of a person, a second proportional proximity transducer is mounted behind the person, and a third proximity transducer, which may be proportional, is mounted on a structure adjacent to the side of the person opposite the first side mounted transducer.

Referring now to FIG. 33, a mouse, or head control, 700 includes a transducer-support structure 702 that is disposed behind, and on both sides of the head 18 of the person 20. The transducer-support structure 702 is attached to any suitable structure, not shown, not an inventive part of the invention. Proximity transducers 704A, 704B, and 704C are attached to the structure 702 in locations as shown. Preferably, the proximity transducers 704A, 704B, and 704C are ultrasonic transducers that produce outputs, proportional to distances, to the head 18. However, if proximity transducer 604B is being utilized solely as a mode switch, it is not necessary to output a proportional signal. Optionally, a tilt transducer 706, that senses one or two tilt axes, is attached to the head 18.

By positioning one of the proximity transducers, such as the transducer 704A slightly forward of an ear 708, or in relation to any article, not shown, that rotates with the head 18, the proximity transducer 704A, or an other one of the proximity transducers, 704B or 704C, will sense rotational movement of the head 18 around a Z-axis 710, so that the cursor 388 of FIG. 22 may be made to move horizontally, even as the person 20 rotates his head 18.

Vertical movement of the cursor 388 of FIG. 22 may be achieved by use of the transducer 704C that is located behind the head 18, or by use of the tilt transducer 706 that is attached to the head 18.

Continuing to refer to FIG. 33, by locating the proportional proximity transducer 704A a significant distance fore or aft the Z-axis 710, the proportional proximity transducer 704A will be receptive to two distinctively different inputs.

One usable input involves the person 20 tilting the head 18 laterally or from side to side. Because the entire side of the head 18 functions as the same reflective plan, the fore or aft mounting location or target area of the proportional proximity transducer 704A is noncritical.

For persons 20 without lateral or side-to-side head movement, a torsional or rotational movement of the head 18 may be a better option, and for some persons 20, the only option.

It can be seen by observing FIG. 33, by locating the proportional proximity transducer 704A a significant distance fore or aft the Z-axis 710, the distance between the proportional proximity transducer 704A and the person's head 20 will increase or decrease as a result of rotation of the head 20.

This aforementioned increase or decrease in distance between the proportional proximity transducer 704A and the head 20 will result in the proportional X-axis signals being outputted by proportional proximity transducer 704A.

To increase and/or improve the proportional proximity transducer's 704A target area, a vertical and horizontally disposed vane may be attached to a headband, a cap or any other suitable attachment, not shown. Once again, the target area is preferably located a significant distance fore or aft the Z-axis 710.

Continuing to refer to FIG. 33, it should be noted that various combinations of proportional proximity transducers 704A and 704C and nonproportional transducer(s) such as proximity transducer 704B, when configured for nonproportional output, may be utilized.

For example, the proportional proximity transducer 704C may be located behind the person's head 20 as shown in FIG. 33 to output the Y-axis signal. Two nonproportional proximity transducers may be located at opposite sides of the person's head 20 to output X-axis signals.

It should be further understood that other combinations of proportional and nonproportional proximity transducers can be utilized to output other meaningful X-Y signals.

It becomes apparent that the mouse 700 of FIG. 33, when used in conjunction with circuitry and features taught in conjunction with the mouse 420 of FIGS. 23 and 24, can provide many additional control combinations for the benefit of individuals with a wide variety of handicaps, can provide enhanced productivity for those who are not handicapped.

The tilt-axis X-Y transducer 16 of FIG. 21 will not be perfectly positioned on the head 18 of the person 20 during start up, so an initializing signal, or error signal will be produced during a time delay that is provided by the null timer 230. In like manner, an output of a proximity transducer will not be nulled initially.

The null timer 230 provides means for preventing actuation of the power wheelchair 12 of FIG. 1, or movement of the cursor 388 of FIG. 22, by the initializing signal, by holding an output signal in the conductor 242A to a null voltage N. Alternately, a manually actuated switch, or any other suitable means may be used to hold the output signal to the null voltage N.

During the time delay, the initializing signal is stored in the offset storage device 210A. The null compensator 220A, which includes both the offset storage device 210A and the offset buffer 212A, cooperate to provide means for compensating subsequent outputs of the tilt X-Y transducer 16.

The use of a pair of null-width generators, such as the null-width generator 218A of FIG. 18, provides means for preventing actuation of the power wheelchair 12 of FIG. 1, or movement of the cursor 388, of FIG. 22, when both x and y output signals are within adjustable null widths.

Finally, the rate-of-change control device 316A provides means for progressively obviating the preventing step of the null-width generator 218A of FIG. 18, subsequent to the output signal moving outside one of the predetermined null widths.

Figure 34A:
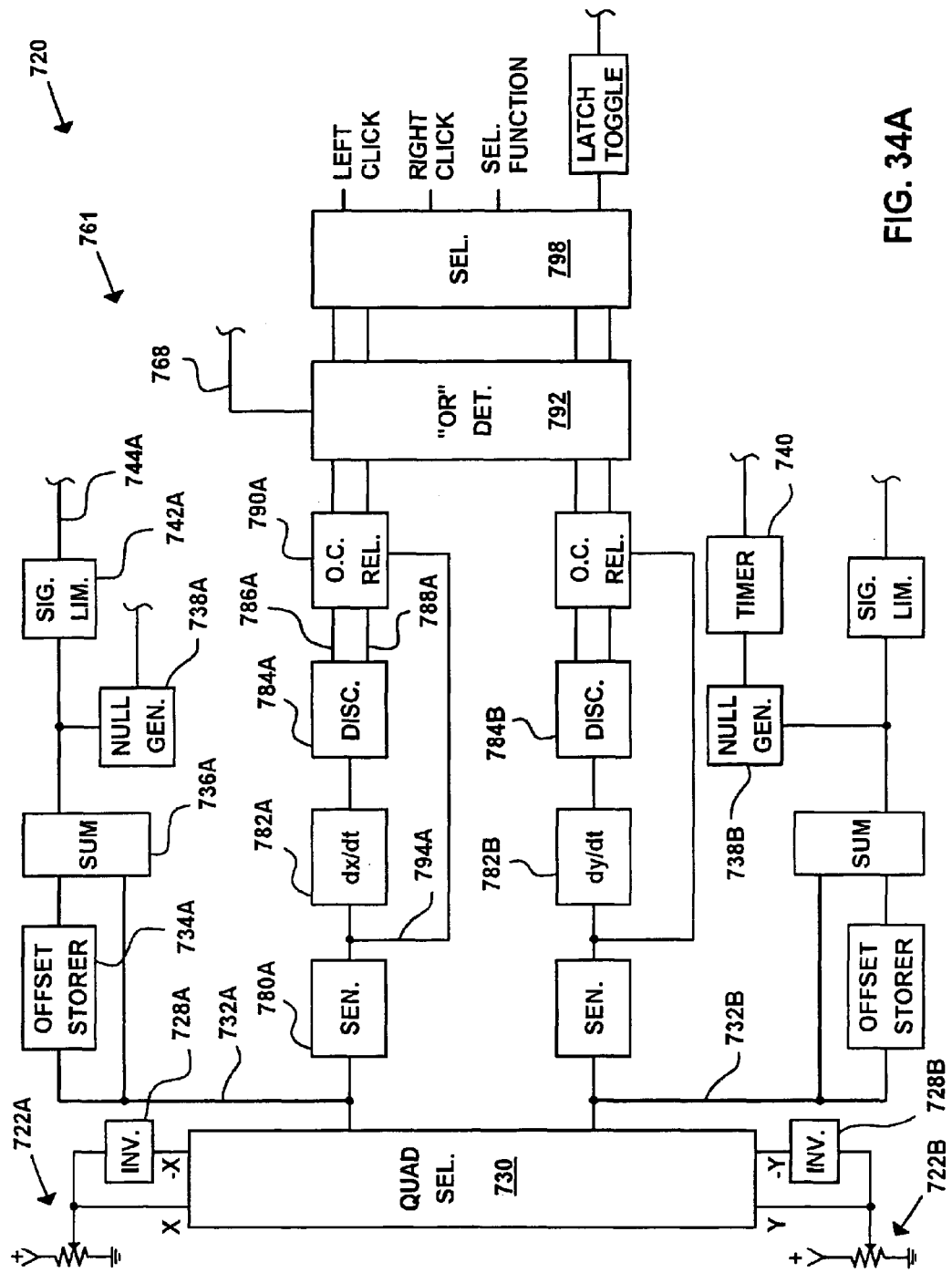
FIG. 34A is a first portion of a block diagram illustrating use of the rate-of-change switch of the present invention in conjunction with user-actuated transducers, such as a joystick X-Y controller or head-attached X-Y tilt transducers, to control mouse-switching functions, such as click or click and drag functions, and/or to actuate macros or "hot key" functions by user-actuating one or both of the transducers more rapidly than user-actuating used to move the cursor.

Referring now to FIGS. 34A and 34B, the present invention, generally as taught previously herein, is capsulized into function blocks that disclose the preferred embodiment, whether constructed of analog, digital components, or a combination thereof.

Referring now to FIG. 34A, a rate-of-change mouse 720 includes a rate-of-change control 721 and transducers 722A and 722B. The transducers 722A and 722B are illustrated as potentiometers connected between a source voltage and an electrical ground. The transducers 722A and 722B each produce variable electrical signals that are voltages intermediate of the source voltage and the electrical ground. Voltages higher than the precise-null voltage 261 of FIG. 16A are plus electrical signals and voltages below the precise-null voltage 261 are minus electrical signals.

Referring now to FIGS. 1 and 34A, if the tilt X-Y transducer 16 is used instead of the transducers 722A and 722B, each of the tilt transducers in the tilt X-Y transducer 16 will produce the approximate-null electrical signal, 260 of FIG. 16A. The approximate-null electrical signal 260 of each transducer may be either larger or smaller than the precise-null electrical signal 261, depending upon initial positioning of the tilt X-Y transducer 16 on the head 18, and depending upon initial positioning of the head 18. If the person 20 of FIG. 1 has body tremors, most likely the tilt X-Y transducer 16 will produce the tremoring electrical signal 260 of FIG. 16A.

Referring again to FIG. 34A, electrical signals produced by the transducer 722A are x electrical signals, and electrical signals produced by the transducer 722B are y electrical signals. As defined herein, when the x and y signals are larger than their respective null electrical signals, they are plus x electrical signals, and when they are lower than their respective null electrical signals, they are minus y electrical signals.

Referring now to FIG. 34B, a plus electrical signal will move a display cursor 724 of a display device or monitor 726 in one direction, and a minus electrical signal is effective to move the cursor 724 in an opposite direction. More particularly, plus x electrical signals are effective to move the cursor 724 horizontally to the right at speeds proportional to the plus x electrical signals, and plus y electrical signals are effective to move the cursor 724 upwardly at speeds that are proportional to the plus y electrical signals. That is, in response to an x or a y electrical signal, the cursor 724 will continue to move at a velocity that is proportional to the x or y electrical signal.

Referring again to FIG. 34A, inverters 728A and 728B, that are connected to the transducers 722A and 722B, invert plus x and y electrical signals, respectively into minus x and minus y electrical signals. As shown, both inverted and noninverted x and y signals are fed into a quad selector 730. The quad selector 730 comprises an array of manual switches that selectively connects noninverted x electrical signals, inverted x electrical signals, noninverted y electrical signals, or inverted y electrical signals to either a conductor 732A or a conductor 732B.

In the following discussion, function blocks that are attached to the conductor 732A pertain to x electrical signals and function blocks that pertain to x electrical signals; and function blocks that are attached to the conductor 732B pertain to y electrical signals and function blocks that pertain to y electrical signals. Function blocks nearer the top and bottom of the sheet pertain to cursor-moving electrical signals; and function blocks that are interposed vertically therebetween pertain to computer-mouse switching functions. Since the x and y electrical signals are handled identically, generally it will be unnecessary to discuss the functions of both x and y electrical signals.

Starting with the conductor 732A, x electrical signals from the quad selector 730 proceed to an offset storer 734A. In operation, the transducer 722A is approximately nulled, as described above. That is, if the transducer 722B is a tilt transducer, such as one of the tilt transducers in the tilt X-Y transducer 16 of FIG. 1, and the tilt X-Y transducer 16 is attached to the head 18 of the person 20, as shown in FIG. 1, then the tilt transducers in the tilt X-Y transducer 16 are both positioned on the head 18 in approximate-null positions.

Therefore, whenever a transducer, such as one of the tilt transducers in the tilt X-Y transducer 16 of FIG. 1, or the transducer 722A of FIG. 34A, is positioned to an approximate-null position and activated by applying power thereto, by any method taught herein, or any other method, the offset storer 734A stores the offset electrical signal, or initializing error, that occurs because of inexact positioning of the tilt X-Y transducer 16 or the transducer 722A.

As shown, both the transducer 722A and the offset storer 734A are connected to a summer 736A, so that, when the transducer 722A is actuated subsequently, the summer 736A outputs the algebraic difference between the initializing error and subsequently produced electrical outputs of the transducer 722A. The algebraic differences between the initializing error and subsequently produced electrical signals are corrected electrical signals.

However, during initialization, a null generator 738A, that is connected to the summer 736A, pulls the electrical signal, at the output of the summer 736A, to a precise-null electrical signal until initialization of the transducer 722A is complete. That is, until the x electrical signal is released from the precise-null electrical signal of the null generator 738A, the x signal is pulled to the precise-null electrical signal. Preferably, a timer 740 starts initialization of the transducers 722A and 722B, and controls both null generators, 738A and 738B. Optionally, a single null generator may be used or separate timers may be used.

The summer 736A delivers corrected x electrical signals to a signal limiter 742A. The signal limiter 742A provides means for selectively limiting speeds of operation by limiting magnitudes of the y electrical signals. The signal limiter 742A of FIG. 34A delivers selectively limited electrical signals to a conductor 744A of FIGS. 34A and 34B.

Referring now to FIG. 34B, as shown, the conductor 744A delivers corrected and limited x electrical signals to a transmission delay, or time averager, 746A; so that movement of the cursor 724 by x electrical signals is delayed. There are two reasons for delaying transmission, or time-averaging, the x electrical signals. One reason is to smooth any fluctuations in the x electrical signals that might be caused by tremors in user-actuating the transducer 722A. The other reason pertains to mouse-switching functions and will be described subsequently.

As shown, transmission of x electrical signals is divided into a delayed-time path that includes a proportioner 750A, and a real-time path that includes a fast-back bypass 752A. The fast-back bypass 752A will be discussed subsequently.

The proportioner 750A selectively proportions the time-averaged x electrical signal, as produced by the time averager 746A, thereby providing selectively adjustable sensitivity for whichever transducer, 722A or 722B, is selected by the quad selector 730 of FIG. 34A, to provide x electrical signals. This feature helps match system performance to the physical dexterity of individual users.

The proportioner 750A delivers the selectively proportioned x electrical signal to an adjustable null-width generator 754A. As taught in conjunction with FIG. 16G, a null width embraces a range of electrical signals between the null-hi electrical signal 282A and the null-lo electrical signal 282B, that are disposed both above and below the precise-null electrical signal 261 of FIG. 16G.

Electrical signals that are within the null width of the null-width generator 754A cannot move the cursor 724 because a null and snap-back 756A, that is connected to the null-width generator 754A by a conductor 758A, pulls the x electrical signals to a precise-null electrical signal whenever the proportioned x electrical signals are within the null width. The null width, and especially the fact that the null width is selectively adjustable, is essential for those whose motor skills are limited, and assures ease of operation for those whose motor skills are good to excellent.

In operation, the null-width generator 754A is selectively adjustable to set both null-hi and null-lo limits of the null-width generator 754A. Whenever an x electrical signal in the null-width generator 752A is within the null width, the null-width generator 752A sends a signal through the conductor 758A to the null and snap-back 756A, and the null and snap-back 756A nulls the x signal at the output of the null-width generator 754A.

An x electrical signal that goes higher than the null-hi electrical signal 282A of the null width of FIG. 16G, is abruptly released by the null and snap-back 756A, so that the released x electrical signal is undiminished by the null width. In like manner, an x electrical signal that goes smaller than the null-lo electrical signal 282B of the null width is abruptly released by the null and snap-back 754A, so that the released x electrical signal is undiminished by the null width.

Since the null and snap-back 756A releases the x electrical signal abruptly, this abrupt change in the x electrical signal would cause the cursor 724 to jump in the X direction, except that an acceleration limiter 760A receives undiminished magnitudes of the x electrical signal from the null-width generator 754A, including abrupt increases, and progressively releases them, so the cursor 724 accelerates in an X direction smoothly.

As shown, the acceleration limiter 760A is connected to a x>y prioritizer 762A, and the x>y prioritizer 762A is connected to a y>x prioritizer 762B. Whenever an x electrical signal in the x>y prioritizer 762A is greater than a y electrical signal in the y>x prioritizer 762B, the y>x prioritizer 762B blocks transmission of the y electrical signal.

Referring now to FIGS. 1 and 43B, if the tilt X-Y sensors are head-attached, and if the user tilts the head 18 more nearly sideways, in an X direction, than forward and backward, in a Y direction, then with an ON/OFF switch 764 in the ON position, the prioritizer 762B will prevent the y electrical signal from actuating the cursor 724 in a Y direction. And with the ON/OFF switch 764 still in the ON position, if the user positions the head 18 more nearly in front-to-back movement than side-to-side movement, then the prioritizer 762A will block the x electrical signal.

The x>y prioritizer 762A delivers the x electrical signal to a cursor-freeze 766A. Both the cursor-freeze 766A and a cursor-freeze 766B are connected to a conductor 768. The cursor-freeze 766A prevents an x electrical signal from proceeding to a cursor driver 770A and to the display device 726 when the conductor 768 is energized. In like manner, the cursor-freeze 766B prevents a y electrical signal from proceeding to a cursor driver 770B when the conductor 768 is energized. Operation of the cursor freeze 766A will be discussed in more detail in conjunction with switching functions of the present invention.

As previously described in this summary, any time that the time-averaged x electrical signal is reduced to be within the null width of the null-width generator 754A, the null and snap-back 756A pulls the x electrical signal to the null electrical signal. Thus, the null-width generator 754A and the null and snap-back 756A help prevent the cursor 724 from overtraveling when the user suddenly positions the transducer 722A to an approximate null position.

However, the time averager 746A, which in an analog configuration includes a capacitor, delays reduction of the x electrical signal, so that the cursor 724 continues to move in the X direction when the user suddenly positions the transducer 722A to an approximate null position.

To correct this problem, the fast-back bypass 752A provides a real-time path to the conductor 744A. Therefore, the time averager 746A cannot delay user-actuated changes in the x electrical signal in the conductor 744A from being reflected almost instantly at the output of the null-width generator 754A whenever user-actuated changes in the x signal are in a direction toward the null electrical signal. Thus it can be seen that the fast-back bypass 752A helps prevent the cursor 724 from proceeding past the user's desired X position.

That is, whenever the user positions the transducer 722A to a position that generates an x electrical signal that is inside the null width of the null-width generator 754A, the fast-back bypass 752A reduces the x electrical signal to this value at the input to the null-width generator 754A, and the null-width generator 754A and the null and snap-back 756A cooperate to pull the x electrical signal to the null electrical signal almost instantly, thereby stopping movement of the cursor 724 almost instantly, and preventing the cursor 724 from overrunning a desired X position.

Referring again to FIG. 34A, an x electrical signal, in the conductor 732A, in addition to proceeding to the offset storer 734A, proceeds to an adjustable sensitivity control 780A wherein sensitivity of switching functions to the transducer 722A can be selectively adjusted. For instance, whether the rate-of-change control 721 is used in conjunction with the tilt X-Y transducers 16 of FIG. 1 or the joystick X-Y controller 17 of FIG. 2B, the adjustable sensitivity control 780A can be adjusted to provide switching functions in response to actuation of the transducers, 16 or 17 at only a slightly faster velocity than that used to move the cursor 724 of FIG. 34B. Or the adjustable sensitivity control 780A can be adjusted to require much more rapid actuation of the transducers, 16 or 17, to actuate switching functions.

The adjustable sensitivity control 780A delivers x electrical signals to a dx/dt differentiator 782A wherein the x electrical signals are differentiated by an analog differentiator, as shown in FIG. 1, or by digital differentiation. The differentiated x electrical signals are fed into a discriminator 784A wherein the magnitudes of the differentiated signals are evaluated.

The discriminator 784A outputs a signal into a conductor 786A if the differentiated x electrical signal is increasing at, or above, an adjustable dx/dt minimum limit. And, the differentiator 784A outputs a signal into a conductor 788A if the differentiated signal is decreasing at, or above, an adjustable dx/dt minimum limit. Therefore, each of the discriminators, 784A and 784B, outputs two signals.

If the joystick X-Y controller 17 of FIG. 2C is used for the transducers 722A and 722B, switching control can be achieved, even by those with poor motor skills, by bumping the joystick X-Y controller 17 in the desired direction.

However, it must be remembered that the discriminator 784A outputs two switching signals. It outputs one switching signal when dx/dt is greater than a selectively determined magnitude in response to an increasing x electrical signal, and it outputs an other switching signal when dx/dt is greater than a selectively determined magnitude in response to a decreasing x electrical signal.

Therefore, when the X-Y joystick controller 17 is bumped in one X direction, the resultant dx/dt is large, and the desired switching function occurs. However, the rapidly bumped movement stops abruptly, so that the x electrical signal decreases abruptly, and the resultant dx/dt may be so large that an unwanted switching function occurs.

To prevent these unwanted switching functions, the conductors 786A and 788A are connected to an over-center release 790A. When a dx/dt produces a desired switching signal in the conductor 786A, the over-center release 790A allows the switching signal in the conductor 786A to proceed through to an "OR" detector 792. However, the over-center release 790A prevents a switching signal in the conductor 788A from proceeding through the over-center release 790A to the "OR" detector 792 until a conductor 794A detects that the x electrical signal has crossed the electrical null, thereby preventing "bounce-back" switching functions.

Alternately, as shown in FIG. 35, a timed-release 796A, replaces the over-center release 790A, and prevents a switching signal in the conductor 788A from passing though the timed-release 796A until a selectably adjustable time has passed after the discriminator 784A has sent a switching signal to the conductor 786B.

Referring now to FIGS. 43A, 43B, and 44, but more particularly to FIGS. 43A and 43B, switching signals produced by the discriminator 784A and delivered through the conductors 786A and 788A to either the over-center release 790A or a timed-release 796A, proceed to the "OR" detector 792. In like manner, the transducer 722B, a dy/dt differentiator 782B, and the discriminator 784B selectively produce two switching signals, so that the "OR" detector 792 selectively receives up to four switching signals.

Whenever the "OR" detector 792 receives any one of these four switching signals, it outputs a signal into the conductor 768. And, as shown, the conductor 768 is connected to, and actuates, both the cursor-freeze 766A and the cursor-freeze 766B.

Therefore, when either of the transducers, 722A or 722B, or any other suitable transducer is actuated more rapidly, than used to move the cursor 724, for the purpose of achieving a switching function, the cursor-freeze 766A and the cursor-freeze 766B, in cooperation with the "OR" detector 792, provide means for preventing movement of the cursor 724 in either an X or a Y direction.

Continuing to consider preventing switching functions from moving the cursor 724, the time averager 746A cooperates with the "OR" detector 792 and the cursor-freeze 766A by providing a delay in transmitting an increased x electrical signal, through the time-averager 746A to the cursor 724. When done digitally, preferably, not only is a delay provided, but also a number of digital magnitudes of the x electrical signal are added and averaged sequentially.

Returning now to FIG. 34A, a function selector 798 provides means for selectively choosing which of the switching signals, x increasing, x decreasing, y increasing, or y decreasing, actuates left click, right click, click and drag, right click, and/or other selected switching functions.

Since the switching functions produced by the discriminators, 784A and 784B, are momentary, the click and drag function is a click and latch function that is toggled. That is, a first switching function clicks and latches. Then the cursor 724 can be actuated in X and/or Y directions by actuating the transducers, 722A and/or 722B. When the cursor 724 has been dragged to a desired position, the click and drag function is released by toggling the click and drag function.

In FIG. 34A, one output of the function selector 798 is labeled, "SEL. FUNCTION." This output, and/or the other three outputs of the function selector 798, can be used to access or switch any reasonable number or combination of functions. Further, as taught in conjunction with FIGS. 9 and 10, a transducer of the present invention can be actuated a plurality of times, in the same or in opposite directions, to achieve additional switching functions.

These additional switching functions can be used for any mouse-switching function, or for any other desired use, such as selecting macros and "hot keys." For instance, in CAD drawing, hot keys are time-savers. And by assigning the additional switching functions as hot keys, productivity is further enhanced. In like manner, user-developed macros can also be time-savers.

Further, as shown in FIG. 1, and as described therewith, the present invention allows user-actuated transducers, such as the tilt X-Y transducers 16 of FIG. 1 or the joystick X-Y controller 17 of FIG. 2C, to be used for switching control from one apparatus to an other, and then to control operating functions of the selected apparatus by the user-actuating the transducers, 16 or 17. For instance as shown in FIG. 1, user-actuated transducers, such as the transducers 16 or 17, can be used to access control of the power wheelchair 12, to control both speeds and turns of the power wheelchair 12, to switch control from the power wheelchair 12 to the environmental control unit (ECU) 14, to select a task in the ECU 14, to control the selected task, and to switch control of the transducers, 16 or 17, to any other device, such as the cursor 724 of FIG. 34B.

Therefore, the present invention provides means for switching control to, and controlling, nearly any conceivable task or plurality of tasks, in nearly any conceivable apparatus, by nearly any desired sequence of user-produced electrical signals produced by nearly any conceivable type of user-actuated transducers, whether the present invention is practiced by analog components, digital technology, or a combination thereof.

Method steps of the method of the present invention comprise: selectively actuating a transducer; producing selectively variable electrical signals in response to the selectively actuating step; moving a cursor in plus and minus directions in response to the electrical signals; more rapidly actuating the transducer; performing a switching step in response to the more rapidly actuating step; and preventing the more rapidly actuating step from moving the cursor; the performing step comprises determining a rate-of-change in the electrical signals caused by the more rapidly actuation step; the producing step comprises selectively producing increasing and decreasing ones of the electrical signals; the switching step comprises differentiating one of the electrical signals; the preventing step comprises the differentiating step; the preventing step further comprises delaying transmission of the one electrical signals; and the preventive step alternately comprises time-averaging the electrical signals.

Method steps of the present invention further comprises switchably selecting whether the moving step comprises moving the cursor horizontally or vertically; switchably selecting a direction of the moving step that occurs in response to increasing ones of the electrical signals; the selectively actuating step comprises actuating a tilt transducer; the selectively actuating step comprises attaching a tilt transducer to a body member of a user; selectively actuating step comprises attaching an X-Y tilt transducer to a user's head; the selectively actuating step comprises selectively actuating a joystick X-Y controller; and the switching step comprises clicking.

Method steps of the present invention still further comprise: selectively actuating a second transducer and moving the cursor in different plus and minus directions in response the step of selectively actuating the second transducer; the switching step comprises clicking and latching; the method further comprises dragging the cursor in response to selectively actuating one or both of the transducers subsequent to the clicking and latching step; and the method still further comprises releasing the latching step in response to more rapidly actuating one of the transducers.

Method steps of the invention yet further comprise: positioning the transducer to an approximate-null position; producing an approximate-null electrical signal as a function of the approximate null position; preventing the approximate-null electrical signal from moving the transducer as a function of the approximate-null electrical signal; producing a precise-null electrical signal; correcting electrical signals subsequently produced by the transducer as a function of a difference between the approximate-null electrical signal and the precise-null electrical signal; and/or initiating a time delay that includes the preventing step.

Method steps of the present invention still yet further comprise: establishing a precise-null electrical signal; establishing a null width for the electrical signals; precluding the moving step when the electrical signals are within the null width; releasing the precluding step when the electrical signals are outside the null width; moving the cursor by the electrical signals undiminished by the null width subsequent to the releasing step; the moving step comprises moving the cursor initially at a low velocity and progressively increasing the velocity when the electrical signals are outside the null width; allowing the velocity to decrease more rapidly than the increasing step; pulling the electrical signals toward the precise-null electrical signal substantially irrespective of the time-averaging step when the electrical signals move from outside the null width to inside the null width; time-averaging the electrical signals prior to the moving step; and stopping the moving step irrespective of the time-averaging step.

Method steps of the present invention still yet further comprise: selectively actuating the transducer in first and second directions; the selectively actuating in the first and second directions comprises producing the electrical signals on opposite sides of the precise-null electrical signal; the more rapidly actuating step comprises more rapidly actuating the transducer in one of the directions; the method still further comprises more rapidly actuating the transducer in an other of the directions; the step of more rapidly actuating the transducer in the other direction comprises performing an other switching step; preventing rapidly stopping the more rapidly actuating step from performing an other switching step; and preventing the more rapidly actuating of the transducer in the other direction from performing the other switching step unless the electrical signals cross the precise-null electrical signal before the other more rapidly actuating step.

Method steps of the present invention further comprise: performing an other switching step in response to an other more rapidly actuating step; controlling an other function proportional to selectively actuating the transducer subsequent to the other more rapidly actuating step; switching control to a multiplexer in response to the other more rapidly actuating step; performing still an other more rapidly actuating step; selecting a task from the multiplexer in response to still an other more rapidly actuating step; and controlling the selected task in response to an other selectively actuating step; switching control of the transducer to a power wheelchair in response to the other more rapidly actuating step; controlling speeds the wheelchair in response to subsequent ones of the selectively actuating steps; and switching control of the first the transducer back to the moving step in response to still another of the more rapidly actuating steps.

Method steps of the present invention alternately comprise: producing selectively variable electrical signals; moving a cursor in response to the electrical signals; rapidly changing the electrical signals; performing a switching step in response to the rapidly changing step; the performing step comprises determining a rate-of-change in the electrical signals caused by the changing actuation step; preventing the rapidly changing electrical signals from moving the cursor; the preventing step comprises delaying transmission of the rapidly changing electrical signals; the preventing step alternately comprises time-averaging the electrical signals; the method further comprises preventing the rapidly changing electrical signals from moving the cursor; both the performing and preventing step comprises differentiating the rapidly changing electrical signals; comprises performing an other switching step in response to another of the rapidly changing step; performing an other switching step in response to rapidly changing the electrical signals in an opposite direction; preventing the second the rapidly changing step from performing the other switching step unless the second the rapidly changing step is performed on an opposite side of the null electrical signal; and comprises preventing a rapid reduction in the rapidly changing step from performing an other switching step.

Method steps of the present invention also alternately comprise: selectively actuating first and second transducers; moving a cursor in horizontal and vertical directions in response to the selectively actuating step; more rapidly actuating one of the transducers; performing a switching step in response to the more rapidly actuating step; the actuating step comprises produces electrical signals; the performing step comprises determining a rate-of-change in the electrical signals caused by the more rapidly actuation step; preventing the more rapidly actuating step from moving the cursor; the preventing step comprises delaying the response of the cursor to the selectively actuating step; the preventing step comprises differentiating the electrical signals; the switching step comprises differentiating the electrical signals; performing an other switching step in response to an other more rapidly actuating step; preventing rapid reduction of the rapidly actuating step from performing an other switching step.

Method steps of the present invention further alternately comprise: producing plus x, minus x, plus y, and minus y signals; moving a cursor in plus X, minus X, plus Y, and minus Y directions in response to the producing step; selectively increasing one of the signals; performing a switching step in response to the selectively increasing step; the performing step comprises determining a rate-of-change caused by the selectively increasing step; preventing the selectively increasing step from moving the cursor; the preventing step comprises delaying transmission of the selectively increasing of the signal; the preventing step comprises differentiating the selectively increased signal; selectively increasing an other of the signals; performing an other switching step in response to the selectively increasing the other signal; and preventing a sudden reduction in the selectively increasing step from performing the other switching step.

In summary, the present invention provides apparatus and method for positioning a cursor of a display device or monitor, and for providing switching functions, such as click and drag mouse-switching functions, in response to selective actuation of transducers by a user.

In addition, the present invention provides apparatus and method for selecting and actuating "hot keys" and/or macros, for selecting and controlling any computer or AAC device, and/or for controlling other apparatus, such as ECUs or power wheelchairs, in response to a user actuating X and Y transducers, such as the tilt X-Y transducers 16 or joystick X-Y controllers 17, or in response to a user actuating of any other type of transducer device that can be interfaced to the rate-of-change control taught herein.

More particularly, the present invention provides apparatus and method for performing logic functions, such as switching, as a function of differentiated electrical signals of mechanical-to-electrical transducers.

An electrical signal of a mechanical-to-electrical transducer is differentiated as a function of time (dx/dt or dy/dt), thereby producing a rate-of-change electrical signal that is a function of the velocity of the input to the transducer, or its electrical signal. A discriminator and digital logic processes the rate-of-change signal to provide any desired switching or logic function.

Therefore, the present invention provides apparatus and method for proportionally controlling a device in response to proportional mechanical inputs to a mechanical-to-electrical transducer, and for performing digital logic as a function of differentiated electrical signals of the transducer.

The present invention provides apparatus and method for selecting from a plurality of controllable tasks, and for selectively controlling each selected task by actuation of any type of switch, or by inputs to any type of transducer that produces electrical signals that are proportional to inputs.

Further, the present invention provides apparatus and method for: enabling a control system, or apparatus, in response to a predetermined magnitude of an electrical signal produced by a mechanical-to-electrical transducer; selectively controlling either a first or a second electrical device in response to differentiated electrical signals of the transducer; controlling the first device proportional to electrical signals from the transducer; selecting tasks to be performed from the second device in response to differentiated electrical signals of the transducer; and controlling the selected tasks in response to differentiated electrical signals of the transducer.

While the present invention has been taught in conjunction with X-Y transducers that produce a constant electrical signal proportional to a given input; it should be understood that the principles taught herein can be practiced using transducers that produce an output proportional to input velocity, such as computer mice, or mouse emulators, such as a touch pads or track balls, by interfacing the mouse or mouse emulator with apparatus taught herein, or by performing the methods steps recited in the appended claims in response to a mouse or mouse emulator irrespective of apparatus.

Therefore, when a mouse, or any kind of mouse emulator, is used as taught herein, macros can be inserted into a text, "hot keys" can be actuated, and/or other switching functions, such as click or click and drag, can be achieved simply by moving the mouse, or mouse-emulator slightly faster, in +x, −x, +y, and/or −y directions than used for positioning the cursor.

In conclusion, in a preferred embodiment, the rate-of-change control 521 is used in conjunction with the tilt X-Y transducers 16, thereby enabling some severely handicapped persons to operate complicated computer programs such as CAD drawing programs, increasing productivity of those who work simultaneously on a telephone and a computer, and also increasing productivity of some other workers. The rate-of-change device 721 may also be used in conjunction with the joystick X-Y controller 17 thereby enabling other severely handicapped persons to perform mouse-clicking operations by merely bumping the joystick X-Y controller 17. Finally, as taught above, a computer mouse, or mouse emulator, may be interfaced with the rate-of-change device 721 to provide a new convenience of operation and increased productivity for computer users.

While the present invention has been disclosed in conjunction with analog electronic components, the present invention, as summarized in conjunction with FIGS. 34A, 34B, and 35 by function blocks, can be practiced using the tilt X-Y transducer 16, using the joystick X-Y controller 17, or using a computer mouse, or mouse emulator, in combination with analog technology, analog and digital technology, a single computer chip, a plurality of computer chips, and/or in a micro-processor, or by any other technology that performs the steps recited in the appended claims, without departing from the scope of the present invention.

While specific apparatus and method have been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims and their respective recitations.

What is claimed is:

1. A method which comprises:
   a) selectively actuating a transducer;
   b) producing selectively variable electrical signals in response to said selectively actuating step;
   c) moving a cursor in plus and minus directions in response to said electrical signals;
   d) more rapidly actuating said transducer;
   e) performing a switching step in response to said more rapidly actuating step; and
   f) preventing said more rapidly actuating step from moving said cursor.

2. A method as claimed in claim 1 in which said performing step comprises performing said switching step when said more rapidly actuating step causes a predetermined rate-of-change in said electrical signals.

3. A method as claimed in claim 1 in which said preventing step comprises delaying transmission of said electrical signals to said cursor.

4. A method as claimed in claim 1 in which said preventing step comprises time-averaging said electrical signals.

5. A method as claimed in claim 1 in which:
   a) said producing step comprises selectively producing increasing and decreasing electrical signals; and
   b) said preventing step further comprises differentiating a selected one of said electrical signals.

6. A method as claimed in claim 1 in which:
   a) said producing step comprises selectively producing increasing and decreasing electrical signals; and
   b) said performing step comprises differentiating a selected one said electrical signals.

7. A method as claimed in claim 1 in which:
   a) said producing step comprises selectively producing increasing and decreasing electrical signals;
   b) said switching step comprises differentiating a selected one of said electrical signals;
   c) said preventing step comprises said differentiating step; and
   d) said preventing step further comprises delaying transmission of said selected electrical signal.

8. A method as claimed in claim 1 in which:
   a) said producing step comprises selectively producing increasing and decreasing electrical signals;
   b) said switching step comprises differentiating a selected one of said electrical signals;
   c) said preventing step comprises said differentiating step; and
   d) said preventing step further comprises time-averaging said selected electrical signal.

9. A method as claimed in claim 1 in which said method further comprises selecting whether said moving step comprises moving said cursor horizontally or vertically.

10. A method as claimed in claim 1 in which:
    a) said producing step comprises selectively producing increasing and decreasing electrical signals; and
    b) said method further comprises selecting a direction of said moving step that occurs in response to said increasing electrical signals.

11. A method as claimed in claim 1 in which said selectively actuating step comprises actuating a tilt transducer.

12. A method as claimed in claim 1 in which said selectively actuating step comprises attaching a tilt transducer to a body member of a user.

13. A method as claimed in claim 1 in which said selectively actuating step comprises attaching an X-Y tilt transducer to a user's head.

14. A method as claimed in claim 1 in which said selectively actuating step comprises selectively actuating a joystick X-Y controller.

15. A method as claimed in claim 1 in which said selectively actuating step comprises selectively actuating a mouse.

16. A method as claimed in claim 1 in which said selectively actuating step comprises selectively actuating a mouse emulator.

17. A method as claimed in claim 1 in which said switching step comprises clicking.

18. A method as claimed in claim 1 in which said switching step comprises clicking and latching.

19. A method as claimed in claim 1 in which:
    a) said method further comprises selectively actuating a second transducer and moving said cursor in different plus and minus directions in response said step of selectively actuating said second transducer;
    b) said switching step comprises clicking and latching; and
    c) said method further comprises dragging said cursor in response to selectively actuating one or both of said transducers subsequent to said clicking and latching step.

20. A method as claimed in claim 1 in which:
    a) said method further comprises selectively actuating a second transducer and moving said cursor in different plus and minus directions in response said step of selectively actuating said second transducer;
    b) said switching step comprises clicking and latching; and
    c) said method still further comprises releasing said latching step in response to more rapidly actuating one of said transducers.

21. A method as claimed in claim 1 in which said method further comprises nulling said transducer prior to said selectively actuating step.

22. A method as claimed in claim 1 in which said method further comprises performing the following steps prior to said selectively actuating step:
    a) approximately nulling said transducer; and
    b) correcting said electrical signals as a function of said approximate nulling step.

23. A method as claimed in claim 1 in which said method further comprises performing the following steps prior to said selectively actuating step:
    a) user positioning said transducer to an approximate-null position; and
    b) correcting electrical signals produced by said transducer as a function of said approximate-null position.

24. A method as claimed in claim 1 in which said method further comprises performing the following steps prior to said selectively actuating step:
    a) positioning said transducer to an approximate-null position;

b) producing an approximate-null electrical signal as a function of said positioning step;
c) preventing said approximate-null electrical signal from moving said cursor; and
d) correcting electrical signals produced by said transducer as a function of said approximate-null electrical signal.

25. A method as claimed in claim 1 in which said method further comprises performing the following steps prior to said selectively actuating step:
   a) positioning said transducer to an approximate-null position;
   b) producing an approximate-null electrical signal as a function of said approximate null position;
   c) preventing said approximate-null electrical signal from moving said transducer as a function of said approximate-null electrical signal;
   d) producing a precise-null electrical signal; and
   e) correcting electrical signals subsequently produced by said transducer as a function of a difference between said approximate-null electrical signal and said precise-null electrical signal.

26. A method as claimed in claim 25 in which said method further comprises initiating a time delay that includes said preventing step.

27. A method as claimed in claim 1 in which said method further comprises:
   a) establishing a null width for said electrical signals;
   b) precluding said moving step when said electrical signals are within said null width;
   c) releasing said precluding step when said electrical signals are outside said null width; and
   d) said moving step comprises moving said cursor by said electrical signals undiminished by said null width subsequent to said releasing step.

28. A method as claimed in claim 1 in which said method further comprises:
   a) establishing a null width for said electrical signals;
   b) precluding said moving step when said electrical signals are within said null width;
   c) said moving step comprises moving said cursor initially at a low velocity and progressively increasing said velocity when said electrical signals are outside said null width; and
   d) said moving step further comprises moving said cursor with electrical signals undiminished by said null width when said electrical signals are outside said null width.

29. A method as claimed in claim 1 in which said method further comprises:
   a) establishing a null width for said electrical signals;
   b) establishing a precise-null electrical signal; and
   b) pulling said electrical signals toward said precise-null electrical signal when said electrical signals are within said null width.

30. A method as claimed in claim 1 in which said method further comprises:
   a) establishing an adjustable null width for said electrical signals;
   b) establishing a precise-null electrical signal;
   c) said moving step comprises moving said cursor initially at a low velocity and progressively increasing said velocity when said electrical signals are outside said null width;
   d) said moving step further comprises moving said cursor with electrical signals undiminished by said null width when said electrical signals are outside said adjustable null width; and e) pulling said electrical signals toward said precise-null electrical signal when said electrical signals are within said null width.

31. A method as claimed in claim 1 in which said moving step comprises moving said cursor at a velocity that is proportional to said electrical signals.

32. A method as claimed in claim 1 in which said moving step comprises:
   a) initially moving said cursor at a low velocity; and
   b) increasing said velocity of said cursor until said velocity is proportional to said electrical signals.

33. A method as claimed in claim 1 in which said moving step comprises:
   a) initially moving said cursor at a low velocity;
   b) increasing said velocity of said cursor until said velocity is proportional to said electrical signals; and
   c) allowing said velocity to decrease more rapidly than said increasing step.

34. A method as claimed in claim 1 in which said method further comprises time-averaging said electrical signals prior to said moving step.

35. A method as claimed in claim 1 in which said method further comprises:
   a) time-averaging said electrical signals prior to said moving step; and
   b) stopping said moving step irrespective of said time-averaging step.

36. A method as claimed in claim 1 in which said method further comprises:
   a) establishing a precise-null electrical signal;
   b) establishing a null width for said electrical signals that embraces said precise-null electrical signal;
   c) time-averaging said electrical signals; and
   d) pulling said electrical signals toward said precise-null electrical signal substantially irrespective of said time-averaging step when said electrical signals move from outside said null width to inside said null width.

37. A method as claimed in claim 1 in which said method further comprises performing an other switching step in response to an other more rapidly actuating step.

38. A method as claimed in claim 1 in which:
   a) said method further comprises establishing a precise-null electrical signal;
   b) said selectively actuating step comprises selectively actuating said transducer in first and second directions;
   c) said selectively actuating in said first and second directions comprises producing said electrical signals on opposite sides of said precise-null electrical signal;
   d) said more rapidly actuating step comprises more rapidly actuating said transducer in one of said directions;
   e) said method still further comprises more rapidly actuating said transducer in an other of said directions;
   f) said step of more rapidly actuating said transducer in said other direction comprises performing an other switching step; and
   g) said method still further comprises preventing said more rapidly actuating of said transducer in said other direction from performing said other switching step unless said electrical signals cross said precise-null electrical signal before said other more rapidly actuating step.

39. A method as claimed in claim 1 in which said method further comprises preventing rapidly stopping said more rapidly actuating step from performing an other switching step.

40. A method as claimed in claim 1 in which said method further comprises:
   a) performing an other switching step in response to an other more rapidly actuating step; and b) controlling an other function proportional to selectively actuating said transducer subsequent to said other more rapidly actuating step.

41. A method as claimed in claim 1 in which said method further comprises:
   a) performing an other more rapidly actuating step; and
   b) switching control to a multiplexer in response to said other more rapidly actuating step.

42. A method as claimed in claim 1 in which said method further comprises:
   a) performing an other more rapidly actuating step;
   b) switching control of said transducer to a multiplexer in response to said other more rapidly actuating step;
   c) performing still an other more rapidly actuating step; and
   d) selecting a task from said multiplexer in response to still an other more rapidly actuating step.

43. A method as claimed in claim 1 in which said method further comprises:
   a) performing an other more rapidly actuating step;
   b) switching control of said transducer to a multiplexer in response to said other more rapidly actuating step;
   c) performing still an other more rapidly actuating step;
   d) selecting a task from said multiplexer in response to said still other more rapidly actuating step; and
   e) controlling said selected task in response to an other selectively actuating step.

44. A method as claimed in claim 1 in which said method further comprises:
   a) performing an other more rapidly actuating step;
   b) switching control of said transducer to a power wheelchair in response to said other more rapidly actuating step; and
   c) controlling speeds of said wheelchair in response to subsequent ones of said selectively actuating steps.

45. A method as claimed in claim 1 in which said method further comprises:
   a) selectively actuating an other transducer;
   b) switch control of a power wheelchair in response to more rapidly actuating a selected one of said transducers; and
   c) controlling speeds and turns of said wheelchair in response to subsequent selectively actuating steps.

46. A method as claimed in claim 1 in which said method further comprises:
   a) selectively actuating an other transducer;
   b) switching control of said transducers to a power wheelchair in response to more rapidly actuating one of said transducers;
   c) controlling speeds of said power wheelchair in response to subsequent selectively actuating of said transducers; and
   d) switching control of the first said transducer back to said moving step in response to still another of said more rapidly actuating steps.

47. A method which comprises:
   a) producing selectively variable electrical signals;
   b) moving a cursor in response to said electrical signals;
   c) changing a magnitude of said electrical signals; and
   d) performing a switching step in response to said changing step.

48. A method as claimed in claim 47 in which said performing step comprises performing said switching step when said changing step causes a predetermined rate-of-change in said electrical signals.

49. A method as claimed in claim 47 in which said performing step comprises differentiating said electrical signals subsequent to said changing step.

50. A method as claimed in claim 47 in which said method further comprises preventing said changing step from moving said cursor.

51. A method as claimed in claim 47 in which:
   a) said method further comprises preventing said changing step from moving said cursor; and
   b) said preventing step comprises differentiating said electrical signals subsequent to said changing step.

52. A method as claimed in claim 47 in which:
   a) said method further comprises preventing said changing step from moving said cursor; and
   b) said preventing step comprises delaying transmission of said changing of said magnitude.

53. A method as claimed in claim 47 in which:
   a) said method further comprises preventing said changing step from moving said cursor; and
   b) said preventing step comprises time-averaging said electrical signals.

54. A method as claimed in claim 45 in which said switching step comprises a mouse-clicking step.

55. A method as claimed in claim 47 in which:
   a) said switching step comprises a clicking and latching step; and
   b) said method further comprises dragging said cursor in response to a subsequent producing step.

56. A method as claimed in claim 47 in which said method further comprises performing an other switching step in response to another of said changing steps.

57. A method as claimed in claim 47 in which:
   a) said producing step comprises producing electric signals on both sides of a null electrical signal;
   b) said changing step comprises changing said magnitude in a first direction;
   c) said method further comprises performing an other switching step in response to changing said magnitude in an opposite direction; and
   d) said method still further comprises preventing the second said changing step from performing said other switching step unless the second said changing step is performed on an opposite side of said null electrical signal.

58. A method as claimed in claim 47 in which said method further comprises preventing a rapid reversal in said magnitude from performing an other switching step.

59. A method which comprises:
   a) selectively actuating first and second transducers;
   b) moving a cursor in horizontal and vertical directions in response to said selectively actuating step;
   c) more rapidly actuating one of said transducers; and
   d) performing a switching step in response to said more rapidly actuating step.

60. A method as claimed in claim 59 in which said performing step comprises performing said switching step when said more rapidly actuating is equal to a predetermined rate-of-change.

61. A method as claimed in claim 59 in which said method further comprises preventing said more rapidly actuating step from moving said cursor.

62. A method as claimed in claim 59 in which:
   a) said method further comprises preventing said more rapidly actuating step from moving said cursor; and
   b) said preventing step comprises delaying said response of said cursor to said selectively actuating step.

63. A method as claimed in claim 59 in which:
a) said method further comprises preventing said more rapidly actuating step from moving said cursor;
b) said more rapidly actuating step comprises producing electrical signals; and
c) said preventing step comprises differentiating said electrical signals.

64. A method as claimed in claim 59 in which:
a) said more rapidly actuating step comprises producing electrical signals; and
b) said performing step comprises differentiating said electrical signals.

65. A method as claimed in claim 59 in which said method further comprises performing an other switching step in response to an other more rapidly actuating step.

66. A method as claimed in claim 59 in which said method further comprises preventing rapid reduction of said rapidly actuating step from performing an other switching step.

67. A method which comprises:
a) producing plus x, minus x, plus y, and minus y signals;
b) moving a cursor in plus X, minus X, plus Y, and minus Y directions in response to said producing step;
c) selectively increasing one of said signals; and
d) performing a switching step in response to said selectively increasing step.

68. A method as claimed in claim 67 in which said performing step comprises performing said switching step when said selectively increasing step causes a predetermined rate-of-change in said one signal.

69. A method as claimed in claim 67 in which said method further comprises preventing said selectively increasing step from moving said cursor.

70. A method as claimed in claim 67 in which:
a) said method further comprises preventing said selectively increasing step from moving said cursor; and
b) said preventing step comprises delaying transmission of said selectively increasing of said one signal.

71. A method as claimed in claim 67 in which:
a) said method further comprises preventing said selectively increasing step from moving said cursor; and
b) said preventing step comprises differentiating said selectively increased signal.

72. A method as claimed in claim 67 in which said performing step comprises differentiating said selectively increased signal.

73. A method as claimed in claim 67 in which said method further comprises:
a) selectively increasing an other of said signals; and
b) performing an other switching step in response to said selectively increasing said other signal.

74. A method as claimed in claim 67 in which said method further comprises preventing a sudden reduction in said selectively increasing signal from performing an other switching step.

75. Apparatus which comprises:
means, comprising first and second transducers that are connected to a display cursor, for moving said cursor in X and Y directions in response to body-member actuating said transducers; and
means, being connected to one of said transducers, for performing a switching function in response to more rapidly actuating said one transducer.

76. Apparatus as claimed in claim 75 in which said apparatus comprises means, being connected to said one transducer, for preventing said more rapidly actuating of said one transducer from moving said cursor.

77. Apparatus as claimed in claim 75 in which said apparatus further comprises means, comprising means for delaying said moving of said cursor, for preventing said more rapidly actuating of said one transducer from moving said cursor.

78. Apparatus as claimed in claim 75 in which said apparatus further comprises means, comprising a differentiator that attached to said one transducer, for preventing said more rapid actuating of said one transducer from moving said cursor.

79. Apparatus as claimed in claim 75 in which said means for performing said switching function comprises a first differentiator that is attached to said one transducer.

80. Apparatus as claimed in claim 75 in which:
said means for performing said switching function comprises a first differentiator that is attached to said one transducer; and
said apparatus further comprises means, comprising a second differentiator that is attached to one of said transducers, for performing an other switching function in response to more rapidly actuating a selected one of said transducers in one of said directions.

81. Apparatus as claimed in claim 75 in which:
said means for performing said switching comprises a first differentiator that is attached to said one transducer; and
said apparatus further comprises means, being attached to said first differentiator, for preventing said apparatus from performing an other switching function in response to rapid reduction in said more rapid actuating of said one transducer.

* * * * *